United States Patent
Ohmori et al.

[11] Patent Number: 6,122,237
[45] Date of Patent: Sep. 19, 2000

[54] DISC DRIVE APPARATUS WITH OPTICAL AXIS INCLINATION ADJUSTMENT BASED ON A SKEW SENSOR AND REFERENCE

[75] Inventors: Kiyoshi Ohmori; Hidekazu Seto, both of Tokyo, Japan

[73] Assignee: Sony Corporation, Tokyo, Japan

[21] Appl. No.: 09/029,116

[22] PCT Filed: Jun. 24, 1997

[86] PCT No.: PCT/JP97/02177

§ 371 Date: Jun. 9, 1998

§ 102(e) Date: Jun. 9, 1998

[87] PCT Pub. No.: WO97/50086

PCT Pub. Date: Dec. 31, 1997

[30] Foreign Application Priority Data

Jun. 24, 1996 [JP] Japan ................................. 8-163351

[51] Int. Cl.[7] ................................................. G11B 3/90
[52] U.S. Cl. ............................ 369/58; 369/54; 369/44.32
[58] Field of Search .................................. 369/44.32, 58, 369/54, 44.27, 94

[56] References Cited

U.S. PATENT DOCUMENTS 5,657,303  8/1997  Namoto et al. ...................... 369/44.32

FOREIGN PATENT DOCUMENTS

| 4-195929 | 7/1992 | Japan . |
| 6-131681 | 5/1994 | Japan . |
| 8-287476 | 11/1996 | Japan . |
| 8-335327 | 12/1996 | Japan . |

*Primary Examiner*—Thang V. Tran
*Attorney, Agent, or Firm*—Limbach & Limbach LLP

[57] ABSTRACT

A disk drive apparatus that provides for a positional relationship between an optical disk and an optical pickup device to be set in a predetermined initial state before an information storage and reproducing operation. The disk drive apparatus includes a disk table that is rotated by a spindle motor and onto which an optical disk is loaded and an optical pickup device for recording and reproducing information on and from the optical disk. The disk drive apparatus further includes a skew sensor for detecting the inclination of a light beam's optical axis relative to the optical disk, a skew control mechanism for adjusting that inclination, a reference portion detected by the skew sensor, and control means. The control means sets the skew control mechanism in its predetermined initial state based on an output from the skew sensor obtained from detection of the reference portion. This disk drive apparatus makes it possible to satisfactorily reproduce optical disks of different kinds regardless of the kind of the optical disk loaded onto the disk table.

8 Claims, 35 Drawing Sheets

DISC DRIVE APPARATUS WITH OPTICAL AXIS INCLINATION ADJUSTMENT BASED ON A SKEW SENSOR AND REFERENCE

TECHNICAL FIELD

The present invention relates to an optical disk apparatus for recording (writing) and/or reproducing (reading) information by using an optical disk, such as an optical disk, a magneto-optical disk or the like, as an information recording medium, and more particularly to an optical disk apparatus in which an attitude between the optical disk and the optical pickup is set to a predetermined initial state prior to performing an information recording or reproducing operation.

BACKGROUND ART

A general disk drive apparatus has employed as an information recording medium a CD (compact disk) only for playback, a CD-ROM (read-only memory) and so on in which a music data, an information data processed by a computer and so on are previously recorded. An optical disk such as a write-once type OD (magneto-optical disk) or the like on which data can be recorded again is also employed as the information recording medium.

A disk drive apparatus for storing and/or reproducing information by using these optical disks as an information recording medium has a disk table fitted to a rotation shaft of a spindle motor, an optical pickup device for writing and/or reading an information signal on and/or from an optical disk loaded onto the disk table. The optical disk is horizontally loaded onto the disk table and then rotated while a light beam is irradiated by an objective lens of an optical pickup device on an information recording surface of the optical disk. Then, while He objective lens is moved in parallel to the information recording surface, information is recorded on the information recording surface and information previously recorded thereon is reproduced.

When such disk drive apparatus is used to record and/or reproduce data on and/or from the optical disk with satisfactory recording and reproduction characteristics, the objected lens of the optical pickup device for reading the information on the information recording surface of the optical disk must be positioned and inclined at an angle within a predetermined range relative to the information recording surface of the optical disk. The reason for this is that inclination of the objective lens largely depends upon accuracy of reproduction of the information signal.

In this case, if the optical disk is recorded and/or reproduced with high density and high accuracy, then it is preferable to set an optical axis of the objective lens perpendicularly (90°) to the optical disk. If the light beam is made incident on the information recording surface of the optical disk vertically, then a beam spot of the light beam irradiated on the information recording surface has a circular shape. As a result, it becomes possible for the beam spot to precisely scan one recording track formed on the information recording surface, and hence it is possible to record and/or reproduce data with satisfactory recording and reproduction characteristics.

However, inclination of the optical disk, a vertical-direction posture of a spindle motor, a vertical-direction posture of an objective lens and so are fluctuated, which makes it difficult to accurately set an optical axis of the objective lens perpendicularly to the optical disk. Therefore, in the disk drive apparatus employing an optical disk as an information recording medium, in consideration of inclination of an optical disk, accuracies in attachment of a spindle motor and an optical pickup device and so on, an allowance of a relative inclination of an information recording surface of the optical disk relative to an optical axis of an objective lens is determined in the standard.

An disk drive apparatus using an optical disk, such as a CD, a CD-ROM or the like, having a diameter of 12 cm is standardized to have an allowable range for the relative inclination angle between the optical disk and the objective lens which is determined to be 1.2° or less (the inclination of the optical disk is standardized to be 0.6° or less and the inclination of each of the spindle motor and the objective lens of the disk drive apparatus is standardized to be 0.6° or less). The objective lens is moved with reference to a reference state that the optical disk is attached to a predetermined position, and thereby the optical axis of the objective lens is adjusted so that its inclination should fall within a predetermined inclination range.

Two types of optical disks, such as a CD, a CD-ROM or the like, having a diameter of 12 cm and classified on the basis of the degree of the recording density have been manufactured. One of the two types of the optical disks is a first optical disk, such as a CD, a CD-ROM or the like, having a standard information recording density (hereinafter called as a "standard density disk"), while the other thereof is a second optical disk such as a DVD (a Digital Video Disk), a HD-CD (a High Density Compact Disk) and so on, having a recording density which is seven to eight times as large as that of the CD and the like (hereinafter called as a "high density disk").

In general, while the standard density disks are manufactured with a relatively rough dimension accuracy, the high density optical disks are manufactured with a precise dimension accuracy. In order to increase a recording density of the high density disk, a high density disk has not only a narrower width of a recording track where data are recorded but also a narrower pitch between pits in order to set the width and the pitch smaller.

The disk drive employing such high-density optical disk as an information recording medium must set a vertical-direction posture of an object lens relative to the optical disk with higher accuracy, employ more highly accurate parts, set an inclination angle of the optical disk smaller, or further improve an adjustment accuracy. However, these attempts inevitably encounter their limits. For example, the attempt of further improving the adjustment accuracy leads to increase of a manufacturing cost of a product, and hence it is not preferable.

Moreover, if the optical disk is an LD (laser disk), then the LD has a large disk diameter of 300 mm and is formed of AS (acrylonitrile styrene resin) whose rigidity is lower as compared with PC (polycarbonate) used as a disk material for a CD and so on. Accordingly, an inclination amount of the LD becomes larger.

The applicant of the present invention has filed various patent applications relating to such disk drive apparatus having a skew adjustment mechanism for adjusting an optical axis of an objective lens of an optical pickup device relative to a warp of an information recording surface of an optical disk. The skew adjustment mechanism inclines the optical pickup device equipped with the object lens used for reading an information signal in accordance with an inclination of the optical disk or inclines the spindle motor in accordance with the inclination of the optical pickup device.

Such skew adjustment mechanism will be described in detail. The skew adjustment mechanism has a pair of rotation fulcrums formed on a horizontal reference line passing through an axial line of a rotational shaft of the spindle motor and perpendicular to a tray center. The spindle motor is rotated around the pair of the right and left rotation fulcrums, and thereby the inclination of the optical disk relative to the optical axis of the objective lens can be adjusted. Since the above-mentioned skew adjustment mechanism is arranged to perform the radial skew adjustment of the optical disk by adjusting the inclination of the spindle motor, its structure can be simplified and a required drive force can be reduced as compared with that for adjusting the inclination of the overall body of the optical pickup. Therefore, a small-sized, low-cost and power-saving disk drive apparatus can be obtained.

However, the above conventional disk drive apparatus does not accurately set a positional relationship between the optical disk and the optical pickup to a predetermined initial state. The above disk drive apparatus detects whether the optical disk used for recording and/or reproducing information has a high density or a low density. If the optical disk is a high-density disk, the skew adjustment mechanism is operated to perform the skew adjustment, and, if on the other hand the optical disk is a standard-density disk, the skew adjustment mechanism is stopped and the skew adjusting is not carried out. Therefore, the conventional disk drive apparatus encounters the problem of unsatisfactory reproduction upon exchange of the optical disk from a high-density disk to a standard-density disk.

The above-mentioned problem arises due to the following causes. The causes will hereinafter be described with reference to FIG. 35 to FIG. 37. FIG. 35 to FIG. 37 are diagrams used to explain a relationship between an optical pickup and an optical disk of the conventional disk drive apparatus. In FIGS. 35 to 37, reference numeral 290 represents a subchassis, reference numeral 291 represents a spindle motor secured to the sub-chassis 290, and reference numeral 292 represents a disk table attached to the rotational shaft of the spindle motor 291. An optical disk D (a high-density disk Dh or a standard-density disk Ds) is horizontally loaded on the disk table 292 so as to be rotatable integrally therewith.

Moreover, an optical pickup device 293 for writing and/or reading information to and/or from the optical disk D loaded onto the disk table 292 is slidably attached to the subchassis 290. The optical pickup device can be brought close to and away from the disk table 292 in a state where an objective lens 294 thereof is opposed to an information recording surface of the optical disk D. A skew sensor 295 is attached to the optical pickup 293 with facing upward. The skew sensor 295 detects an inclination of the optical disk D.

Thus, as shown in FIG. 35, if the high-density disk Dh is loaded onto the disk table 292 fixed on the rotation shaft of the spindle motor 291, then the information recording surface is inclined in a direction in which the high-density disk becomes closer to the objective lens 294, as shown by a two-dot chain line. At this time, as shown in FIG. 36, while the object lens 294 of the optical pickup device 293 is moved in a direction in which it is brought away from the information recording surface, the skew adjustment mechanism acts to incline the optical axis of the object lens in a direction perpendicular to the information recording surface. When the high-density disk Dh is ejected, as shown in FIG. 37, the object lens 294 is held in a state that it is inclined.

When the standard-density disk Ds is inserted into the disk drive apparatus in the above state and loaded onto the disk table 292, a disk-kind discriminating means discriminates whether the inserted disk has a high density or a low density similarly to the preceding processing. Since the disk loaded at this time is the standard-density disk Ds, then the skew adjustment mechanism is not operated. However, similarly to the high-density disk Dh, the an outer periphery side of the loaded standard-density disk Ds is inclined downward due to a weight of the disk.

However, since the standard-density disk Ds has a recording pitch, a rotation speed, a physical disk structure and so on which are different from those of the high-density disk Dh, the inclination angles of the information recording surfaces of the standard-density disk and the high-density disk relative to the optical axis of the light beam are different from each other.

Accordingly, if the standard-density disk is inserted in a state that the inclination of the objected lens 294 has already been adjusted so as to correspond to the high-density disk Dh, then a harmful influence may occur. Specifically, the light beam irradiated from the objective lens 294 is prevented from being focused on the information recording surface, and hence a positional relationship between the standard-disk Ds and the objective lens 294 is prevented from being set in the most satisfactory state for reproducing information recorded on the standard-density disk Ds.

The present invention is made in view of such problems. It is an object of the present invention to provide a disk drive apparatus which, when an optical disk is newly loaded thereto to record and/or reproduce information thereon and/or therefrom, returns a positional relationship between the optical disk and an optical pickup device to it predetermined initial state and then operates a skew adjustment mechanism if necessity is caused, thereby making it possible to selectively employ plural kinds of optical disks having different specifications such as recording capacities or the like.

DISCLOSURE OF THE INVENTION

A disk drive apparatus according to the present invention includes a disk table onto which an optical disk used for recording and/or reproducing information is loaded and which is rotated by a spindle motor, an optical pickup device for irradiating a light beam on the optical disk loaded onto the disk table to thereby record and/or reproduce information on and/or from the optical disk, a skew sensor for detecting inclination of an optical axis of the light beam irradiated from the optical pickup device relative to the optical disk loaded onto the disk table, a skew control mechanism for adjusting the inclination of the optical axis of the light beam relative to the optical disk based on a detection output from the skew sensor, a reference portion positioned in the vicinity of the disk table and detected by the skew sensor, and a control means for setting the skew control mechanism in a predetermined initial state based on an output from the skew sensor based on detection of the reference portion. Moreover, a disk drive apparatus according to the present invention includes a disk tray housing an optical disk used for recording and/or reproducing information and inserted into and ejected from an apparatus body, a disk table onto which the optical disk is loaded and which is rotated by a spindle motor, an optical pickup device for irradiating a light beam on the optical disk loaded onto the disk table to thereby record and/or reproduce information on and/or from the optical disk, a skew sensor provided in the optical pickup device for detecting inclination of an optical axis of the light beam relative to the optical disk, a skew control mechanism for adjusting the inclination of the optical axis of the light beam relative to the optical disk loaded onto the disk table based on a detection output from the skew sensor, a reference member positioned in the vicinity of the disk table, detected by the skew sensor and covering the skew sensor so as to open and close the skew sensor, an opening member provided in the disk tray for opening the skew sensor by operating the reference member, and a control means for setting the skew control mechanism in a predetermined initial state based on an output from the skew sensor based on detection of the reference member. Upon the disk loading, the opening member operates the reference member to open the skew sensor, thereby the skew control mechanism being set in its operable state.

A disk drive apparatus according to the present invention includes a disk table onto which an optical disk used for recording and/or reproducing information is loaded and which is rotated by a spindle motor, an optical pickup device for irradiating a light beam on the optical disk loaded onto the disk table to thereby record and/or reproduce information on and/or from the optical disk, a skew sensor provided in the optical pickup device for detecting inclination of an optical axis of the light beam irradiated from the optical pickup device relative to the optical disk, a skew control mechanism for adjusting the inclination of the optical axis of the light beam relative to the optical disk based on a detection output from the skew sensor, a reference portion positioned in the vicinity of the disk table and detected by the skew sensor, a recording-density detecting means for detecting a recording density of information on the optical disk, and a control means for setting the skew control mechanism in a predetermined initial state based on an output from the skew sensor based on detection of the reference portion and for carrying out a skew adjustment control by the skew control mechanism based on a detection signal from the recording-density detection mens only when a density used for recording information on the optical disk is high density.

Moreover, a disk drive apparatus according to the present invention includes a disk table onto which an optical disk used for recording and/or reproducing information is loaded and which is rotated by a spindle motor, an optical pickup device for irradiating a light beam on the optical disk loaded onto the disk table to thereby record and/or reproduce information on and/or from the optical disk, a skew sensor provided in the optical pickup device for detecting inclination of an optical axis of the light beam irradiated from the optical pickup device relative to the optical disk, a skew control mechanism for adjusting the inclination of the optical axis of the light beam relative to the optical disk based on a detection output from the skew sensor, and a control means for setting the skew control mechanism in a predetermined initial state based on an output from the skew sensor obtained based on detection of an inner periphery portion of the optical disk loaded onto the disk table.

Moreover, a disk drive apparatus according to the present invention includes a disk table onto which an optical disk used for recording and/or reproducing information is loaded and which is rotated by a spindle motor, an optical pickup device for irradiating a light beam on the optical disk loaded onto the disk table to thereby record and/or reproduce information on and/or from the optical disk, a skew sensor provided in the optical pickup device for detecting inclination of an optical axis of the light beam irradiated from the optical pickup device relative to the optical disk, a skew control mechanism for adjusting the inclination of the optical axis of the light beam relative to the optical disk based on a detection output from the skew sensor, a control means for setting the skew control mechanism in a predetermined initial state based on an output from the skew sensor obtained based on detection of an inner periphery portion of the optical disk loaded onto the disk table, and a kind discriminating means for discriminating a kind of the optical disk loaded onto the disk table. The control means selects, in response to a discrimination result of the kind discriminating means, either of a first mode in which the skew control mechanism is kept in the initial state and a second mode in which the skew control mechanism adjusts the inclination of the optical axis of the light beam based on a detection output from the skew sensor.

BEST MODE FOR CARRYING OUT THE INVENTION

A disk drive apparatus according to the present invention will hereinafter be described with reference to the accompanying drawings, by way of example.

[Outline of first embodiment of disk drive apparatus]

A disk drive apparatus of the first embodiment is a disk-tray type apparatus which can employ as an information recording medium two kinds of optical disks (specifically optical discs) having different recording capacities, automatically loads the optical disk onto an apparatus body by a disk tray, and reproduces (reads) information recorded on the optical disk.

A disk drive apparatus 100 can employ a standard-density disk Ds as a first optical disk having a standard recording density (a first recording density) such as a CD, a CD-ROM or the like having a diameter of 12 cm and a high-density disk Dh as a second optical disk having a higher recording density (a second recording density) as compared with that of the first optical disk, such as a DVD, an HD-CD or the like similarly having a diameter of 12 cm, and can automatically discriminate the recording density of the loaded optical disk to reproduce the optical disk.

Figure 1:
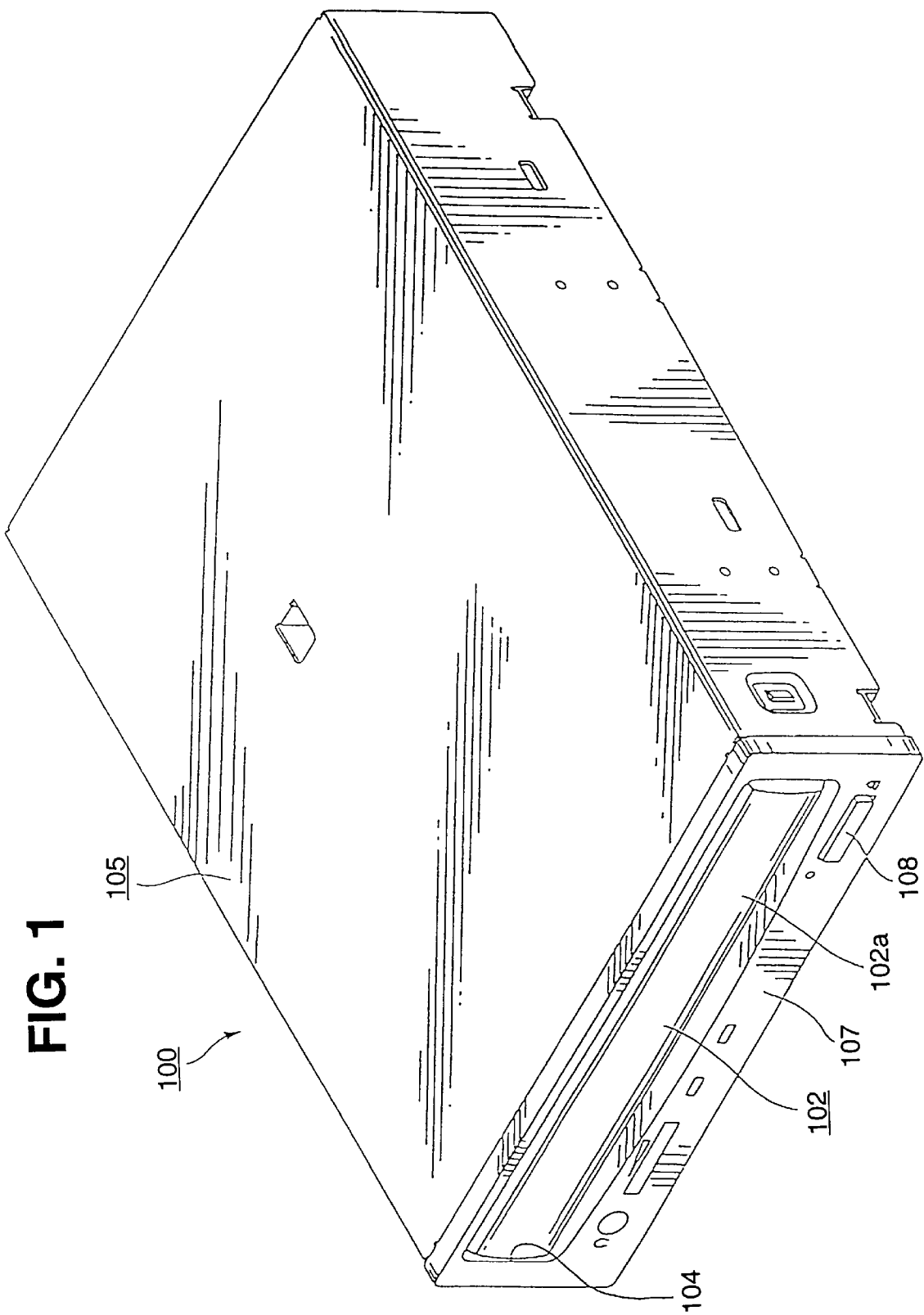
FIG. 1 is a perspective view of an appearance of a disk drive apparatus according to a first embodiment of the present invention.
Figure 2:
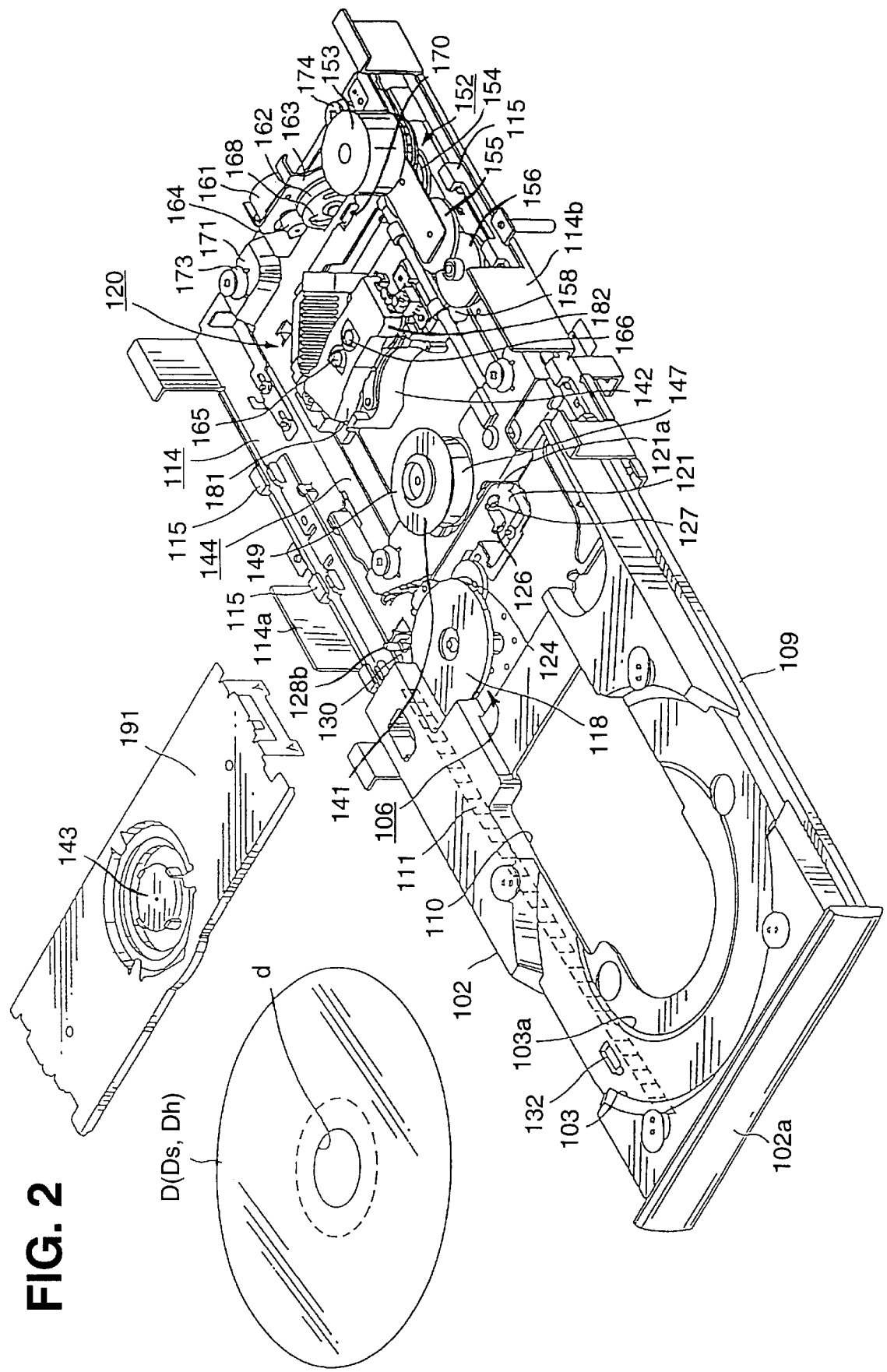
FIG. 2 is a perspective view showing a disk tray and an internal structure of a chassis of the disk drive apparatus shown in a perspective view showing an internal structure of a disk tray and a chassis of the disk drive apparatus shown in FIG. 1.

As shown in FIG. 1 and FIG. 2, the disk drive apparatus 100 has a disk tray 102 which is horizontally moved from an inside of an apparatus body 105 to an outside thereof and vice versa. The disk tray 102 has a disk holding portion 103 having a concave shape at its upper surface. The standard-density disk Ds or the high-density disk Dh reproduced by this disk drive apparatus is housed with being mounted on a bottom surface of the disk holding portion 103 of the disk tray 102. As shown in FIG. 2, when the disk tray 102 is drawn toward an outside of the apparatus body 105, the disk holding portion 103 is opposed to a front of the apparatus body 105, and then the standard-density disk Ds or the high-density disk Dh can be loaded and ejected.

When the optical disk D is loaded, as shown in FIG. 2, the disk tray 102 is drawn to a front of the apparatus body 105, and then the standard-density disk Ds or the high-density disk Dh to be reproduced is mounted on the disk holding portion 103. Thereafter, the disk tray 102 is pushed toward an inside of the apparatus body 105 by pushing a front surface portion 102a of the disk tray, thereby the disk tray 105 operating a loading switch, not shown, provided in the apparatus body 105.

When the loading switch is operated, the disk tray 102 is horizontally drawn toward the inside of the apparatus body 105 through a tray slot 104 provided through a front surface panel 107 of the apparatus body 105 by an operation of a loading drive mechanism described later on. When the disk tray 102 is completely housed in the apparatus body 105 as shown in FIG. 1, the optical disk D held by the disk holding portion 103 is automatically horizontally loaded onto a disk table rotated by a spindle motor.

When a reproduction command signal is input to the disk drive apparatus from a host computer the optical disk D is loaded, the spindle motor starts to rotate the standard-density disk Ds or the high-density disk Dh mounted on the disk table at a constant linear velocity (CLV) or a constant angular velocity (CAV). Together with commencement of the rotation of the optical disk D, an optical pickup device starts being driven. The optical pickup device emits a light beam from its light source such as a semiconductor laser or the like for scanning an information recording surface of the optical disk D and thereby reads out information data recorded on the optical disk D.

When desired information data recorded on the optical disk D is reproduced and then an eject command signal is input to the disk drive apparatus from the host computer or an eject button 108 provided at the front surface panel 107 is pressed, the loading mechanism is driven to move the disk tray 102 in an ejection direction from the tray slot 104 toward a front of the apparatus body 105. This eject operation is completed when the disk holding portion 103 is brought into a state that it is drawn to the front of the apparatus body 105.

[disk tray and loading mechanism]

A disk tray 102 and a loading mechanism 106 for the disk tray 102 for moving the disk tray 102 from an outside of the apparatus body 105 to an inside thereof and vice versa will hereinafter be described.

The disk tray 102 moved by the loading mechanism 106 from the outside of the apparatus body 105 to the inside thereof and vice versa is formed of a synthetic resin material and has, as shown in FIG. 2, a long-aperture-shaped bottom-surface opening 110 formed through a portion of the disk holding portion 103 from its center portion to its rear end portion side positioned on the inner side of the apparatus body 105. When the disk tray 102 is moved to a reproduction position in the apparatus body 105, the disk table forming the disk drive unit and the optical pickup device are opposed to the inside of the bottom-surface opening 110.

The disk holding portion 103 of the disk tray 102 is formed so as to have a size sufficient for holding the optical disk D having a diameter of 12 cm and to further have an auxiliary disk holding portion 103a provided the inner side of the disk holding portion 103 with having a small diameter and the same center as that of the disk holding portion for holding an optical disk having a diameter of 8 cm. The auxiliary disk holding portion 103a is formed by providing a concave portion at the bottom surface portion of the disk holding portion 103.

A pair of left and right guide rails 109 are formed at both side portions, which are opposed to each other and are in parallel to the movement direction, of the disk tray 102 integrally therewith. Moreover, a rack gear 111 for meshing with a feed gear 118 of the loading mechanism 106 is provided at one side portion of the bottom surface side of the disk tray 102. A chassis 114 formed by punching a thin metal plate and then bending a punched piece is disposed in the apparatus body 105.

Figure 3:
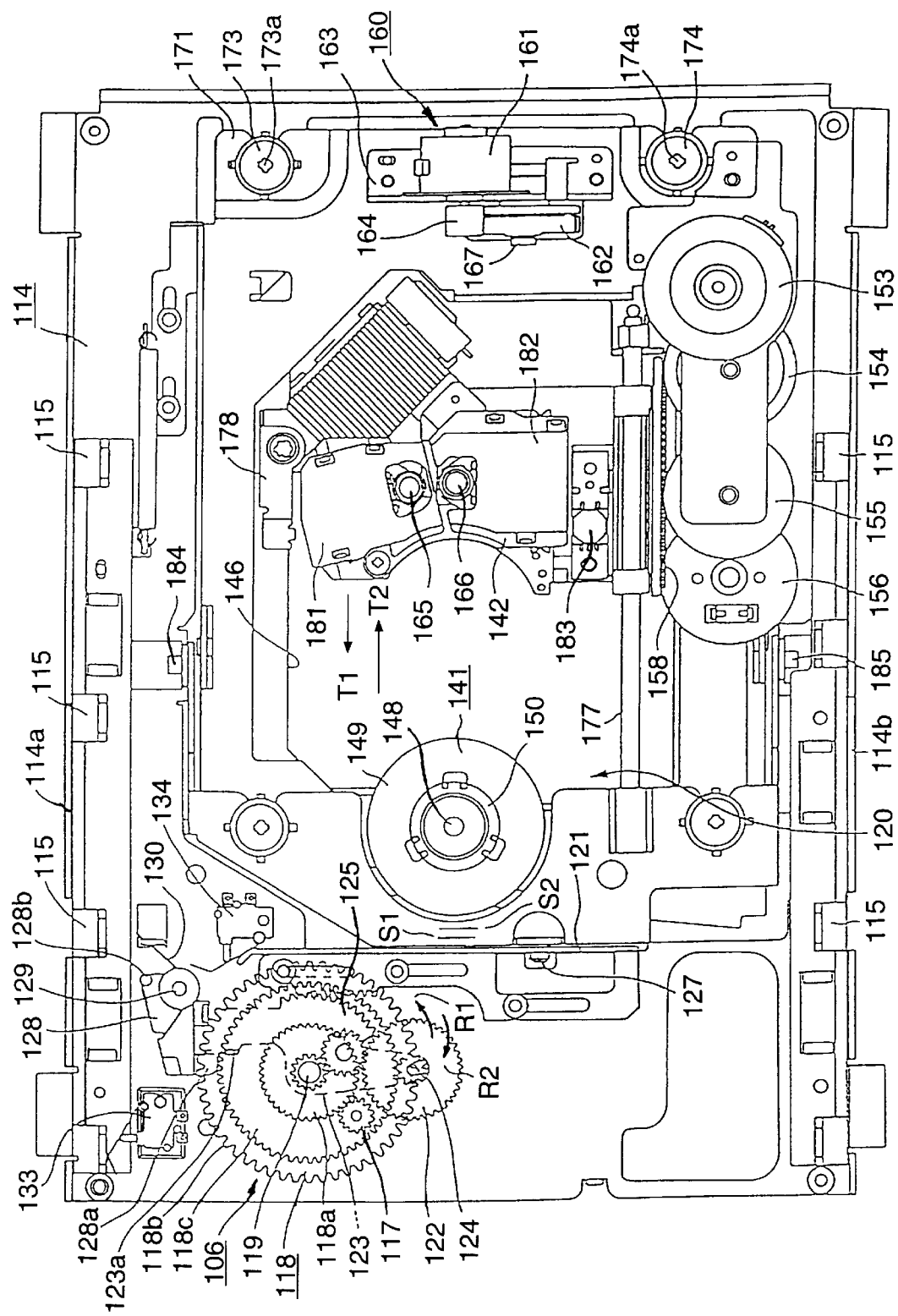
FIG. 3 is a plan view showing the internal structure of a chassis of the disk drive apparatus shown in FIG. 1 when the disk tray is in its initial state.

As shown in FIG. 2, a pair of left and right guide rails 109 of the disk tray 102 are supported by a plurality of tray guide portions 115 formed of synthetic resin and fitted to insides of left and right side boards 114a, 114b, opposed to each other, of the chassis 114. The disk tray is guided by the these tray guide portions 115 and thereby moved in a direction in which it is brought to the inside and the outside of the apparatus body 105. As shown in FIG. 2 and FIG. 3, the loading mechanism 106 for moving the disk tray 102 from the outside of the apparatus body 105 to the inside thereof and vice versa is disposed on a front surface side positioned on the side of the tray slot 104 of the chassis 114 disposed in the apparatus body 105.

Figure 4:
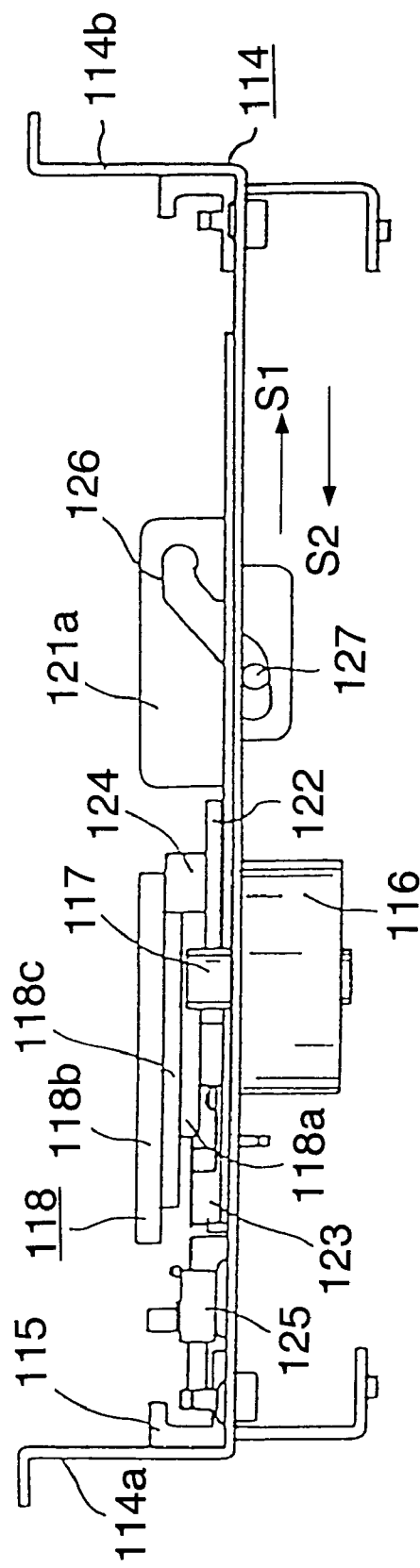
FIG. 4 is a front view showing the chassis of the disk drive apparatus shown in FIG. 1 when the disk tray is in its initial state.

As shown in FIG. 3 and FIG. 4, the loading mechanism 106 has a loading motor 116 fitted to a front-surface side bottom surface of the chassis 114, and a tray feed gear 118 engaged with a drive gear 117 fitted to a rotation shaft of the loading motor 116 and rotated by the loading motor 116. The drive gear 117 meshes with a first linkage gear 118a formed Iintegrally with the tray feed gear 118 to thereby transmit a rotation force of the loading force to the tray feed gear 118.

The tray feed gear 118 is linked to the disk tray 102 by engaging a second linkage gear 118b provided integrally with the gear 118 and having the largest diameter with the rack gear 111 of the disk tray. Accordingly, the disk tray 102 is moved to the inside and outside of the apparatus body 105 through tray feed gear 118 by driving the loading motor 116.

As will be described later on, the loading mechanism 106 has a swinging gear 122 for moving a lift and lowering operation plate 121 for lifting up and down a spindle motor forming a disk drive unit 120 fitted to the chassis 114. The swinging gear 122 is rotatably fitted to one end side of a swinging lever 123 which is rotatable around a supporting shaft 119 provided at a longitudinal-direction middle potion thereof, and the tray feed gear 118 is rotatably supported by the supporting shaft 119.

Moreover, the swinging gear 122 is linked to the tray feed gear 118 by engaging a linkage gear 124 provided integrally with the swinging gear 122 and having a small diameter with a third linkage gear 118c provided integrally with the tray feed gear 118. As a result, the loading motor 116 is driven to rotate the tray feed gear 118, and then the swinging gear 122 is rotated around the tray feed gear 122 in response to the rotation direction of the tray feed gear 118 with being in contact with an outer periphery of the tray feed gear. Thus, the swinging lever 123 is rotated around the supporting shaft 119 in the direction shown by an arrow R1 or an arrow R2 in FIG. 3.

A fan-shaped gear 125 engaged with the rack gear 111 provided on one side of a base end portion side of the lifting and lowering operation board 121 is provided on one side of a middle portion of the swinging lever 123. As a result, the swinging gear 122 is rotated in the direction shown by the arrow R1 or the arrow R2 in FIG. 3, thereby the lifting and lowering operation board 121 being moved in the direction shown by the arrow R1 or the arrow R2 in the same figure in response to the rotation direction of the swinging gear.

As shown in FIG. 4, an inclined cam groove 126 is provided at an erect piece 121a formed at the so as to be erected perpendicularly to the bottom surface of the chassis 114. The inclined cam groove 126 is formed so as to be inclined upward to the right as shown in FIG. 4, and a lifting and lowering operation pin 127 of the loading mechanism 126 is slidably engaged with the inclined cam groove. Accordingly, when the lifting and lowering operation board 121 is moved in the direction shown by an arrow S1 or an arrow S2 in the figure, the lifting and lowering operation pin 127 is moved along the inclined cam groove 126 and the spindle motor on the disk drive unit 120 side is moved in the upward or downward direction so as to be brought close to or away from the disk tray 102 moved on the chassis 114.

The operation of the lifting the spindle motor up and down is carried out in a state that the disk tray 102 is housed in the apparatus body 105. The reason for this is to prevent the disk tray 102 from colliding with the spindle motor while the disk tray 102 is being moved toward the spindle motor. For this end, rotation of the swinging lever 123 for moving the lifting and lowering operation board 121 is restricted in response to the movement position of the disk tray 102.

Figure 5:
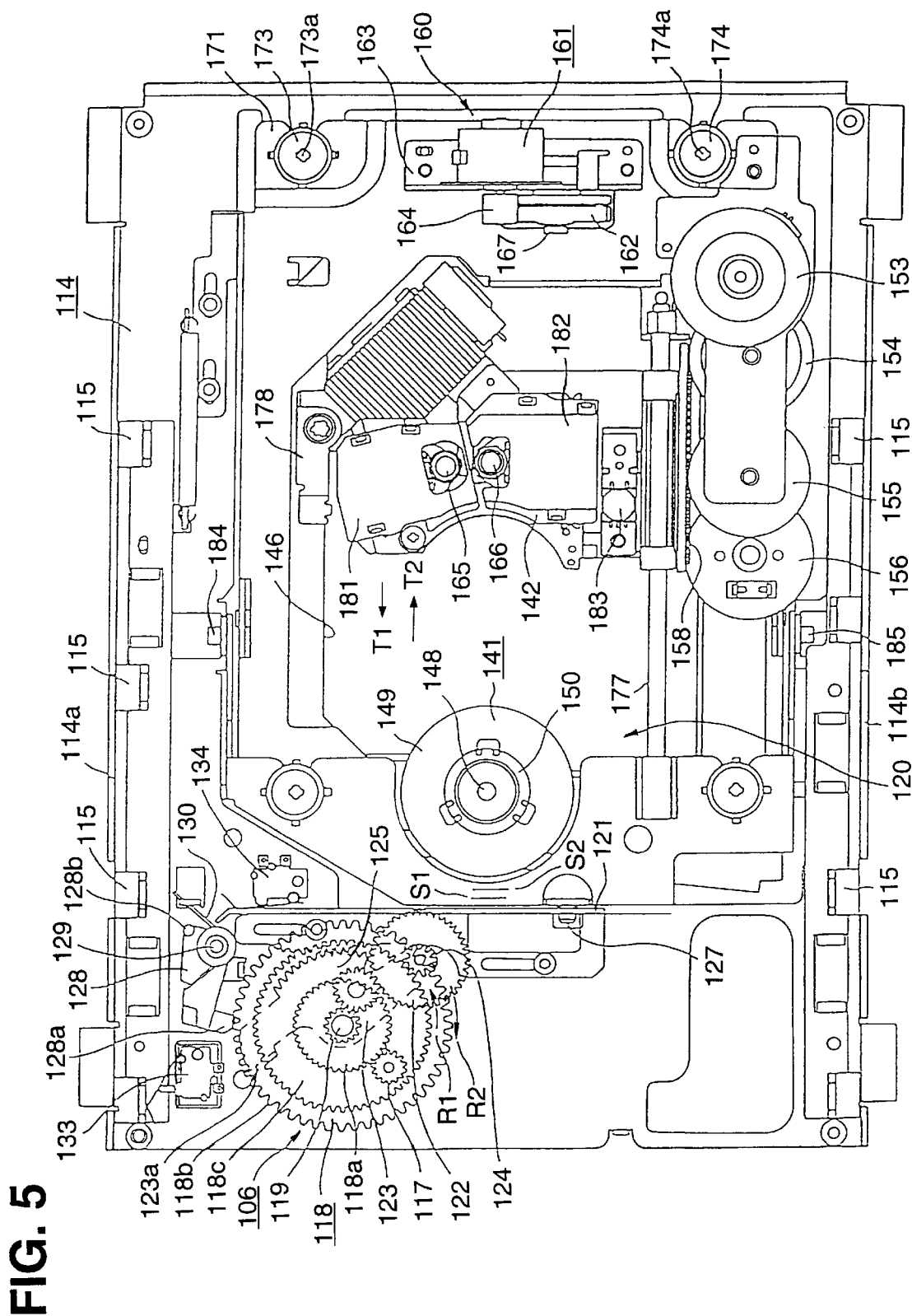
FIG. 5 is a plan view showing the internal structure of the chassis of the disk drive apparatus shown in FIG. 1 when the disk tray is drawn to a loading position.

This restriction of the rotation of the swinging lever 123 is carried out by a lock lever 128 rotated by the disk tray 102. As shown in FIG. 3 and FIG. 5, the lock lever 128 is supported by the supporting shaft 129 planted on the chassis 114, and can be rotated around the supporting shaft 129. The lock lever 128 is biased in a direction in which a lock portion 128a provided at its tip end is engaged with an engagement portion 123a provided at the other end side of the swinging lever 123, by a torsion coil spring 130 having a center coil portion wound around the supporting shaft 129, its one arm portion engaged with the lock lever 128 and its other arm portion engaged with the chassis 114.

When the disk tray 102 is moved to a loading position in the apparatus body 105, a press pin 128b planted on a base end side of the lock lever 128 is pressed by a pressing portion 132 provided on a front-surface side of one side of a bottom surface side of the disk tray 102. As a result, the lock lever 128 is rotated against a sprig force of the torsion coil spring 130, thereby the locking of the locking portion 128a engaged with the engagement portion 123a of the swinging lever 123 being released.

Figure 6:
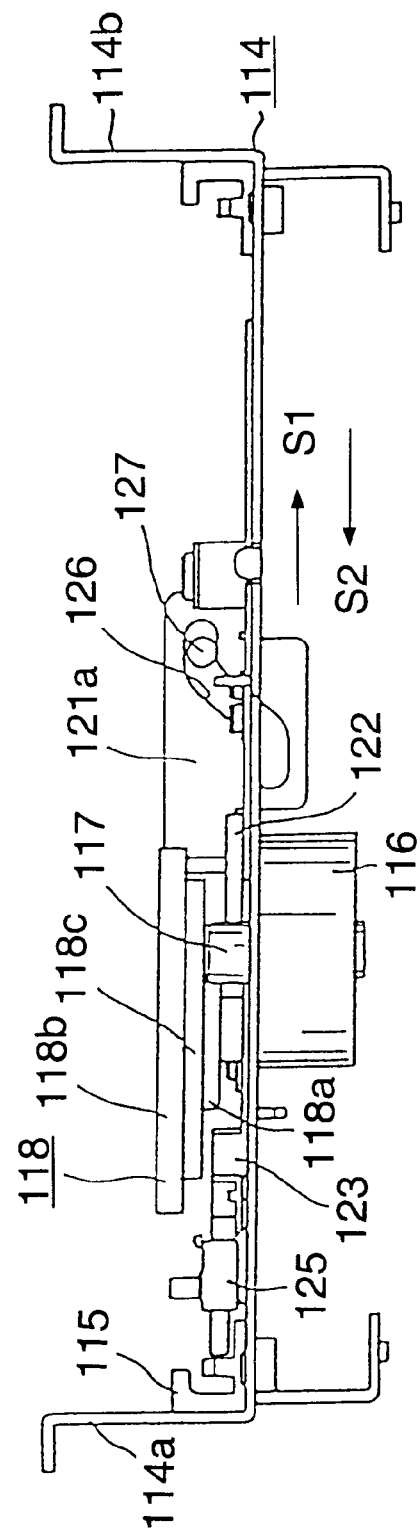
FIG. 6 is a front view showing the chassis of the disk drive apparatus shown in FIG. 1 when the disk tray is drawn to a loading position.

As described above, when the locking of the lock lever 128 is released by movement of the disk tray 102 into the apparatus body 105, the swinging lever 123 is rotated by rotation of the tray feed gear 118, and then moves the lifting and lowering operation board 121. When the lifting and lowering operation board 121 is moved, the lifting and lowering operation pin 127 is moved along the inclined cam groove 126 between the lower position shown in FIG. 4 and its upper position shown in FIG. 6.

There are disposed on the chassis 114 a loading detection switch 133 for detecting movement of the disk tray 102 to the locking position in the apparatus body 105 to stop the drive of the loading motor 116, and a lifting and lowering operation board detection switch 134 for detecting a movement position of the lifting and lowering the lifting and lowering board 121.

[disk drive unit]

There will be described a disk drive unit 120 onto which the optical disk D (the standard-density disk Ds or the high-density disk Dh) conveyed into the apparatus body 105 with being held by the above disk tray 102 is loaded and which reproduces information recorded on the optical disk D.

As shown in FIG. 2, the disk drive unit 120 is disposed in the apparatus body 105 with being supported by the chassis 114. The disk drive unit 120 has, as main elements, a disk rotating mechanism 141 onto which the optical disk D conveyed into the apparatus body 105 through the disk tray 102 and which rotates the optical disk, an optical pickup device 142 for scanning the information recording surface of the optical disk D rotated by the disk rotating mechanism 141 by a light beam to read the information recorded thereon, and a disk clamper 143 for clamping the optical disk D mounted on the disk table 149 of the disk rotating mechanism 141 in cooperation with the disk table 149.

Figure 7:
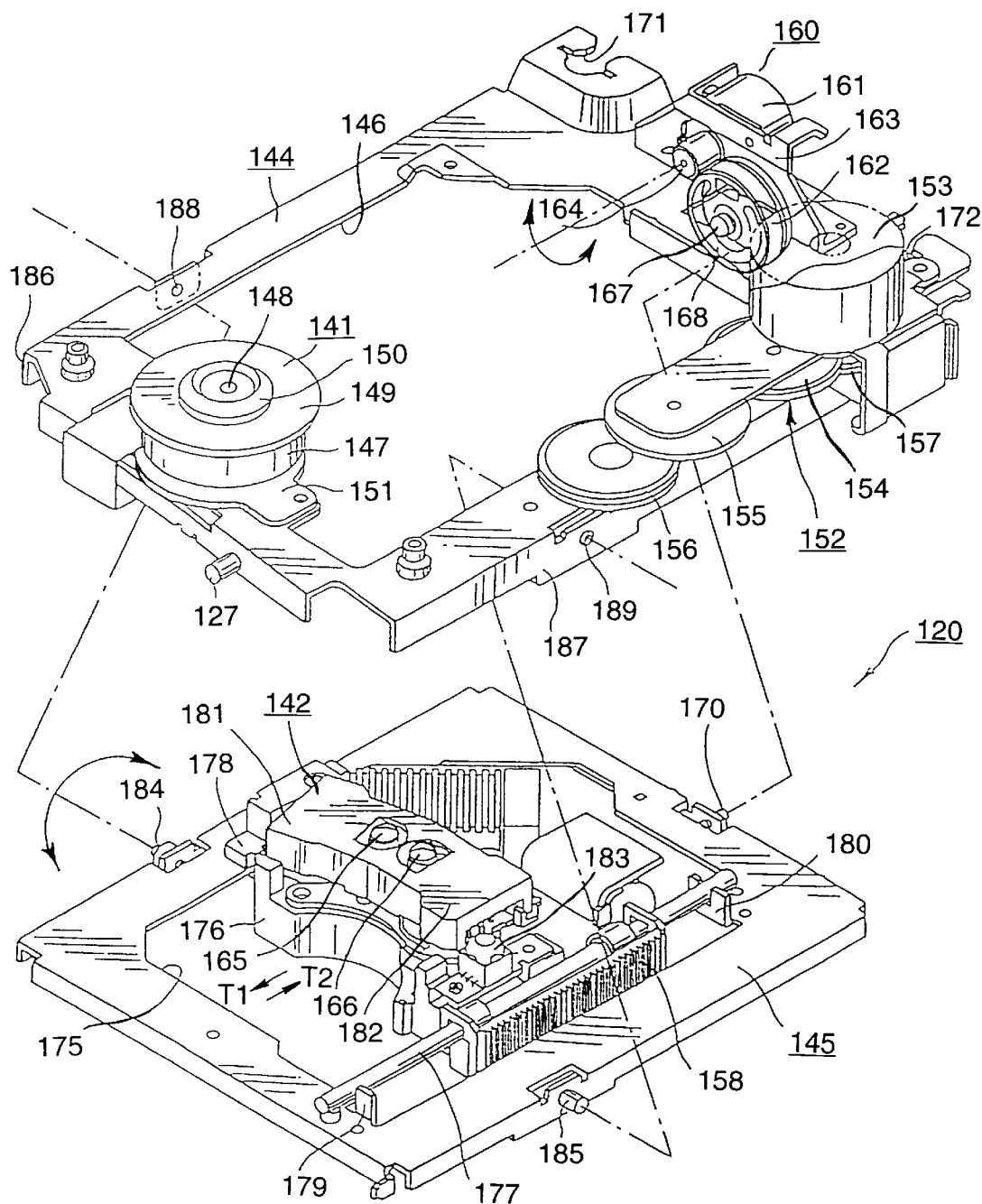
FIG. 7 is an exploded, perspective view showing a first supporting frame to which a disk rotating mechanism and so on are fitted and a second supporting frame supporting an optical pickup device of the disk drive apparatus shown in FIG. 1.

As shown in FIG. 7, the disk rotating mechanism 141 is fitted to a first supporting frame supported by the chassis 114 so as to be inclined in the vertical direction. The optical pickup device 142 is independently fitted to a second supporting frame 145 supported by the first supporting frame 144 so as to be inclined in the vertical direction. As shown in FIG. 2, the disk clamper 143 is fitted to an upper portion of the chassis 114 so as to bridge the chassis.

As shown in FIG. 7, the first supporting frame fitted to the disk rotating mechanism 141 is formed by punching a thin metal plate to bend a peripheral portion of a punched piece downward, so as to have a rectangular shape. The first supporting frame 144 has an opening portion 146 which is formed at its center portion and through which the optical pickup device 142 fitted to the second supporting frame 145 is exposed. The disk rotting mechanism 141 is fitted to a front end side of the first supporting frame 144, i.e., a side positioned on the tray slot 104 side when the first supporting frame 144 is disposed in the apparatus body 105 with being supported by the chassis 114.

The disk rotating mechanism 141 has the spindle motor 147, the disk table 149 fitted to a tip end portion of the rotation shaft 148 of the spindle motor 147, and so on. A centering member 150 with which a center aperture d of the optical disk D mounted on the disk table 149 is engaged is fitted to an upper-surface center portion of the disk table so as to be capable of moving forward and backward in the shaft direction of the rotation shaft 148. A fitting plate 151 fixed on a lower end portion of the spindle motor 147 is fitted to the first supporting frame 144 with the rotation shaft 148 being set perpendicular to the first supporting frame 144, thereby the disk rotating mechanism 141 being planted on the first supporting frame 144.

A pickup moving mechanism 152 for bringing the optical pickup device 142 supported by the second supporting frame 145 close to or away from the disk table 149 is disposed at one side portion of the first supporting frame 144. The pickup moving mechanism 152 has a feed motor 153 and first, second and third drive gears 154, 155 and 156 rotated by the feed motor 153 and linked to one another so as to be capable of transmitting power. The first drive gear 154 is linked to a drive gear 157 fitted to a drive shaft of the feed motor 153, and the third drive gear 156 is linked to a rack gear 158 provided in the optical pickup device 142.

As shown in FIG. 7, a skew control mechanism 160 for rotating the second supporting frame 145 in the upward and downward direction to control inclination thereof relative to the optical disk D is provided on the rear end side of the first supporting frame 144 which is opposed to the front end side where the disk rotating mechanism 141 is fitted.

The skew control mechanism 160 has a skew motor 161, a cam gear 162 rotated by the skew motor 161, and so on. The skew motor 161 and the cam gear 162 are fitted to a fitting plate 163 fixed on a rear end side of the first supporting frame 144 so as to be planted thereon. Specifically, the skew motor 161 is provided so that a shaft center line of a rotation shaft 164 thereof should be perpendicular to a shaft center line of a rotation shaft 164 of the spindle motor 147. Therefore, the shaft center line of the rotation shaft 164 of the skew motor 161 is also perpendicular to an optical axis of a first objective lens of the optical pickup device 166 and an optical axis of a second objective lens 166 thereof.

Figure 8:
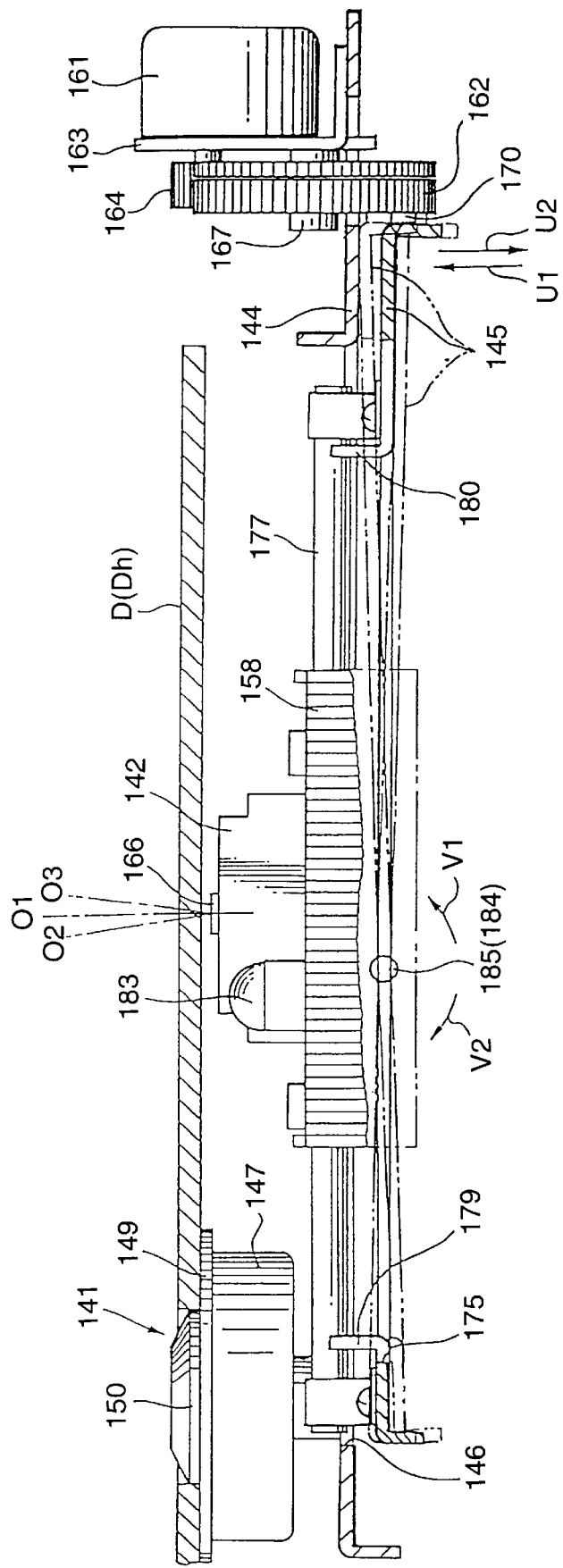
FIG. 8 is a cross-sectional view showing the first supporting frame and the second supporting frame of the disk drive apparatus shown in FIG. 1 in a state that a skew control is carried out.

The cam gear 162 is rotatably supported by a supporting shaft 167 planted on the fitting plate 163, and its rotation center is set perpendicular to the optical axes of the first and second objective lenses 165, 166 similarly to that of the skew motor 161. A continuously arc-shaped cam groove 168 is formed through a rear-surface side main surface of the cam gear 1162. The cam groove 168 has such a spiral shape that the rotation center of the cam gear 162 is employed as a center of the spiral and a radius of the spiral is gradually increased from one end side to the other end side. As shown in FIG. 8, an engagement pin 170 projectingly provided on a rear-end side end surface of the second supporting frame 145 is slidably engaged with the cam groove 168.

As described above, the lifting and lowering operation pin 127 engaged with the inclined cam groove 126 of the lifting and lowering operation board 121 disposed on the chassis 114 is projectingly provided on a substantial center portion of a front end side end surface of the first supporting frame 144. As shown in FIG. 7, insulator fitting portions 171, 172 are provided on both sides of the rear end side of the first supporting frame 144. Insulators 173, 174 formed of elastic members made of rubber are fitted to the insulator fitting portions 171, 172. The insulators 173, 174 are supported by supporting shafts 173a, 174a planted on the chassis 144, thereby the first supporting frame 144 being elastically supported on the chassis 114.

As described above, the first supporting frame 144 is supported at their both sides of the rear end side on the chassis 114 through a pair of insulators 173, 174 which can be elastically displaced, the lifting and lowering operation pin 127 on the front end side is engaged with and supported by the inclined cam groove 126 of the lifting and lowering operation board 121. When the lifting and lowering operation board 121 is moved in the direction shown by the arrow S1 or S2 in FIG. 3 and the lifting and lowering operation pin 127 is moved in the upward and downward direction along the inclined cam groove 126, the first supporting frame 144 is rotated in the upward and downward direction with employing the pair of insulators 173 and 174 as fulcrums. As a result, the disk rotating mechanism 141 fitted to the front end side of the first supporting frame 144 is lifted and lowered relative to the disk tray 102. Similarly to the first supporting frame 144, the second supporting frame 145 to which the optical pickup device 142 is fitted is formed by punching a thin metal plate to bend a punched piece downward, so as to have a rectangular shape. The second supporting frame 145 has a substantially rectangular-shaped opening portion formed at its center portion so as to be used for disposing the optical pickup device 142 therein.

THe optical pickup device 142 fitted to the second supporting frame 145 has an optical block 176 in which an optical device is housed, and, as shown in FIG. 7, a guide shaft 177 for supporting the optical pickup device 142 and guiding it in the movement direction is provided on one side of the optical block 176. A guide supporting portion 178 having a traverse U-shaped cross section and engaged with a periphery of the opening portion 175 is provided on the other side thereof opposed to a side where the guide shaft 1778 is fitted.

The guide supporting portion 178 is engaged with the periphery of the opening portion 175 both ends of the guide shaft 177 are supported by supporting pieces 179, 180 provided on the second supporting frame 145, thereby the optical pickup device 142 being capable of moving in the direction parallel to the guide shaft 177 with reference to the guide shaft 177. Moreover, a rack gear 158 extended in parallel to the guide shaft 177 is fitted to an outer side of the side where the guide shaft 177 of the optical block 176 is fitted.

In a state that the second supporting frame 145 is supported by the first supporting frame 144, the third drive gear 156 of the pickup moving mechanism 145 is engaged with the rack gear 158 so as to be capable of transmitting power. Accordingly, the feed motor 153 of the pickup moving mechanism 152 is driven and consequently the rotation force of the feed motor 153 is transmitted through the first drive gear 154, the second drive gear 155 and the third drive gear 156 to the rack gear 158, thereby the optical pickup device 142 being moved in the direction shown by an arrow T1 or T2 in FIG. 7.

Specifically, in a state that the second supporting frame 145 is supported by the first supporting frame 144, the optical pickup device 142 is moved, in response to the rotation direction of the feed motor 153, in the direction in which is brought close to or away from the disk rotating mechanism 141, and then moved in the radius direction of the optical disk D loaded onto the disk table 149.

The optical pickup drive 142 employed in the disk drive apparatus 100 according to this embodiment has two kinds of pickup units 181, 182 provided independently with each other, in order to make it possible to selectively reproduce the standard-density disk Ds having a standard recording density such as a CD or the like and the high-density disk Dh having a higher recording density such as a DVD or the like. The first pickup unit 181 of the optical pickup device 142 has an optical system and a laser light source optimized for the standard-density disk Ds having the first recording density, and the second pickup unit 182 thereof has an optical system and a laser light source optimized for the high-density disk Dh having the second recording density.

If the disk is the standard-density disk Ds, then a light beam emitted from each of the laser light sources of the pickup units 181, 182 passes through the first objective lens 165 and then is irradiated on its information recording surface, and if the disk is the high-density disk Dh, the light beam passes through the second objective lens 166 and then is irradiated on the information recording surface thereof.

The optical pickup device 142 is arranged such that the second objective lens 166 thereof is disposed so that its extended line in the movement direction should substantially agree with the rotation center of the disk table 149 and such that the first objective lens 165 is offset an a constant angle. The reason for this arrangement is that a light beam emitted through the second objective lens 166 for scanning the information recording surface of the high-density disk Dh can scan the recording track thereon with high accuracy.

A skew sensor 183 formed of a light emitter and a photosensor is mounted on an upper surface of the optical block 176 of the optical pickup device 142. The skew sensor 183 detects whether or not the optical disk D is mounted on the disk table 149, and, when the optical disk D is loaded onto the disk table 149, adjusts (initializes) a positional relationship between the optical disk D and the optical pickup device 142 in its predetermined initial state, i.e., adjusts the relationship so that the optical axes of the first and second objective lenses 165, 166 of the optical pickup device 142 should be substantially perpendicular to a horizonal mount surface of the disk table 149. Thus, the positional relationship between the optical disk D and the first and second objective lenses 165 and 166 can be set in its bet state.

Moreover, the skew sensor 183 discriminates whether the optical disk loaded onto the disk table 149 is the standard-density disk Ds or the high-density disk Dh, and outputs a signal used for carrying out a skew control when the loaded optical disk D is the high-density disk Dh.

Specifically, the skew sensor 183 measures a time from reflection on the optical disk D of the light emitted from the light emitter to reception thereof by the photosensor, and, based on the measurement, determine whether or not the optical disk D is mounted on the disk table 149. When the optical disk D is mounted on the disk table 149, the skew sensor determines whether the optical disk D is the standard-density disk Ds or the high-density disk Dh (disk kind discriminating means). Since the thickness of the standard-density disk Ds is different from that of the high-density disk Dh, consequent difference between light receiving amounts of the disks makes it possible to easily discriminate one of the disks having different recording densities.

When the optical disk D loaded onto the disk table 149 is the high-density disk Dh, the skew control is carried out based on the detection signal from the skew sensor 183.

As shown in FIG. 7, a pair of supporting ins 184, 185 projected outward are provided at middle portions of both side surfaces, in parallel to the movement direction of the optical pickup device 142, of the second supporting frame 145 mounted with the skew sensor 183 and the optical pickup device 142. The pair of supporting pins 184, 185 are inserted through insertion apertures 1889, 189 provided through both side walls 186, 187, opposed to each other, of the first supporting frame 144. Thus, s shown in FIG. 8, the second supporting frame 145 is supported by the first supporting frame 145 so that it can swing in the upward and downward direction. An engagement pin 170 projectingly provided on a rear-surface side end surface of the second supporting frame 145 is engaged with the cam groove 168 of the cam gear 162 of the skew control mechanism 160.

As described above, the cam bear 162 is rotated by the skew motor 161 and the engagement pin 170 is moved along the cam groove 168 upward and downward in the direction shown by the arrow U1 or U2 in FIG. 8, thereby the second supporting frame 145 supported by the pair of supporting pins 184, 185 of the first supporting frame 144 being rotated around the supporting pins 184 and 185 in the direction shown by an arrow V1 or V2 in FIG. 8 in response to a deviation amount of the cam groove 168.

Thus, the optical pickup device 142 is moved in the direction shown by the arrow U1 or U2 relative to the horizontal reference surface, and then a radial skew control is carried out so that an optical axis O1 of the second objective lens 166 should be perpendicular to the information recording surface of the high-density disk Dh mounted on the disk table 149. As described above, the skew control is carried out only when the high-density disk Dh is loaded onto the disk table 149.

Since the pair of supporting pins 184, 185 forming the rotation fulcrums of the second supporting frame 145 are disposed at the substantial center portions in the radius direction of the optical disk D loaded onto the disk table 149, it is possible to reduce the rotation amount of the second supporting frame 145 and to then reliably carry out the radial skew control of the optical pickup device 142 for the optical disk D. Moreover, it is possible to make the disk drive unit 120 thinner and to consequently the whole apparatus thinner.

A disk drive unit 143 for clamping the optical disk D mounted on the disk table 149 in corporation with the disk table 149 is provided in the disk drive unit 120. As shown in FIG. 2, the disk clamper 143 is rotatably held at the center portion of the clamper supporting plate 191 with having predetermined clearances in the upward and downward direction and the diameter direction. The clamper supporting plate 191 is fitted to the chassis 114 so as to be stretched between the upper end portions of the left and right both side walls 114a, 114b of the chassis. In its fitted state, the disk clamper 143 is positioned above the disk table 149.

[reproduction of optical disk]

An operation of the disk drive apparatus 100 according to the first embodiment having the above configuration for reproducing the standard-density disk Ds or the high-density disk Dh as the optical disk D will be described with reference to FIG. 9 which is a block diagram thereof and FIG. 10 which is a flowchart therefor.

A disk having a diameter of 12 cm such as a CD, a CD-ROM or the like is employed as the standard-density disk Ds, and a disk having a diameter of 12 cm such as a DVD, an HD-CD or the like is employed as the high-density disk Dh.

When the standard-density disk DS or the high-density disk Dh is reproduced, the disk drive apparatus is energized and then the disk tray 102 is drawn to the front of the apparatus body 105. The optical disk D is mounted on the disk holding portion 103 of the disk tray 102 exposed to the front through the tray slot 104 and then the disk tray 102 is pushed into the apparatus body, thereby the loading operation for moving the disk tray 102 into the apparatus body 105 being carried out.

At this time, when the disk tray 102 is moved to an inside of the apparatus body 105, the loading detection switch 133 detects the movement of the disk tray to the loading position, thereby the loading motor 116 being stopped temporarily. After the loading motor 116 is temporarily stopped, the loading motor 116 is rotated in the reverse direction. At this time, the lock lever 128 is rotated against the springy force of the torsion coil spring 130 by the pressing portion 132 provided in the disk tray 102, thereby the lock of the swinging lever 123 being released.

When the loading motor 16 is rotated in the reverse direction, the swinging lever 123 is rotated in the direction shown by the arrow R1 in FIG. 3 and thereby the lifting and lowering operation board 121 is moved in the direction shown by the arrow S1. When the lifting and lowering operation board 121 is moved as described above, the lifting and lowering operation pin 127 provided in the first supporting frame 144 of the disk drive unit 120 is moved from the lower position of the inclined cam groove 126 shown in FIG. 4 to the upper position thereof shown in FIG. 6.

With this movement, the first supporting frame 144 is lifted up toward the disk tray 102 side with employing the pair of insulators 173, 174 as the fulcrums. Then, the disk table 149 is brought into the bottom-surface opening 110 of the disk tray 102, and the optical disk D held by the disk tray 102 is mounted on the disk table 149. Substantially simultaneously with this operation, the disk clamper 143 is pressed toward the disk table 149 side and thereby clamps the optical disk D, thereby being brought into a state that it can be rotated integrally with the disk table 149.

At this time, when the first supporting frame 144 moves the optical disk D to a position where the disk can be clamped, the lifting and lowering operation board detection switch 134 is operated to stop the loading motor 116, thereby completion of the loading operation being detected. If the lifting and lowering operation board detection switch 134 detects the completion of the loading operation, then the drive of the spindle motor 147 of the disk rotating mechanism 141 is started, and the skew sensor 183 is turned on.

When the skew sensor 183 is turned on, the skew sensor detects whether or not the optical disk D is surely loaded onto the disk table 149. If the optical disk D is surely loaded onto the disk table 149, the skew sensor adjusts (initializes) the positional relationship between the optical disk D and the optical pickup device 142 to be in a predetermined initial state. Thus, the optical pickup device 142 is adjusted so that the optical axis thereof should be inclined in the direction perpendicular to the optical disk.

Before the information signal is read form the optical disk D and then reproduced, it is determined whether the optical disk D to be reproduced is the standard-density disk Ds or the high-density disk Dh, based on the detection signal from the skew sensor 183. either of the first pickup unit 181 and the second pickup unit 182 of the optical pickup device 142 is selected depending upon the kind of the optical disk D to be reproduced, thereby the mode being changed to the first mode or the second mode to set the skew servo on or off. Thus, the information signal is reproduced.

Figure 9:
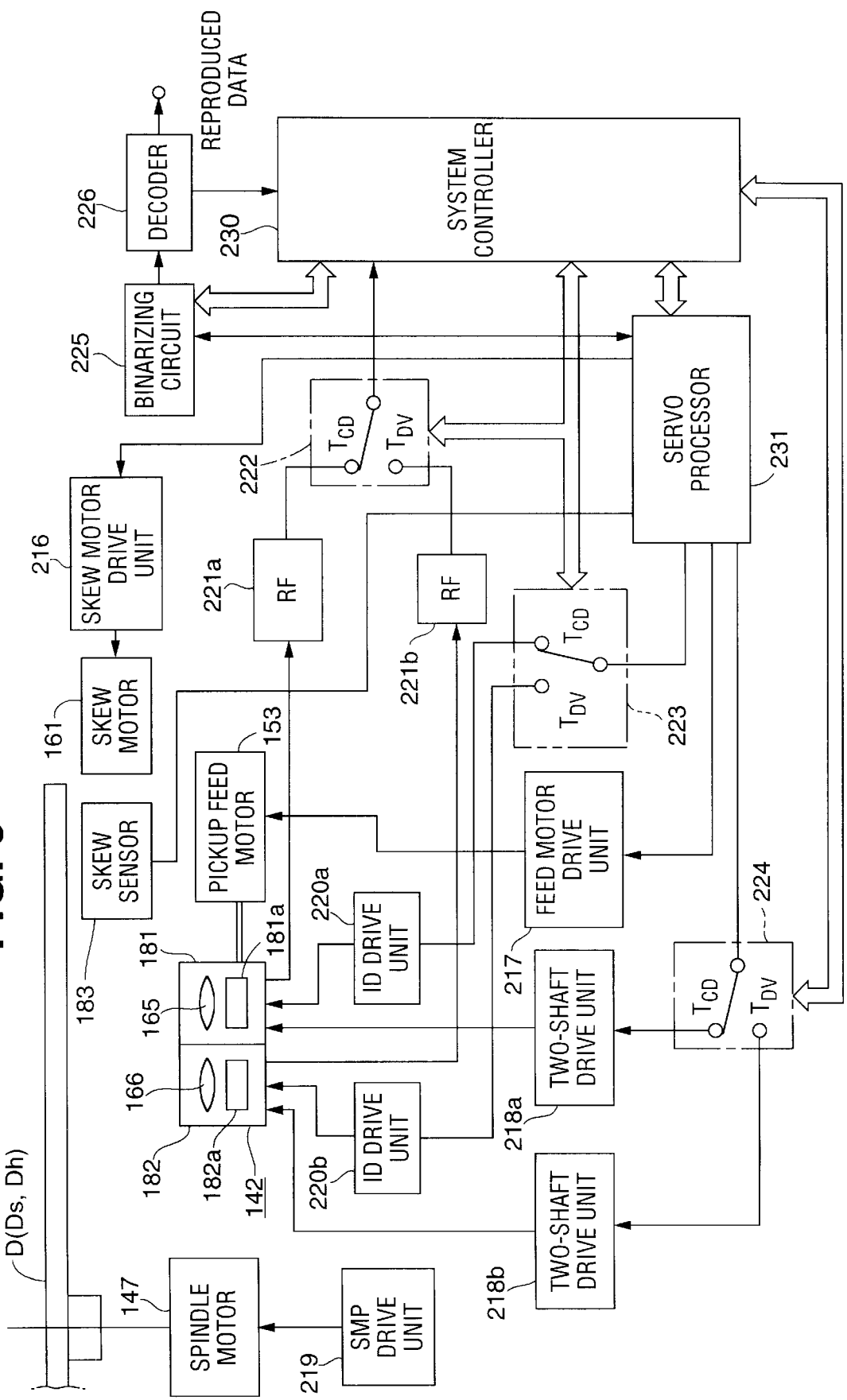
FIG. 9 is a block diagram showing a control circuit unit of the disk drive apparatus shown in FIG. 1.
Figure 10:
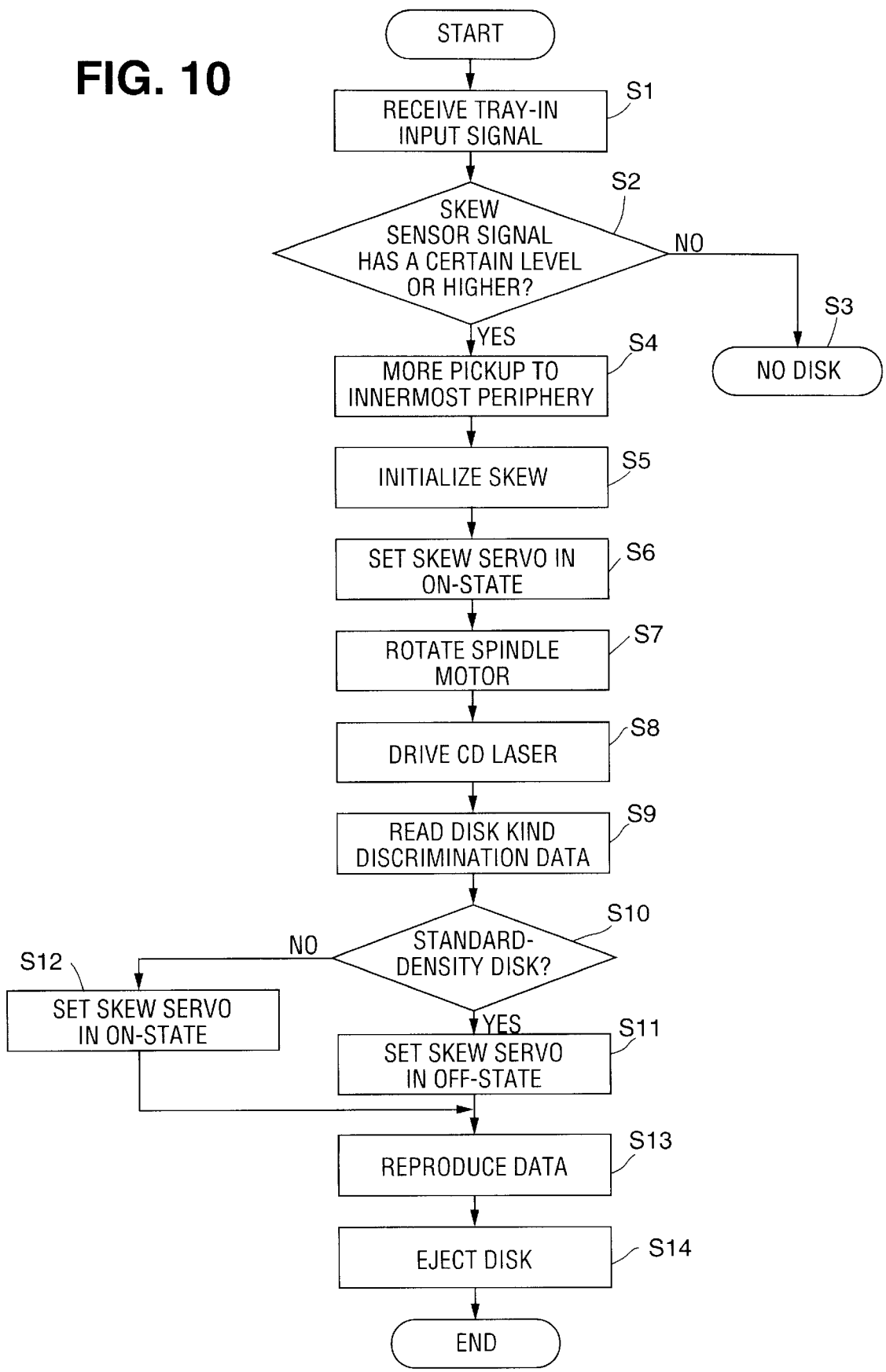
FIG. 10 is a flowchart used to explain a control operation of the control circuit unit of the disk drive apparatus shown in FIG. 1.
Figure 11:
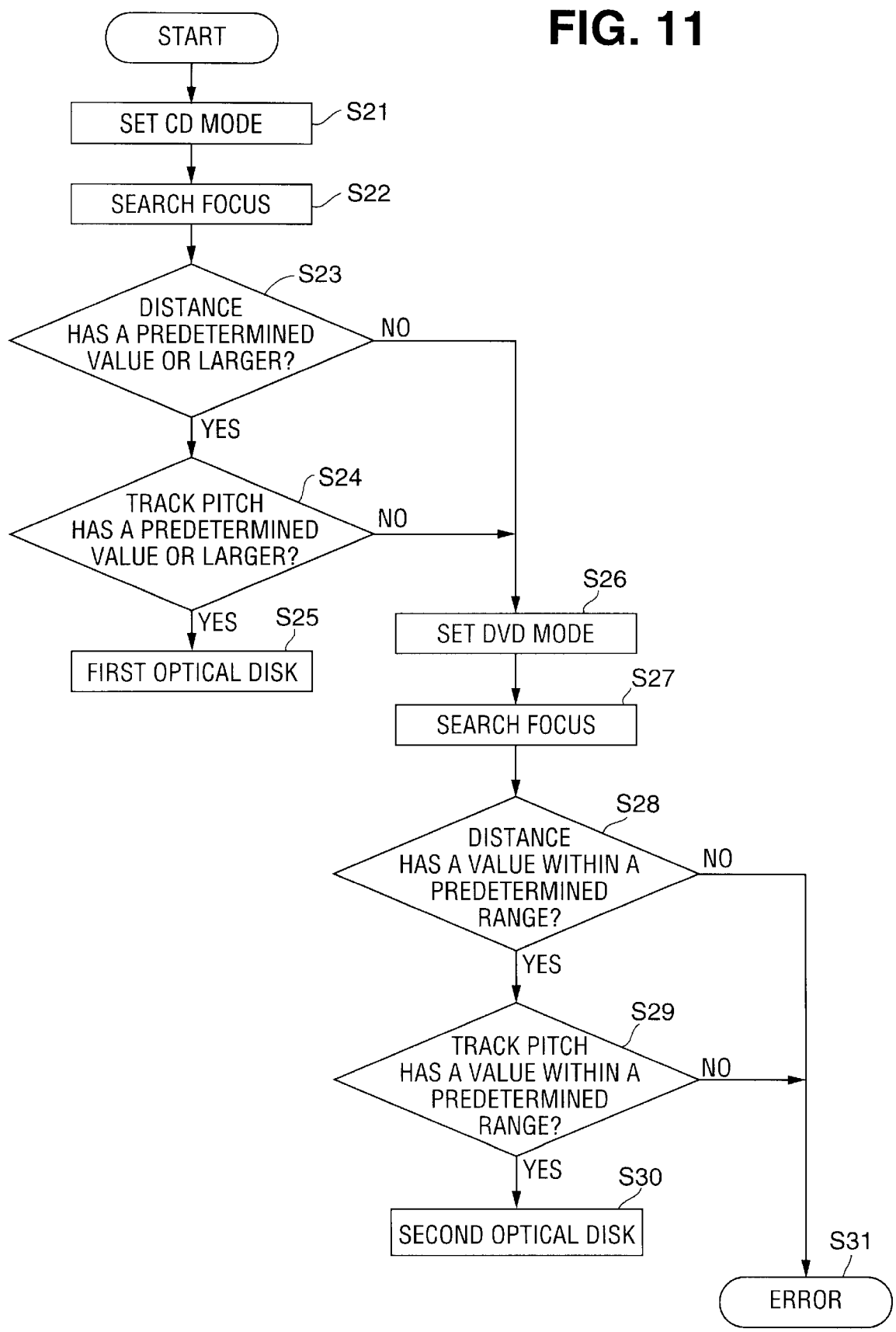
FIG. 11 is a flowchart used to explain the control operation of the control circuit unit of the disk drive apparatus shown in FIG. 1 and a specific operation carried out when an optical disk having no disk kind discrimination data recorded thereon is loaded.

As shown in FIG. 10, in step S1, when receiving a signal from the loading detection switch 133 for detecting movement of the disk tray 102 to the loading position, a system controller 230 as a control means shown in FIG. 9 operates a servo processor 231. Then, the processing proceeds to step S2.

In step S2, the servo processor 231 determines which optical disk D is mounted on the disk tray 102, based on the level of the output signal from the skew sensor 183.

Specifically, the skew sensor 183 emits light to the optical disk D and measures a time from the emission to reception of the reflected light, thereby detecting a distance therefrom to the information recording surface thereof. The skew sensor outputs the detection signal having a level in inverse proportion to the measured distance, for example. Therefore, if the disk tray 02 is not mounted with the optical disk D, then the level of the detection signal becomes small.

Based on the detection signal of the skew sensor 183, the servo processor 231 determines whether or not the level of the detection signal is equal to or larger than a predetermined value, and then determines whether or not the optical disk D is mounted on the disk tray. If the optical disk D is mounted on the disk tray, then the processing proceeds to step S4. If on the other hand the optical disk D is not mounted thereon, then the processing proceeds to step S3.

in step S3, the servo processor 231 transmits to the system controller 230 data indicative of that the optical disk D is not mounted on the disk tray. Based on this data, the system controller 230 control the whole disk drive apparatus not to carry out further operations and gives an information to that effect to a host computer.

On the other hand, in step S4, the servo processor 231 transmits a signal used for moving the optical pickup device 142 to an innermost periphery of the optical disk D to the motor feed motor drive unit 2117 of the pickup moving mechanism 152. The feed motor drive unit 217 amplifies the received signal and drives the pickup feed motor 153. Thus, the optical pickup device 142 is positioned at the innermost periphery of the optical disk D. Then, the processing proceeds to step S5.

In step S5, the servo processor 231 carries out the control for adjusting (initializing) the positional relationship between the optical disk D and the optical pickup device 142 to be in the predetermined initial state. Specifically, the servo processor 231 transmits a signal used for the initialization to a skew motor drive unit 216 of a skew control mechanism 160. The skew motor drive unit 216 amplifies the received signal and then drives the skew motor 161.

More specifically, in a state that the optical pickup device 142 is positioned at the innermost periphery of the optical disk D, the system controller 230 carries out the skew control through the servo processor 231 based on the detection signal from the skew sensor 183. Thus, the posture of the optical pickup device 142 is adjusted so that the optical axes of the objective lenses 165, 166 should be perpendicular to the information recording surface of the innermost periphery of the optical disk D.

As a result, the positional relationship between the optical disk D and the first and second objective lenses 165, 166 is set in the best state.

In step S6, the servo processor 231 sets the skew servo in its on-state. Specifically, based on the detection signal from the skew sensor 183, the servo processor 231 transmits to the skew motor drive unit 216 a signal which makes the level of the detection signal constant. Then, the processing proceeds to step S7.

In step S7, the servo processor 231 transmits to a spindle motor drive unit 219 a signal used for rotating the spindle motor 147 at a speed of a rotation number which is a standard for a CD player. The spindle motor drive unit 219 amplifies the received signal and then drives the spindle motor 147. Thus, the optical disk D is rotated together with the disk table 149. At this time, the rotation velocity of the spindle motor 147 is detected, and based on the detection, the servo control for setting the rotation of the optical disk D at a constant linear velocity (CLV) is carried out (a rotation detecting mechanism and so on, not shown).

Then, in step S8, the system controller 230 controls three changeover switches 222, 223, 224 so that their changeover contacts TCD are connected to their movable contacts. The servo processor 231 transmits to a laser diode drive unit 220a a signal used for making a laser diode 181a of the first pickup unit 181 for CD emit light. The laser diode drive unit 220a amplifies the received signal so that a level of emitted light should be a level suitable for reproduction, and then makes the laser diode 181a emit light.

Laser light emitted from the laser diode 181a is condensed by the first objective lens 165 of the first pickup unit 181, irradiated on the information recording surface of the optical disk D, and then reflected by the information recording surface thereof. A level of the reflected light is varied depending upon existence or absence of a pit, for example, previously formed on the information recording surface of the optical disk D. Though not shown, returning light is separated by a beam splitter, and then made incident on a photodetector. The photodetector outputs a RF (high frequency) signal corresponding to a light amount of the returning light.

As a result, the optical pickup device 11142 outputs the RF signal corresponding to the information (data) recorded on the optical disk D. The optical pickup device 142 also outputs a focus error signal and a tracking error signal by a so-called astigmatism method, a differential amplification method and the like other than the RF signal.

In step S9, since optical pickup device 142 is moved to the innermost periphery of the optical disk D, i.e., a position where a TOC (table of contents: index) is recorded, the optical pickup device 142 outputs an RF signal corresponding to the TOC to an RF signal amplifier 221a. When receiving the signal, the RF signal amplifier 221a equalizes a waveform of this signal and amplifies the signal, supplying it through the changeover switch 222 to a binarizing circuit 225. The amplifier also supplies the focus error signal and the tracking error signal to the servo processor 231.

Thus, the binarizing circuit 225 reproduces an EFM-modulated data by discriminating the RF signal and supplies the reproduced data to a decoder 226. The decoder 226 decodes the modulated data and supplies the obtained reproduced data to the system controller 230. Since the reproduced data is the data corresponding to the TOC, the reproduced data includes a kind discrimination data used for discriminating a kind of the optical disk D. Moreover, when the a normal reproduction is carried out after termination of the determination of the optical disk D described later on, the decoder 226 outputs the reproduced data to the host computer.

In step S10, the system controller 230, based on the disk kind discrimination data supplied from the decoder 226, determines whether or not the optical disk D loaded onto the disk table 149 at present is the standard-density disk Ds (or the high-density disk Dh). If the optical disk to be discriminated is the high-density disk Dh, then the second mode is selected and then the processing proceeds to step S12. If on the other hand the disk to be discriminated is the standard-density disk Ds, then the first mode is selected and then the processing proceeds to step S11.

In step S11, the system controller 230 transmits to the servo processor 231 data indicative of that the optical disk D loaded onto the disk table 149 is the standard-density disk Ds such as the CD, the CD-ROM or the like. Based on this data, the servo processor 231 keeps the skew motor drive unit 216 in its state set by adjustment in step S5 regardless of the value of the detection signal from the skew sensor 183 and stops the skew servo.

On the other hand, in step S12, the system controller 230 transmits to the servo processor 231 data indicative of that the optical disk D loaded onto the disk table 149 is the high-density disk Dh such as the DVD, the HD-CD or the like. Based on the data, the servo processor 2311 keeps the skew servo in its on-state and outputs to the spindle motor drive unit 219 a signal used for rotating the spindle motor 147 at a speed of a rotation number which is a standard for the DVD. Moreover, the system controller 230 controls the three changeover switches 222, 223, 224 so that their switch contacts TDV should be connected to their movable contacts, respectively. Then the processing proceeds to step S13.

In step S13, the data is reproduced in response to the kind of the optical disk D. Specifically, if the optical disk D loaded onto the disk table 149 is the high-density disk Dh, then the servo processor 231 transmits a signal used for making the laser diode 182a for the high-density disk emit the light through the changeover switch 223 to the laser diode drive unit 220b. The laser diode drive unit 220b amplifies the received signal so that the level of the emission light should be a level suitable for the reproduction, and then makes the laser diodes 182a emit light.

If the optical disk D loaded thereonto is the standard-density disk Ds, then the servo processor 231 carries out the above operation in step S8. Moreover, it is needless to say that, based on the focus error signal and the tracking error signal supplied through the changeover switch 222, the servo processor 231 transmits a control signal to a two-shaft drive unit 218a or a two-shaft drive unit 218b so that the levels of the focus error signal and the tracking error signal should be set to 0, for effecting the focus servo and the tracking servo.

In step S14, when a user carries out an operation for finishing reproduction of the data, the system controller 230 transmits a control signal for termination of reproduction to the servo processor 231. The servo processor 231 outputs a control signal to the spindle motor drive unit 219 to stop the rotation of the spindle motor 147, and outputs a control signal to the feed motor drive unit 217 to finish a reproduction operation of the optical pickup device 142.

Substantially simultaneously therewith, the system controller 230 outputs a control signal for releasing the loading state to the loading drive mechanism 106, and the optical disk D is detached from the disk table 149 by the above reverse operation of the loading motor 116 and the like to be mounted on the disk tray 102. Then, the disk tray 102 is drawn and the disk holding portion 103 is exposed to the front of the apparatus body 105. Thus, the ejecting operation is finished, and then the state that the optical disk D can be drawn is set.

There may be employed such an arrangement that after the processing in step S14, the processing similar to that in step S5 is carried out and the ejecting operation for ejecting the optical disk D is carried out, thereafter the optical pickup device 142 being always brought in its initial state.

In the above specific explanation of the operation, it is assumed that the disk kind discrimination data used for discriminating the kind of the optical disk is previously recorded as the TOC on the optical disk D. A specific operation carried out when the disk kind discrimination data is not recorded on the optical disk D will be described with reference to FIG. 111 which is a flowchart therefor.

In step S21, the system controller 230 controls the servo processor 231 and the three changeover witches 222, 223, 224 to operate the disk drive apparatus 100 in the CD mode which is the first mode. Specifically, the servo processor 231 rotates the spindle motor 147 at the same speed as that used for the CD, makes the laser diode 181a emit light, and connects the changeover contacts TCD of the three changeover switches 222, 223, 224 to their movable contacts, thereby setting the tracking servo in its on-state.

In step S22, the system controller 230 transmits a command for detecting a focus distance of the first objective lens 165 of the first pickup unit 181 to the servo processor 231. Thus, the servo processor 231 outputs through the changeover switch 224 to the two-shaft drive unit 218a a signal having a level linearly changed such that the objective lens 165 is gradually brought close to or away from the optical disk D.

At this time, the servo processor 231 monitors the focus error signal supplied thereto through the changeover switch 222 and detects a level of the signal supplied therefrom to the two-shaft drive unit 218a and obtained when the level of the focus error signal becomes 0. the servo processor 231 supplies the system controller 230 a data indicative of the level, i.e., a data indicative of the focus distance of the objective lens 165 from the information recording medium of the optical disk D. Then, the processing proceeds to step S23.

In step S23, the system controller 230 determines whether or not the data indicative of the distance and supplied from the servo processor 231 has a predetermined value or larger. If it is determined that the supplied data indicative of the distance has a predetermined value or greater, then the processing proceeds to step S24. If on the other hand it is determined that the data has a value smaller than the predetermined value, then the processing proceeds to step S26.

In step S25, the system controller 230 determines that the optical disk D mounted on the disk tray 102 is the standard-density disk Ds such as the CD or the like. Then, the processing proceeds to step S13 in the flowchart shown in FIG. 10, and thereafter the operations in the succeeding steps are carried out.

On the other hand, in step S26, the system controller 230 controls the servo processor 231 and the three changeover switches 222, 223, 224 to operate the disk drive apparatus in the DVD mode which is the second mode. Specifically, the servo processor 231 rotates the spindle motor 147 at the same speed as that used for the DVD, makes the laser diode 182a emit light, and connects the changeover contacts TDV of the three changeover switches 222, 223, 224 to their movable contacts, thereby setting the tracking servo in its on-state. Then, the processing proceeds to step S27.

In step S27, the system controller 230 transmits a command for detecting a focus distance of the second objective lens 166 of the second pickup unit 182 to the servo processor 231. Thus, the servo processor 231 outputs through the changeover switch 224 to the two-shaft drive unit 218b a signal having a level linearly changed such that the objective lens 166 is gradually brought close to or away from the optical disk D.

At this time, the servo processor 231 monitors the focus error signal supplied thereto through the changeover switch 222 and detects a level of the signal supplied therefrom to the two-shaft drive unit 218b and obtained when the level of the focus error signal becomes 0. the servo processor 231 supplies the system controller 230 a data indicative of the level, i.e., a data indicative of the focus distance of the objective lens 166 from the information recording medium of the optical disk D. Then, the processing proceeds to step S28.

In step S28, the system controller 230 determines whether or not the data indicative of the distance and supplied from the servo processor 231 has a value within a predetermined range. If it is determined that the supplied data indicative of the distance has a value within a predetermined range, then the processing proceeds to step S29. If on the other hand it is determined that the data does not have a value within the predetermined range, then the processing proceeds to step S31.

In step S29, the servo processor 231 outputs to the system controller 230 a data indicative of the level of the signal supplied to the feed motor drive unit 217, i.e., a data indicative of the track pitch, for moving linearly the optical pickup device 142. Based on the supplied data, the system controller 230 determines whether or not the data has a value within the predetermined range. If it is determined that the data has a value within the predetermined range, then the processing proceeds to step S30. If on the other hand it is determined that the data does not have a value within the predetermined range, then the processing proceeds to step S3.

In step S30, the system controller 230 determines that the optical disk D loaded onto the disk table 149 is the high-density disk Ds such as the DVD or the like. Then, the processing proceeds to step S13 in the flowchart shown in FIG. 10, and thereafter the operations in the succeeding steps are carried out.

In step S31, the system controller 230 determines that the optical disk D is not loaded onto the disk table 149 or that the loaded disk is not the standard-density disk Ds such as the CD or the like or the high-density disk Dh such as the DVD or the like. Then, the system controller 230 controls the whole disk drive apparatus not to carry out further operations, and gives the host computer information to that effect.

While in the first embodiment the optical disk exposed to an outside such as the CD or the like is employed as the information recording medium, the present invention is not limited thereto, and a disk cartridge having a cartridge housing an optical disk may be employed. While in the above embodiment the apparatus only for reproducing the data recorded on the optical disk D is described, the present invention can be applied to a recording and reproduction type disk storage apparatus having a data recording means.

A disk drive apparatus according to the second embodiment to which the present invention is applied will be described with reference to FIGS. 12 to 28.

A disk drive apparatus of the second embodiment is a disk-tray type apparatus which can employ as an information recording medium any of the optical disks D of the standard-density disk Ds having a diameter of 12 cm such ass the CD, the CD-ROM or the like and the high-density disk Dh having the same diameter of 12 cm such as the DVD, the HD-CD or the like, automatically loads the optical disk onto an apparatus body by a disk tray, and reproduces (reads) information recorded on the optical disk.

[outline of the disk drive apparatus of second embodiment]

Figure 12:
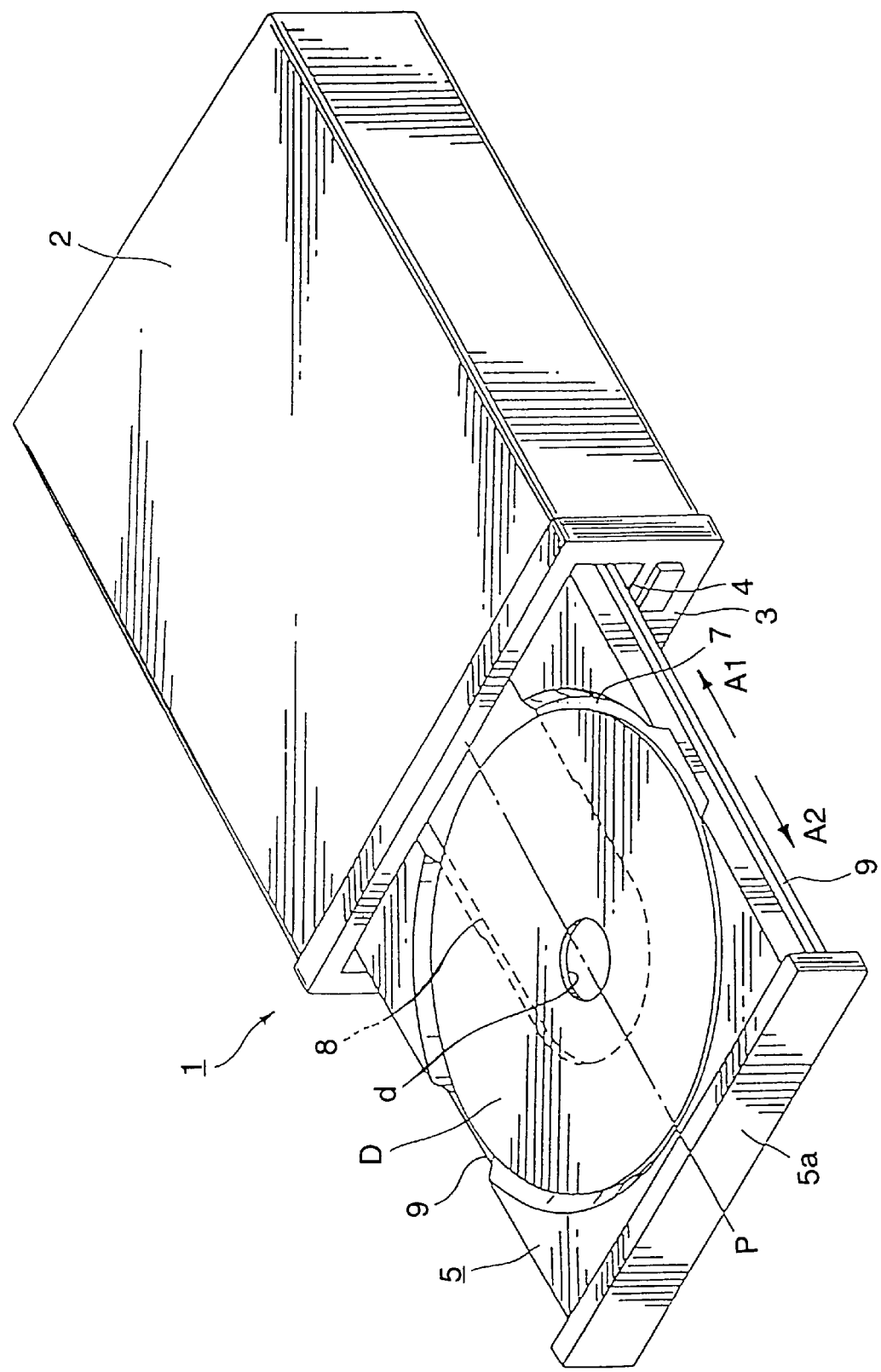
FIG. 12 is a perspective view showing an appearance of a disk drive apparatus according to a second embodiment of the present invention in a state that a disk tray is projected.
Figure 13:
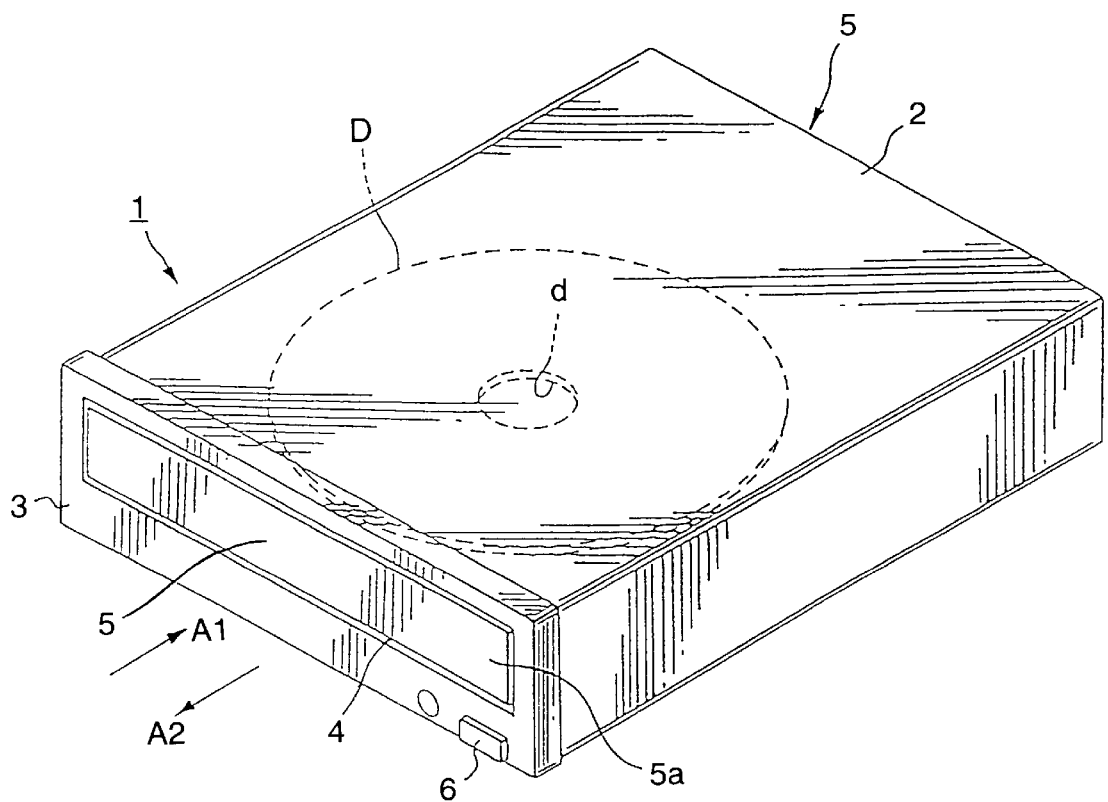
FIG. 13 is a perspective view showing the appearance of the disk drive apparatus shown in FIG. 12 in a state that the disk tray is drawn.

An outline of the disk drive apparatus according to the second embodiment will be described. As shown in FIGS. 12 and 13, a disk drive apparatus 11 has a flat, box-shaped apparatus body having an opening portion at its front surface, and a front surface panel 3 integrally fitted to the opening portion of the apparatus body 2. A chassis 12 is housed in the apparatus body 2.

The front surface panel 3 has a tray slot 4, while a disk tray 5 is inserted into the apparatus body 2 so as to be able to be ejected therefrom. A front surface plate 5a of the disk tray 5 closes the tray slot 4. Moreover, the front surface panel 3 has an ejection button 6 for discharging the disk tray 5. It is preferable that the material of the apparatus body 2 be a steel plate and the material of the front surface panel 3 and the disk tray 5 be synthetic resin, such as ABS resin or the like. The apparatus 2 may be made of synthetic resin and the disk tray 5 or the like may be made of metal, such as an aluminum alloy and so on.

[disk tray and loading mechanism]

Figure 14:
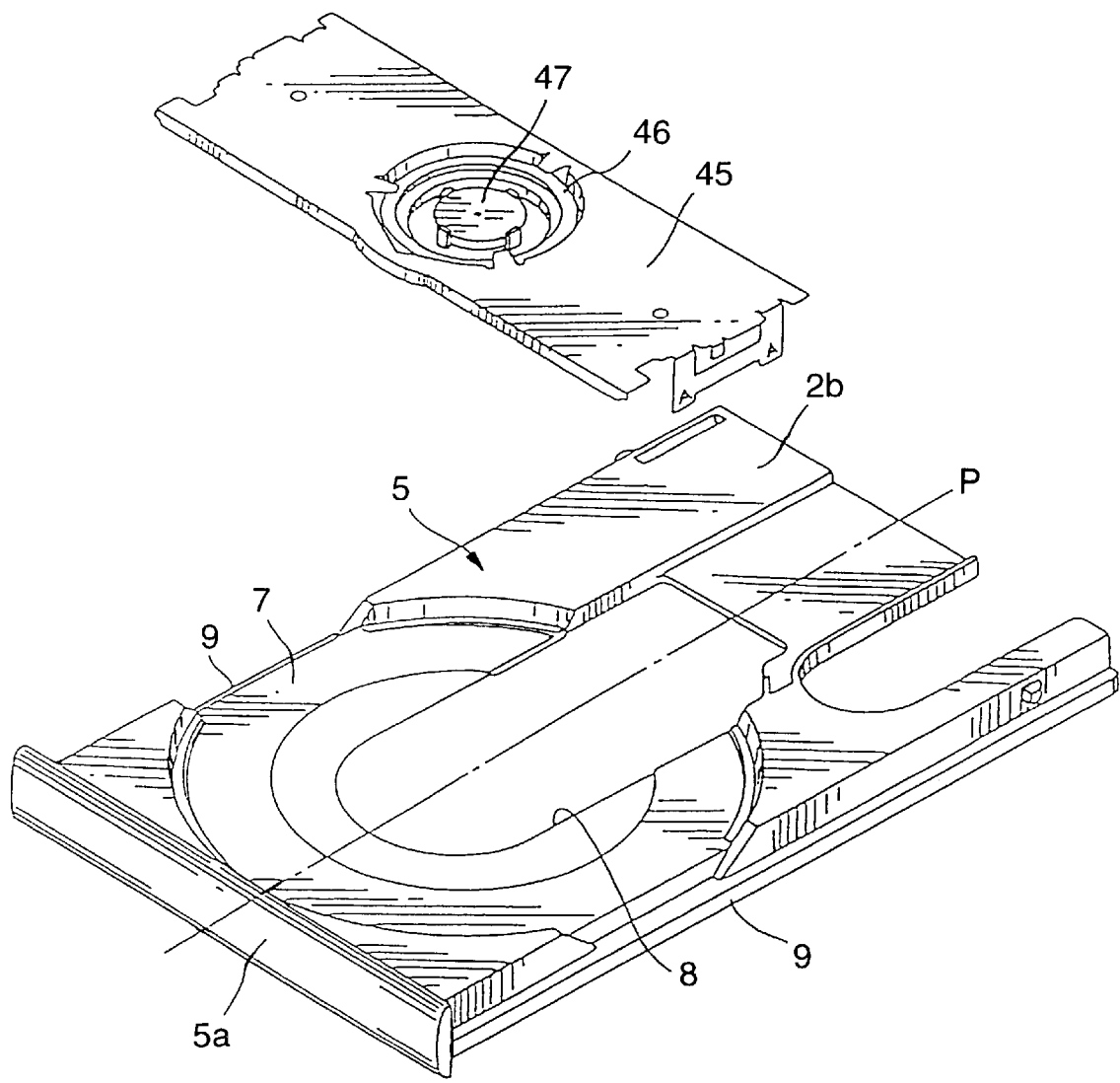
FIG. 14 is a perspective view showing a disk tray and a disk damper of the disk drive apparatus shown in FIG. 12.

As shown in FIG. 14, the disk tray 5 has, on the top surface thereof, a disk holding portion 7 in the form of a recess capable of housing an optical disk D, such as a CD, DVD or the like, which is a practical example of the optical disk, such that the optical disk is laid down, and an elongated-hole-shaped bottom surface opening 8 extending backwards from the central portion of the disk holding portion 7 along a tray center P. A pair of right and left guide rails 9, 9 extending in parallel to the tray center P are formed integrally with the right and left side edges of the disk tray 5.

Figure 15:
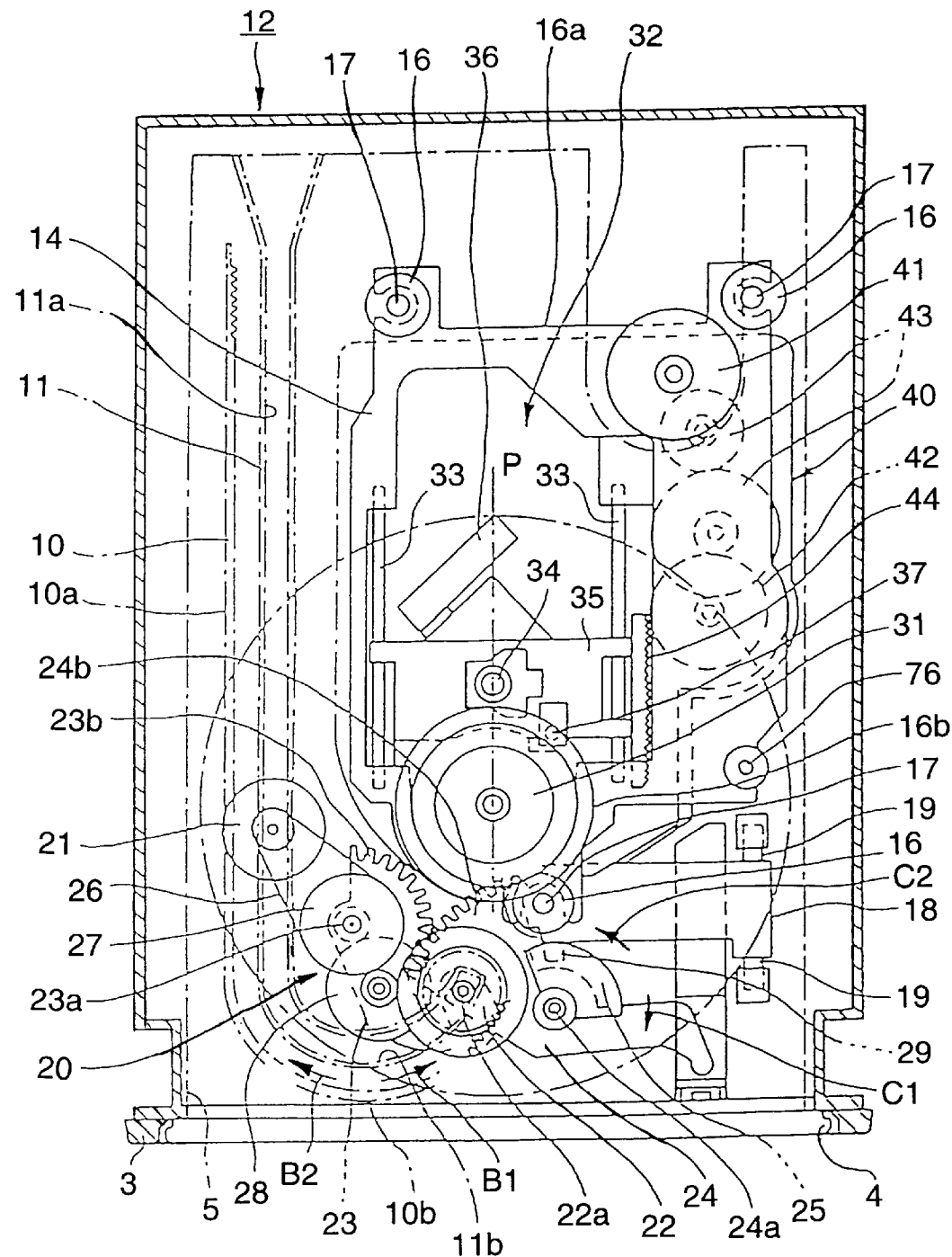
FIG. 15 is a plan view showing an internal structure of a chassis of the disk drive apparatus shown in FIG. 12 in a state that the disk tray is drawn to a loading position.

The disk tray 5 has a lower surface in which a rack 10 and a guide groove 11, as shown in FIG. 15, each of which is formed into a J-letter shape and which is extended in parallel to each other are formed. Straight portions 10a and 11a of the rack 10 and the guide groove 11 are formed to run parallel to the tray center P. Arc portions 10b and 11b continued to the straight portion 10a and 11a are formed at end portion of the disk tray at the side of the front surface plate 5a.

When the optical disk D, such as a CD, a DVD or the like, is horizontally placed in the disk holding portion 7 of the disk tray 5 as shown in FIG. 12 and the front surface plate 5a is slightly depressed so as to insert the disk tray 5 into the apparatus body 2, a loading switch (not shown) is turned on so that a loading mechanism to be described later is operated. As a result, the disk tray 5 is horizontally introduced into the apparatus body 2 through the tray slot 4 of the front panel 3.

Figure 16:
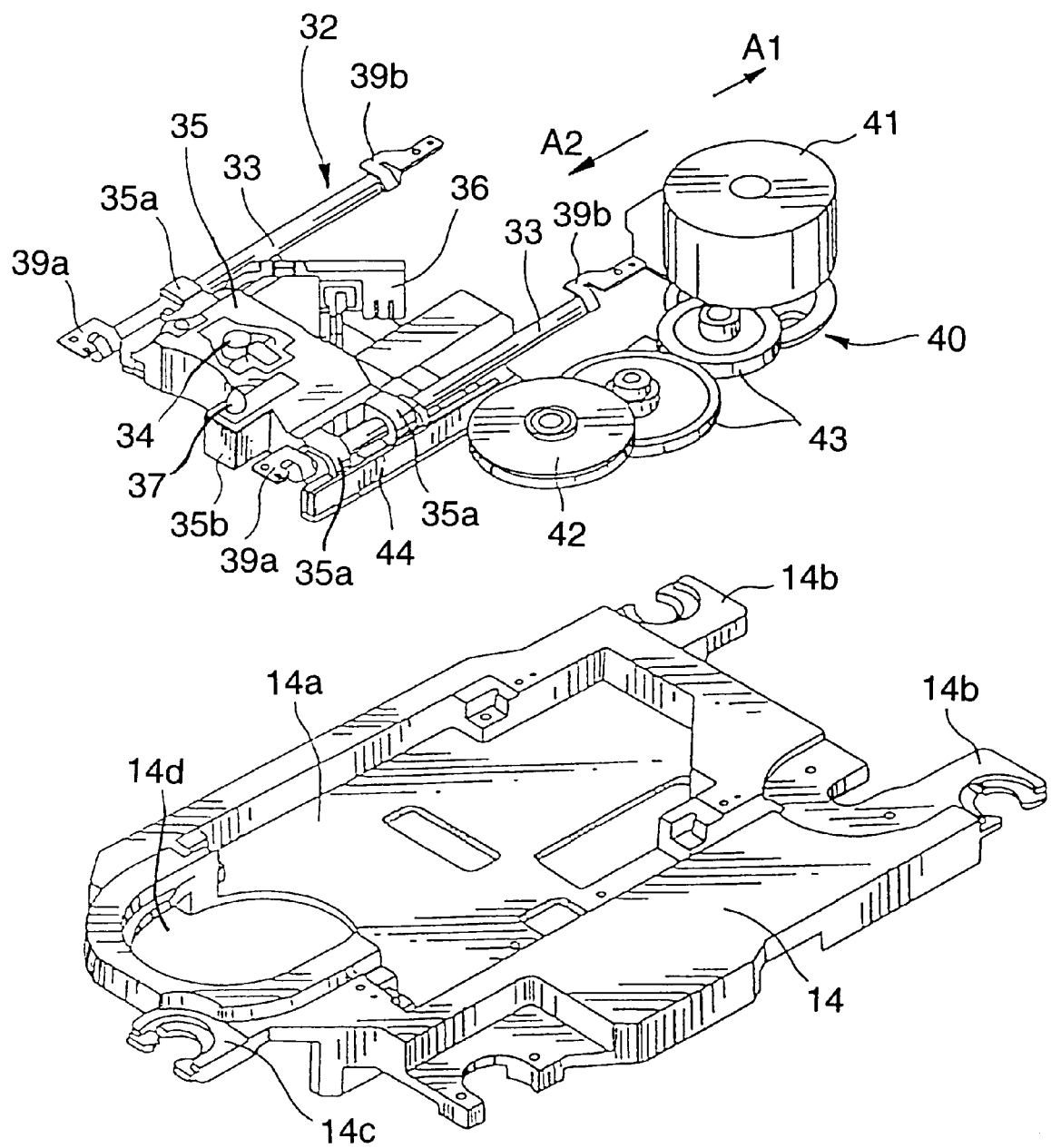
FIG. 16 is a perspective view showing a lifting and lowering frame and an optical pickup device of the disk drive apparatus shown in FIG. 12.
Figure 17:
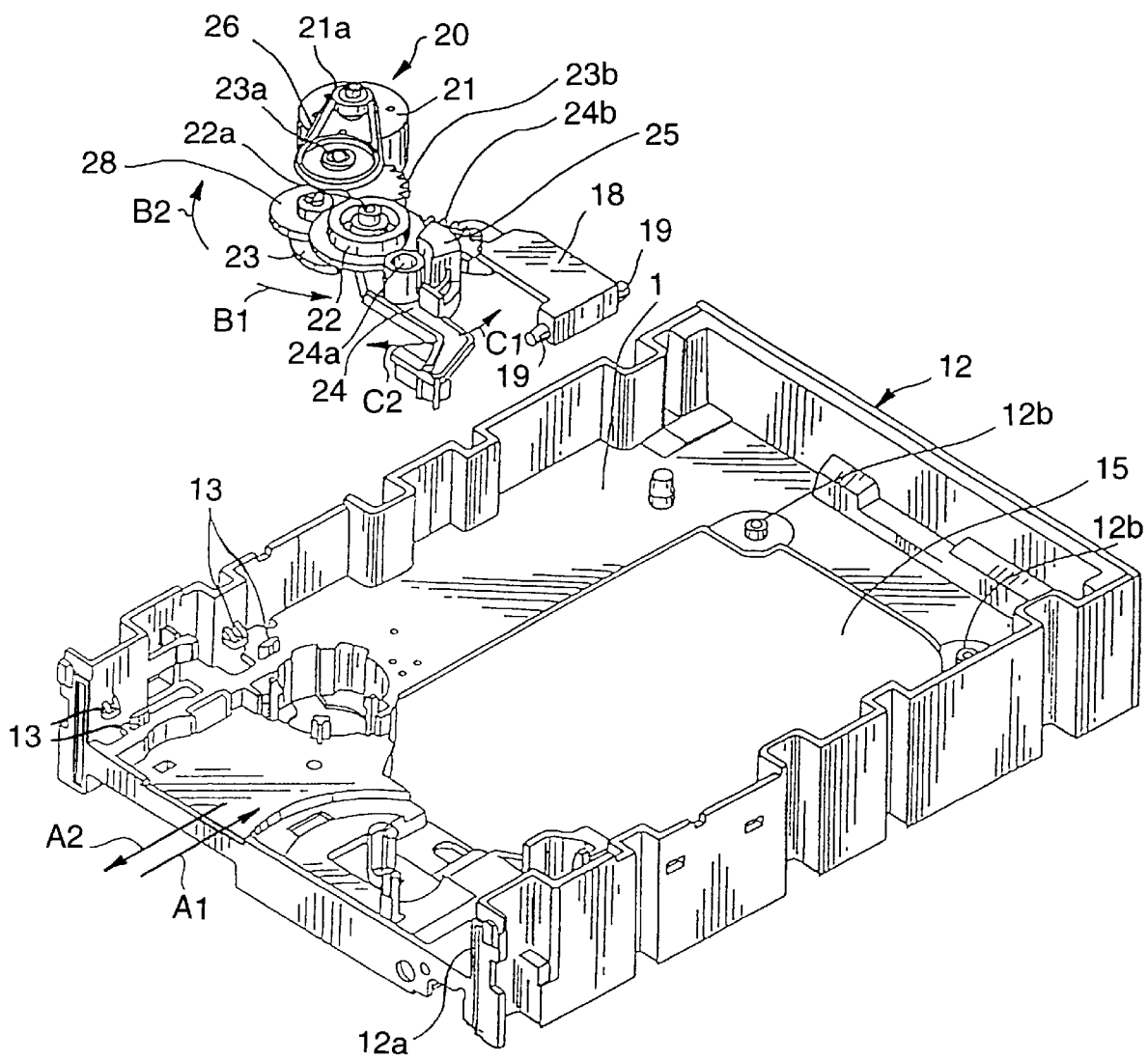
FIG. 17 is a perspective view showing the chassis and a loading drive mechanism of the disk drive apparatus shown in FIG. 12.

The apparatus body 2 accommodates therein a chassis 12 made of synthetic resin or the like. The chassis 12 is formed into a four-sided housing having a small depth, as shown in FIG. 17, and has at its front surface facing the front surface panel 3 provided with a notch portion 12a corresponding to the tray slot 4. At the inside of the notch portion 12a, there provided a plurality of tray guides 13 formed integrally to restrict the positions of the pair of the right and left guide rails 9 provided on the disk tray 5. The disk tray 5 is guided by the tray guides to be capable of moving in the forward and backward directions A1, A2 with respect to the apparatus body 2 so as to be introduced and discharged through the tray slot 4. The chassis 12 has, at the substantially central portion of the bottom surface thereof, a bottom opening portion 15 through which a swing frame 14 made of synthetic resin or the like can be introduced and discharged. A pair of right and left positioning projections 12b for positioning the two rear ends of the swing frame 14 and supporting the same such that the swing frame can be swung are formed at the two side ends in the deep portion of the bottom opening 15. The swing frame 14 is made of a plate member provided with a recess 14a having a small depth as shown in FIG. 16. A pair of insulator fitting portions 14b are formed at the right and left ends of the rear portion of the swing frame 14 to correspond to a pair of positioning projections 12b. Moreover, an insulator fitting portion 14c is formed in the front central portion of the swing frame 14.

Figure 18:
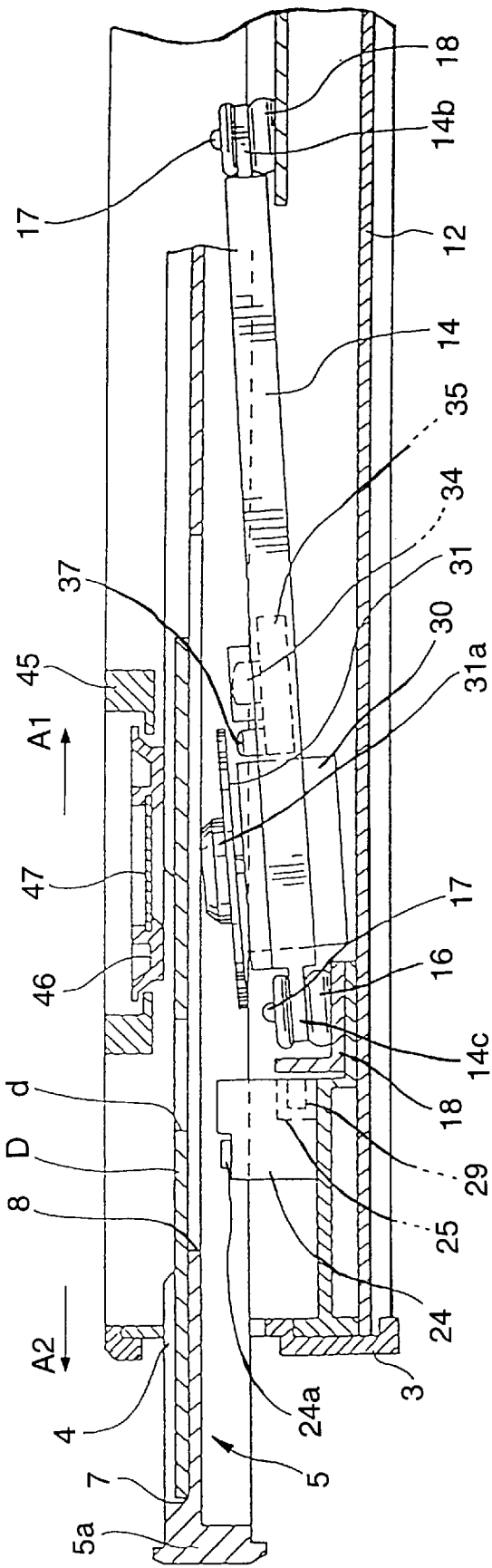
FIG. 18 is a longitudinal cross-sectional view showing the chassis and the disk tray of the disk drive apparatus shown in FIG. 12 in a state that the disk tray is ejected.

Insulators 16 made of an elastic member such as rubber and so on are attached to the insulator fitting portions 14*b* and 14*c* of the swing frame 14 (see FIG. 18 and so forth). The insulators 16 attached to the pair of the right and left insulator fitting portions 14*b* provided for the rear portion of the swing frame 14 are engaged to the pair of the right and left positioning projections 12*b* of the chassis 12. Each of the insulators is supported by the bottom plate of the chassis 12 by a fixing screw 17 such that the mount insulators can be swung. Each insulator 16 attached to the insulator receiving portion 14*c* formed in the front portion of the swing frame 14 is, by the fixing screw 17 inserted into the central portion of the mount insulator, attached to the leading end of an elevation drive lever 18.

Figure 19:
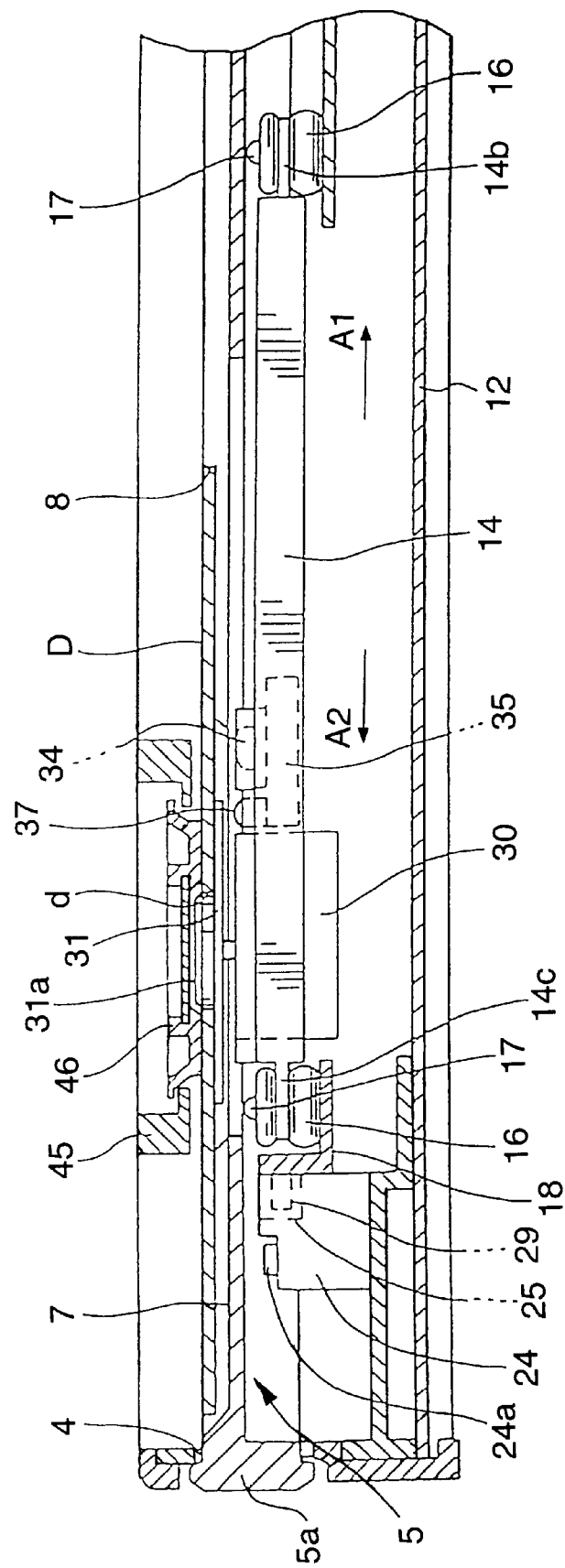
FIG. 19 is a longitudinal cross-sectional view showing the chassis and the disk tray of the disk drive apparatus shown in FIG. 12 in a state that the disk tray is in its loading state.
Figure 20:
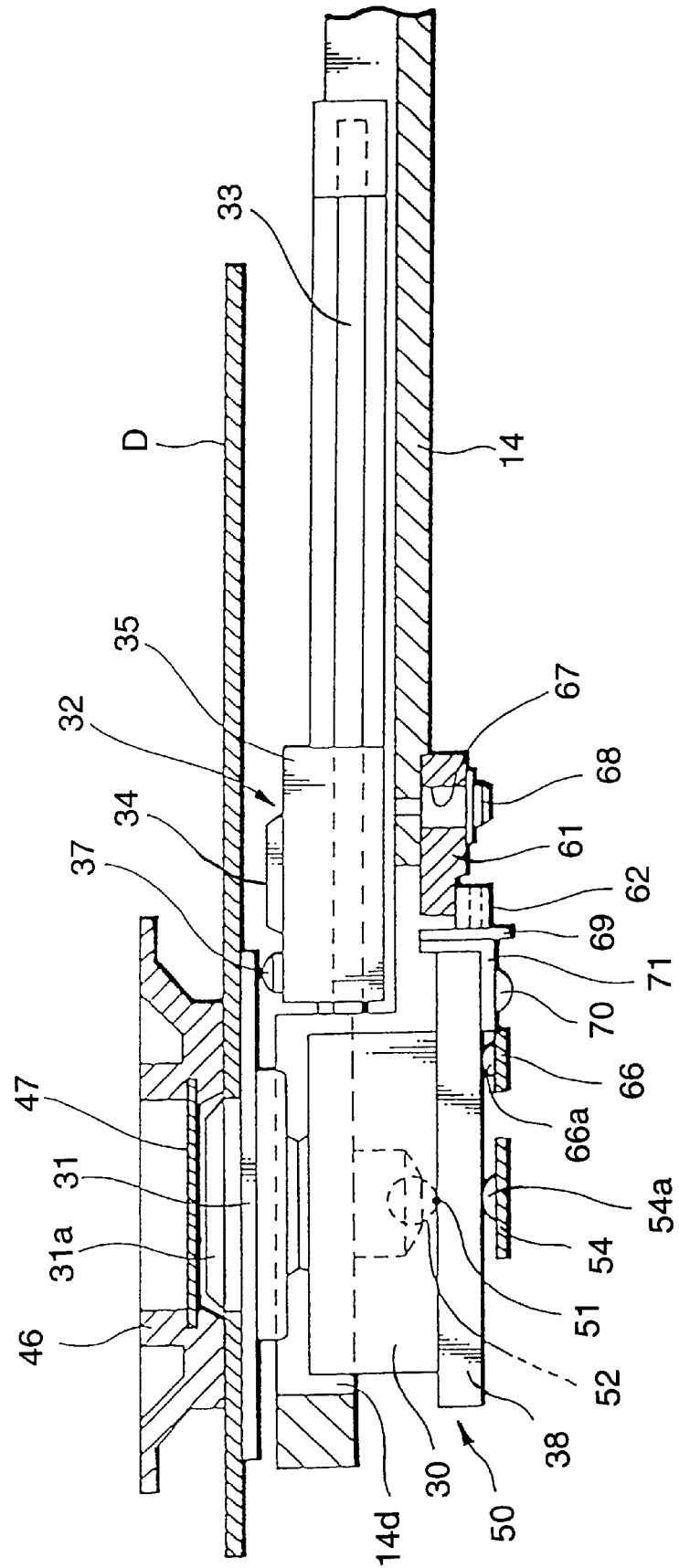
FIG. 20 is a cross sectional view cut along aline X—X in FIG. 22 used to explain a skew control mechanism of the disk drive apparatus shown in FIG. 12.

The elevation drive lever 18 is, as shown in FIG. 17 and so forth, disposed perpendicular to the tray center P and vertically movably supported on the bottom plate of the chassis 12 by a pair of fulcrum pins 19, 19 disposed at the two ends of the base of the elevation drive lever 18 and having a common axial line. When the elevation drive lever 18 is vertically swung, the swing frame 14 is, as shown in FIGS. 18 and 19, vertically swung such that the pair of the mount insulators 16 disposed in the rear portion serve as the fulcrums. The structure is formed such that the swing frame 14 is substantially horizontal when the elevation drive lever 18 is positioned at the top end.

To vertically swing the elevation drive lever 18 to perform the loading operation and the unloading operation, a loading mechanism 20 is provided at the front side of the bottom plate of the chassis 12. The loading mechanism 20, as shown in FIG. 17 and so forth, has a loading motor 21 secured to the chassis 12, a drive gear 22 which can be rotated forwards and reversely by the loading motor 21, a gear lever 23 on which a support shaft 22*a* of the drive gear 22 is planted and which is enabled to perform a swinging motion by a fulcrum shaft 23*a* planted on the chassis 12, a lock lever 24 having a partial gear 24*b* arranged to be engaged to a partial gear 23*b* provided on the gear lever 23 and arranged to be rotated by a fulcrum shaft 24*a* planted on the chassis 12 and so on. The lock lever 24 is provided with a cam groove 25 for vertically moving the elevation drive lever 18.

A drive pulley 21*a* secured to the rotational shaft of the loading motor 21 is connected to a driven pulley 27 through a rubber belt 26 serving as a power transmission medium in such a manner that power can be transmitted. The driven pulley 27 is integrally formed with a gear at an end of a gear train 28, while a gear at another end of the gear train 28 is formed integrally with the drive gear 22.

Further, as shown in FIG. 15, the drive gear 22 is engaged to the rack 10 of the disk tray 5. The support shaft 22*a* of the drive gear 22 is slidably received in the guide groove 11. By guiding the support shaft 22*a* of the drive gear 22 by the J-shape guide groove 11 of the disk tray 5, the drive gear 22 can be moved along the J-shape rack 10.

The cam groove 25 of the lock lever 24 is warped into a circular arc shape surrounding the fulcrum shaft 24*a*, the cam groove being formed such that predetermined stepped portions formed in the vertical direction are connected at arbitrary angle of inclination. A cam pin 29 formed in a side portion at the leading end of the elevation drive lever 18 is slidably received in the cam groove 25. Therefore, the cam pin 29 is moved vertically for a distance corresponding to the size of the steps of the cam groove 25. The vertical movement of the cam pin 29 switches the attitude of the swing frame 14 between the unloading state shown in FIG. 18 in which the swing frame 14 is inclined downwards and a loading state shown in FIG. 19 in which the same is positioned substantially horizontally.

When the disk tray 5 is loaded, the drive gear 22, which is rotated forwards by the loading motor 21, linearly moves the straight portion 10*a* of the rack 10 from the rear portion of the disk tray 5 toward the front portion. Thus, the disk tray 5 can be horizontally introduced into the apparatus body 2. By continuously rotating the drive gear 22 in the forward direction, the drive gear 22 can be moved in a direction shown by an arrow B1 along the circular arc portion 10*b* of the rack 10 to form a circular arc locus. As a result of the circular arc motion of the drive gear 22, the swinging operation of the gear lever 23 is performed.

The swinging motion of the gear lever 23 causes rotational force to be transmitted from the partial gear 23*b* to another partial gear 24*b* so that the lock lever 24 is rotated around the fulcrum shaft 24*a* in a direction indicated by an arrow $b_1$. As a result, the cam groove 25 of the lock lever 24 is rotated so that the cam pin 29 received in the cam groove 25 is moved upwards along the inclined surface from the most downward position at lower end position to the uppermost position at the top end of the cam groove. Thus, the elevation drive lever 18 is swung upwards. As a result, the swing frame 14 is moved upwards from the downward position at which the same is diagonally inclined in the diagonal direction as shown in FIG. 18 to the upward position at which the same is made to be horizontal as shown in FIG. 19.

When the disk tray 5 is ejected, an operation contrary to that which is performed when the same is loaded is performed. That is, the drive gear 22, which is rotated reversely by the loading motor 21, is moved in a direction indicated by an arrow B2 shown in FIG. 15 along the circular arc portion 10*b* of the rack 10 to form a circular arc locus. Thus, the lock lever 24 is rotated in a direction indicated by an arrow C2 so that the cam pin 29 is moved downwards along the cam groove 25. As a result, the swing frame 14 is, through the operation of the elevation drive lever 18, swung downwards around the pair of the right and left insulators 16 so as to be downwards moved to the lowermost position shown in FIG. 18 from the upward position shown in FIG. 19.

When the drive gear 22 is continuously rotated in the reverse direction by the loading motor 21, the drive gear 22 is engaged to the straight portion 10*a* of the rack 10. Thus, the disk tray 5 is linearly driven. As a result, the disk tray 5 is ejected outward from the apparatus body 2 through the tray inlet/outlet port 4 of the front panel 3. Thus, the loading state shown in FIG. 13 is switched to the ejection state shown in FIG. 12.

[disk drive unit]

As shown in FIG. 16, a circular motor opening 14*d* is formed at the leading end portion in the recess 14*a* of the swing frame 14. The motor opening 14*d* loosely receives a spindle motor 30. The spindle motor 30 is attached to the swing frame 14 such that its rotational shaft faces upwards. A disk table 31 is horizontally secured to the top end of the rotational shaft of the spindle motor 30. In the central portion of the upper portion of the disk table 31, there is formed a centering guide 31*a* with which a central hole d of the optical disk D is engaged. In the central portion of the centering guide 31*a*, there is attached a chucking magnet. The centering guide 31*a* enables the optical disk D to be detachably loaded on the disk table 31.

Moreover, an optical pickup device 32 is horizontally and slidably supported by two guide shafts 33 in the recess 14*a* of the swing frame 14 at a position more rearward than the spindle motor 30. The two guide shafts 33 are disposed to run in parallel to each other and have two ends supported by the swing frame 14. Since the optical pickup device 32 is guided by the two guide shafts 33, the optical pickup is able to approach and move away from the spindle motor 30. Reference numerals 39a and 39b represent retaining plates for holding respective ends of the two guide shafts 33 to prevent separation.

The optical pickup device 32 has a carriage 35 to which an objective lens 34 is upwardly attached. Bearing portions 35a are formed at the both ends of the carriage 35. The guide shafts 33 are slidably inserted into the bearing portions 35a. An optical block 36 capable of transmitting and receiving a laser beam to and from the objective lens 34 is integrally attached to the side surface of the carriage 35. The objective lens 34 of the optical pickup 32 and the spindle motor 30 are disposed on the tray center P so as to be moved in the longitudinal directions A1 and A2 along the tray center P.

A projection 35b for a sensor is provided on the carriage 35 at its side adjacent to the spindle motor 30. A light reflecting type skew sensor 37 is attached to the upper surface of the projection 35b for a sensor to face upwards such that its optical axis is made to be substantially perpendicular. The skew sensor 37 is introduced into a position below the lower surface of the disk table 31 as shown in FIG. 15 and so forth when the optical pickup 32 has most approached the spindle motor 30 when loading or the like is performed so as to detect existence of the lower surface 31b of the disk table 31. The lower surface 31b of the disk table 31 is a practical example of the reference portion provided on the disk table 31.

A projection 35b for a sensor is provided on the carriage 35 at its side adjacent to the spindle motor 30. A light reflecting type skew sensor 37 is attached to the upper surface of the projection 35b for a sensor to face upwards such that its optical axis is made to be substantially perpendicular. The skew sensor 37 is introduced into a position below the lower surface of the disk table 31 as shown in FIG. 15 and so forth when the optical pickup 32 has most approached the spindle motor 30 when loading or the like is performed so as to detect existence of the lower surface 31b of the disk table 31. The lower surface 31b of the disk table 31 is a practical example of the reference portion provided on the disk table 31.

As a result, the attitude relationship between the optical disk D and the objective lens 34 can be set to be the most satisfactory state. As a result, a recording operation or a reproducing operation can be performed as desired regardless of whether the disk to be loaded next is a standard density disk or a high density disk.

To enable the optical pickup device 32 to approach and move away from the spindle motor 30, a carriage moving mechanism 40 is attached to the swing frame 14. The carriage moving mechanism 40 has, as shown in FIGS. 15 and 16, a carriage drive motor 41 secured to the swing frame 14, a drive gear 42 which can be rotated forwards and reversely by the carriage drive motor 41, a gear train 43 for establishing the connection between the drive gear 42 and the carriage drive motor 41 in such a manner that power can be transmitted, a rack 44 attached to a side surface of the carriage 35 and arranged to be engaged to the drive gear 42, and so on. The drive gear 42 arranged to be capable of rotating forwards and reversely through the gear train 43 composed of a combination of plural gears linearly drives the rack 44 so that the carriage 35 is guided by the pair of the guide shafts 33 so as to be moved forwards and rearward.

As shown in FIG. 18 and so forth, a damper support plate 45 is horizontally stretched on the upper opening of the chassis 12 to traverse the upper portion of the disk tray 5. Both ends of the damper support plate 45 are secured to right and left side plates of the chassis 12. A disk damper 46 is supported by the central portion of the damper support plate 45 at a position right above the disk table 31 in such a manner that the disk damper is able to move vertically, laterally and longitudinally within predetermined ranges. A steel plate 47 is attached to the central portion of disk clamper 46. When the steel plate 47 is attracted by the attracting force of the magnet built in the disk table 31, the optical disk D is horizontally magnetically chucked onto the disk table 31.

Thus, when the optical disk D has been loaded into the apparatus body by the disk tray 5 and then the swing frame 14 has been moved upwards to the predetermined upward position and placed horizontally as shown in FIG. 19, the disk table 31 is upwardly inserted through the opening 8 formed in the bottom surface of the disk tray 5. Thus, the centering guide 31a is, from a lower position, inserted into the central hole Da of the optical disk D. As a result, the optical disk D is caused to float in the disk accommodation portion 7 of the disk tray 5 by the disk table 31. Moreover, the optical disk D is, by the disk clamper 46, pressed against the upper surface of the disk table 31.

Then, the optical disk D is rotated at high speed by the spindle motor 30 in accordance with a reproduction command signal supplied from a control unit CS as a control means. Moreover, the carriage moving mechanism 40 causes the carriage 35 of the optical pickup device 32 to approach or move away from the spindle motor 30. As a result, the objective lens 34 is, along the tray center P, moved inward or outwardly in the radial direction of the optical disk D. The information recording surface of the optical disk D is, by the objective lens 34, irradiated with a laser beam transmitted from the optical block 36. Reflected light from the optical disk is received by the optical block 36 through the objective lens 34 so that information recorded on the information recording surface is reproduced.

After information recorded on the optical disk D has been reproduced, the swing frame 14 is moved downwards to the predetermined downward position in accordance with an ejection command signal issued from the control unit CS, as shown in FIG. 18. As a result, the disk table 31 is separated from the central hole Da of the optical disk D and moved downwards so that the optical disk D is placed in the disk holding portion 7 and the disk tray 5 is horizontally ejected to the outside of the apparatus body 2.

A skew adjustment mechanism 50 for adjusting inclination of the optical disk D with respect to the objective lens 34 of the optical pickup device 32 will be described. The skew adjustment mechanism 50 adjusts the inclination in the direction toward the tray center P relative to a pair of inclination fulcrums 51 formed at both of left and right sides of the spindle motor 30.

As shown in FIGS. 20 to 23, each of the inclination fulcrums 51 is composed of a spherical ball 52 and a ball holder 53 for rotatively holding the ball 52 which are downwards attached to both of left and right sides of the spindle motor 30. A leaf spring 54 is disposed below a base plate 38 of the spindle motor 30. Left and right ends of the leaf spring 54 are secured to the swing frame 14 by fixing screws 55. Moreover, the leaf spring 54 has projections 54a drawn upwards at positions corresponding to the pair of the balls 52. When the projections 54a strongly press the horizontal lower surface of the base plate 38 from a lower position, a horizontal reference surface 56 which is the upper surface of the base plate 38 is strongly pressed against the pair of the balls 52 from a lower position. The lower apexes of the pair of the balls 52 form a pair of right and left inclination fulcrums 51.

Figure 22:
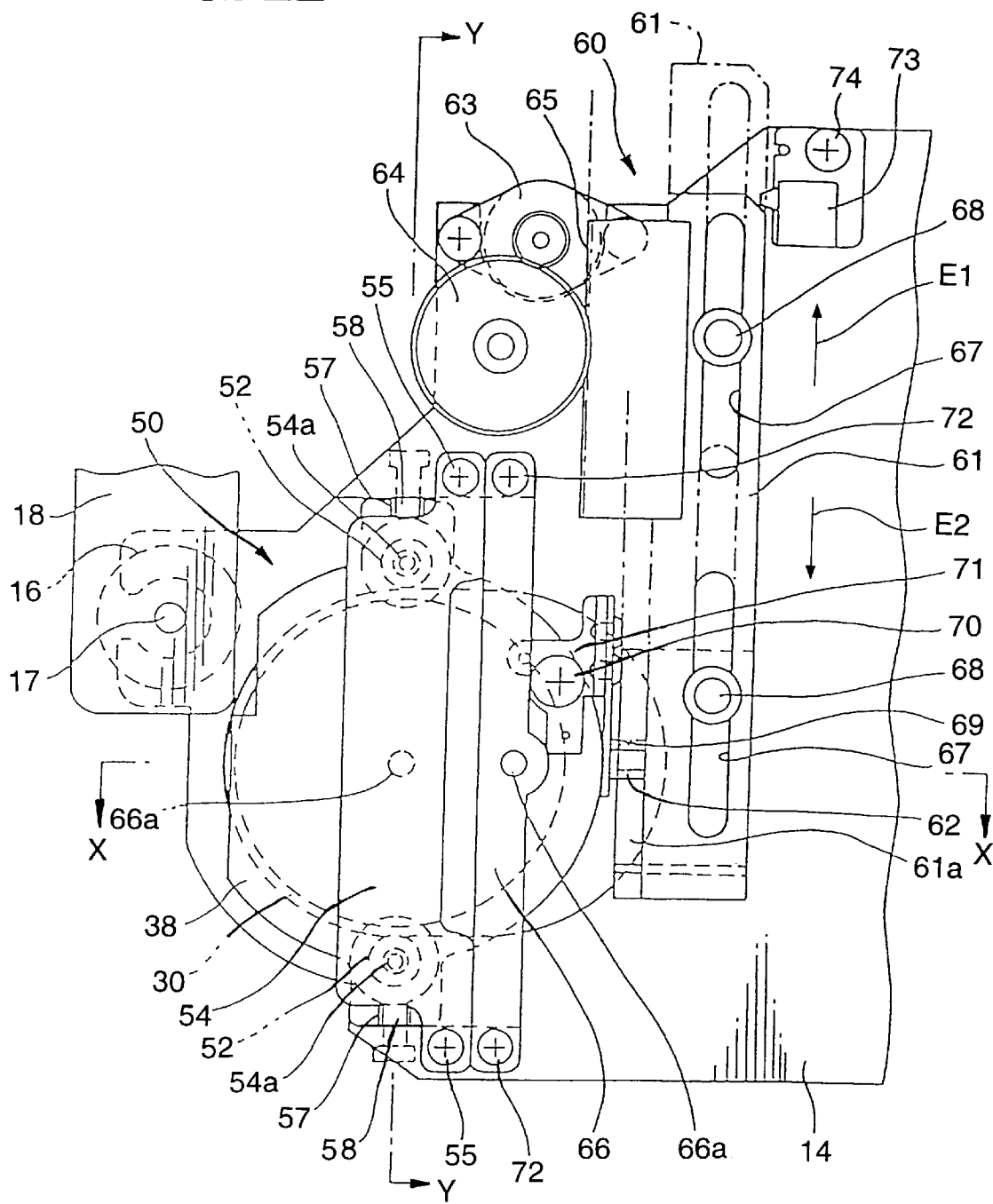
FIG. 22 is a bottom view showing the skew control mechanism of the disk drive apparatus shown in FIG. 12.
Figure 23:
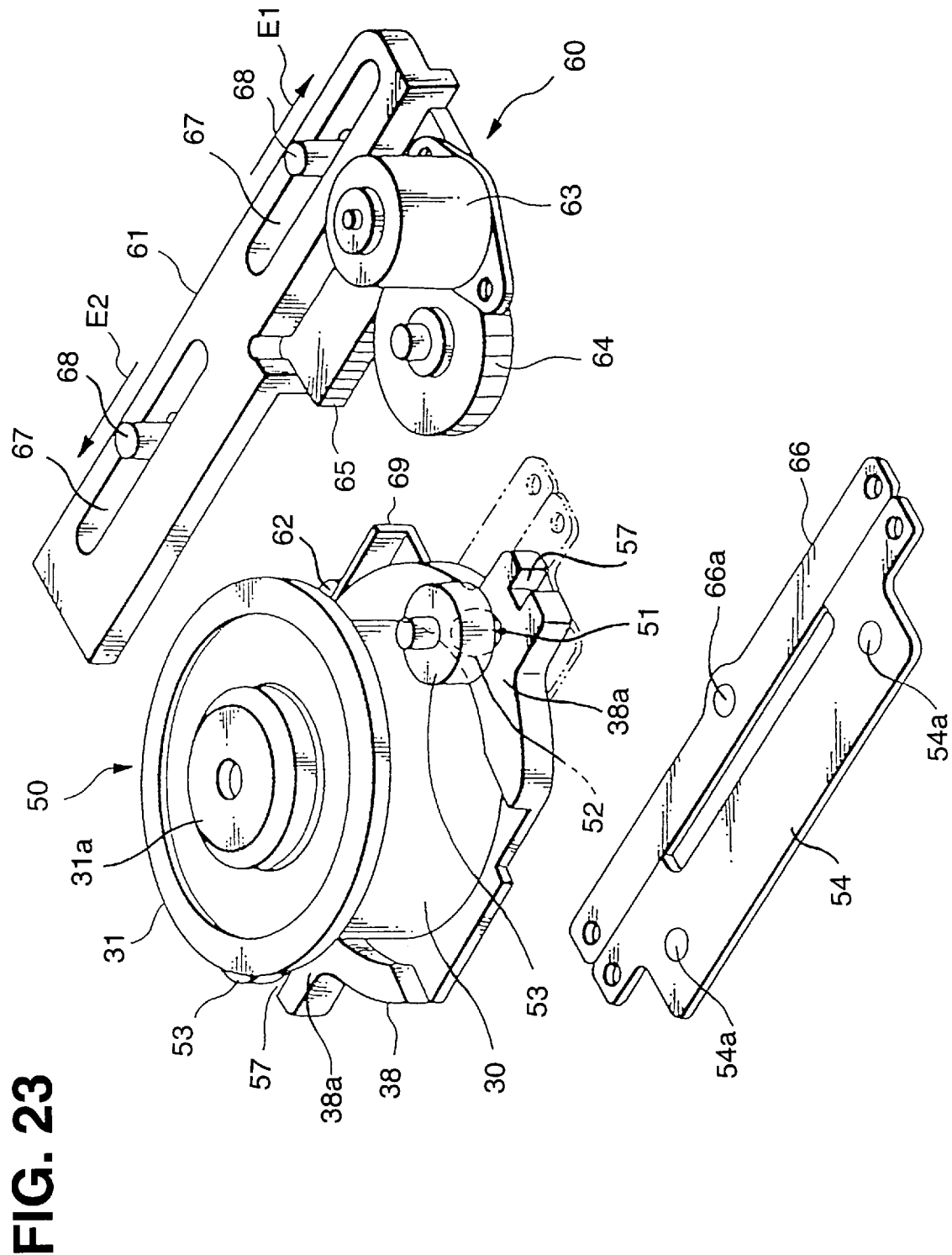
FIG. 23 is an exploded, perspective view showing the skew control mechanism of the disk drive apparatus shown in FIG. 12.

Moreover, as shown in FIGS. 22 and 23 and so forth, a pair of guide grooves 57 are formed on both of left and right sides of the base plate 38. Each of the guide grooves 57 rotatively receives a pair of guide pins 58 disposed on the two sides of the motor opening 14*d* of the swing frame 14 to horizontally face each other. To incline the spindle motor 30 relative to the inclination fulcrums 51, the skew adjustment mechanism 50 is provided with a skew drive mechanism 60.

The skew drive mechanism 60 is composed of a slide cam 61 attached to the lower surface of the swing frame 14, a cam driven roller 62 attached to the base plate 38 and pressed against the slide cam 61, from a lower position, a skew motor 63 attached to the swing frame 14, a pinion 64 which can be rotated forwards and reversely by the skew motor 63, a rack 65 formed integrally with the slide cam 61 and a leaf spring 66 for pressing the cam driven roller 62 against the slide cam 61 from a lower position, and so on.

Figure 24:
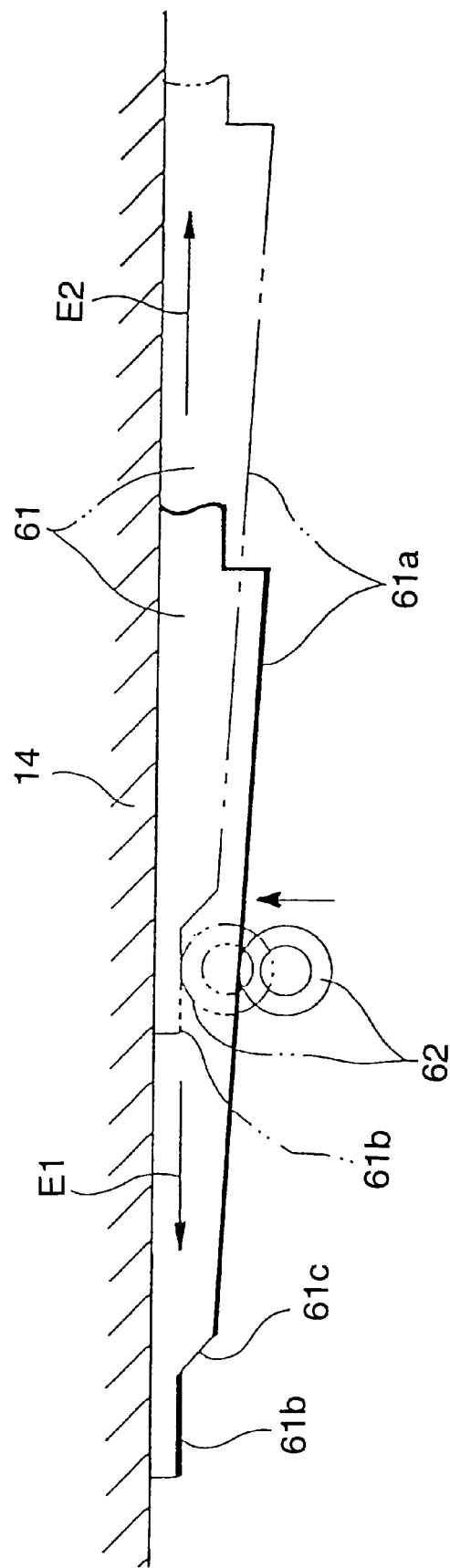
FIG. 24 is a side view showing a slide cam forming the skew control mechanism of the disk drive apparatus shown in FIG. 12.

The slide cam 61 of the skew drive mechanism 60 has a plurality of guide holes 67 formed on a straight line. A guide pin 68 secured to the swing frame 14 is slidably inserted into each guide hole 67. The slide cam 61, as shown in FIG. 24, has a skew adjusting cam surface 61*a* moderately inclined in sliding directions E1 and E2, a working distance enlarging cam surface 61*b* which is a horizontally high portion formed at an end of the skew adjusting cam surface 61*a*, and an inclined surface 61*c* for establishing the connection between the two cam surfaces 61*a* and 61*b*.

Figure 21:
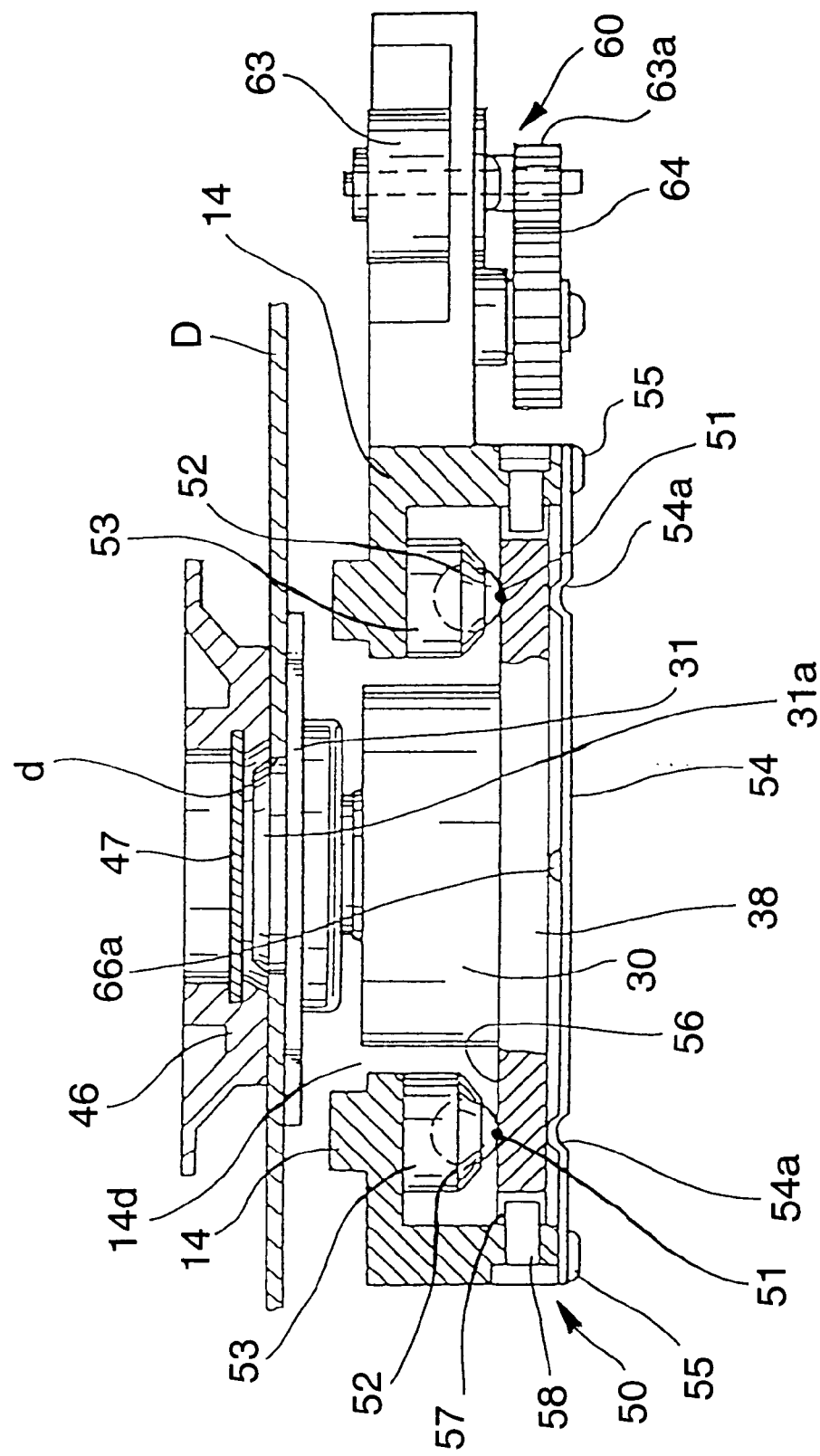
FIG. 21 is a cross sectional view cut along aline Y—Y in FIG. 22 used to explain the skew control mechanism of the disk drive apparatus shown in FIG. 12.

The cam driven roller 62 is rotatively attached to a height adjustment plate 69 as shown in FIG. 21 and so on. The height adjustment plate 69 is attached to an attachment plate 71 secured to the base plate 38 with a fixing screw 70 such that the height can be adjusted. A pinion 63*a* attached to the rotational shaft of the skew motor 63 is engaged to the pinion 64. The rotational force of the pinion 64 linearly drives the slide cam 61 through the rack 65. A loading sensor 73 for detecting whether or not the slide position of the slide cam 61 is the loading position is attached to the lower surface of the swing frame 14 with a fixing screw 74.

Moreover, a leaf spring 66 is disposed to run parallel to the leaf spring 54. Both of left and right ends of the leaf spring 66 are secured to the lower surface of the swing frame 14 with fixing screws 72. A projection 66*a* upwardly drawn is formed at a substantially central portion of the leaf spring 66. When the projection 66*a* presses the lower surface of the base plate 38 at a position adjacent to the cam driven roller 62 from a lower position, the cam driven roller 62 is pressed against the slide cam 61 from a lower position.

The skew adjustment operation is performed by the skew adjustment mechanism 50 having the above-mentioned structure in a reproduction mode in which the optical disk D is magnet-chucked on the disk table 31 by the disk clamper 46. In the reproduction mode, the light reflecting type skew sensor 37 detects the inclination of the optical disk D with respect to the objective lens 34 in a state where the optical disk D is rotated by the spindle motor 30.

Based on a result of the detection of the inclination, the skew adjustment mechanism 50 adjusts the inclined of the optical disk D with respect to the objective lens 34 in such a manner that the optical axis of a laser beam with which the optical disk D is irradiated from the objective lens 34 is made to be perpendicular (90°) to the optical disk D. As a result, a state is realized in which the optical disk D is held perpendicularly with respect to the optical axis of the laser beam from the objective lens 34. When data is reproduced in the above-mentioned state, even high density data can precisely be reproduced.

The optical pickup device 32 is used to serve as a disk determination means for determining the type of the optical disk D, as well as the data reproducing means. The determination can be performed such that the optical pickup device 32 reads disk type determination data recorded at the innermost peripheral position of the optical disk D. In accordance with disk type determination data, whether the loaded optical disk D is a standard density disk as the first optical disk or a high density disk as the second optical disk can be detected.

If the loaded optical disk D is a standard density disk, the first mode is selected and then a skew-off mode is set so that data is reproduced in a state where radial skew adjustment is inhibited. On the contrary, if the loaded optical disk D is a high density disk, the second mode is selected and a skew servo mode is set and a fact that the disk is a high density disk is stored in a predetermined memory. Then, data is reproduced while radial-skew-adjusting the high density disk.

Therefore, the optical disk apparatus according to the present invention is able to selectively and precisely reproduce a standard density disk which has a large unit area for data and which does not require considerable accuracy for data reproduction and a high density disk which has a small unit area for data and from which data must accurately be reproduced.

Figure 25:
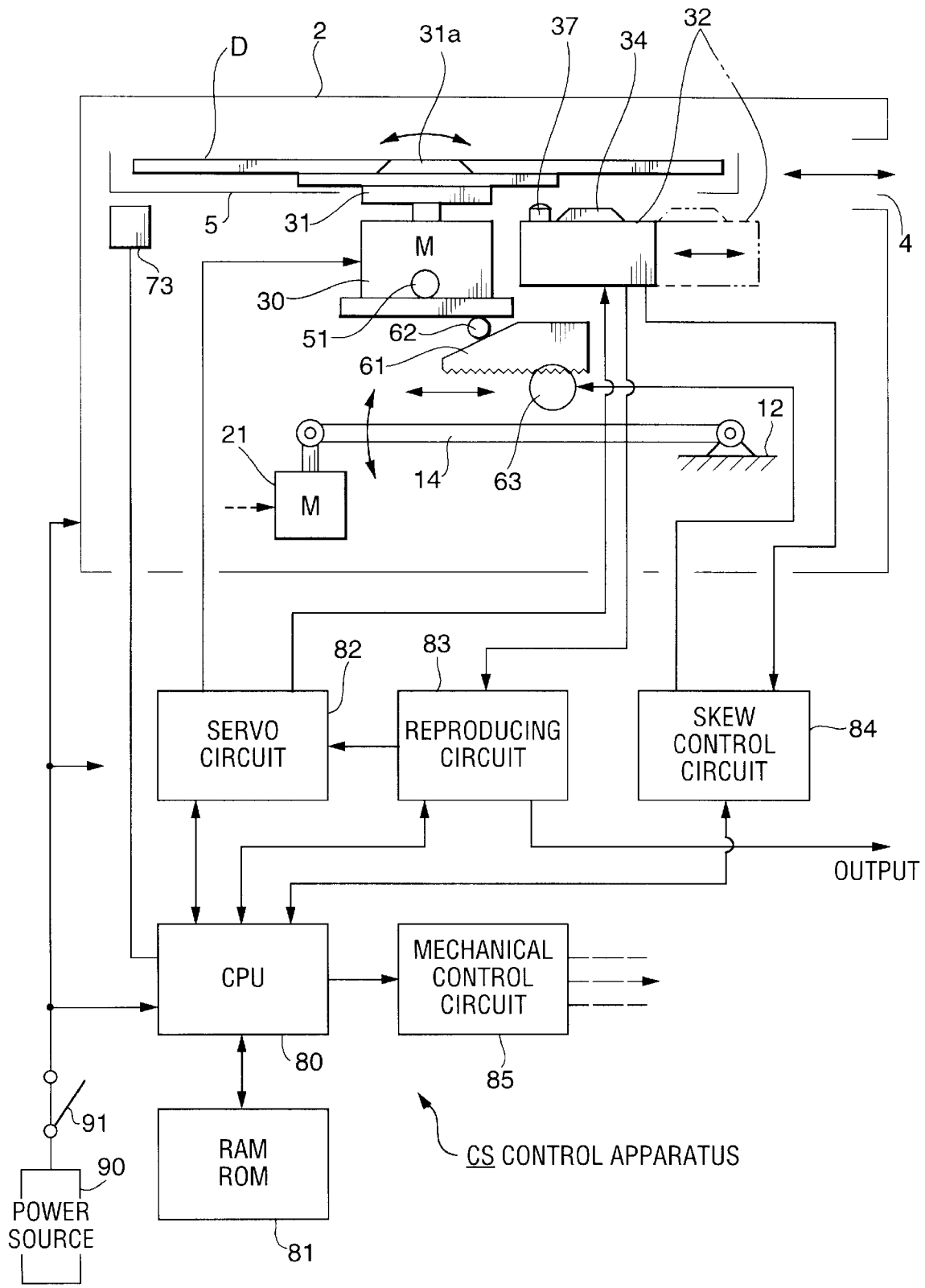
FIG. 25 is a block diagram showing a control circuit unit of the disk drive apparatus shown in FIG. 12.

To perform the various operations mentioned above, the optical disk apparatus 1 has the control unit CS structured as shown in FIG. 25. The control unit CS has, for example, a 4-bit and parallel processing microcomputer (CPU) 80, a storage unit (ROM) on which a predetermined program has been written in advance, a storage unit (RAM) 81 on which various informations can be written, a servo circuit 82 which is controlled by the CPU 80, a reproducing circuit 83, a skew control circuit 84, a mechanical control circuit 85, and so on. The loading sensor 73 is connected to the CPU 80.

The servo circuit 82 of the control unit CS performs control of rotation of the spindle motor 30 and control of reproduction of the optical disk D by means of the optical pickup 32. Reproduced information obtained by the optical pickup 32 is supplied to the reproducing circuit 83 so that output of a reproduction signal and so forth are performed. Information signal from the optical pickup 32 is also supplied to the skew control circuit 84. In accordance with the information signal, the skew control circuit 84 outputs a control signal to the skew motor 63 so that skew adjustment of the spindle motor 30 is performed through the operations of the slide cam 61 and the cam driven roller 62. The mechanical control circuit 85 controls electric units, such as the loading motor 21 or the like, such that, for example, it controls the rotation of the loading motor 21 to control the vertical movement of the swing frame 14 and so on.

Therefore, a power source 100 for supplying electric power is, through a power supply switch 101, connected to the electric units, such as the spindle motor 30, the skew sensor 37 and so on in the apparatus body 2, the electronic units and circuit units of the control unit CS, such as the CPU 80, the servo circuit 82 and so on.

[operation for reproducing optical disk]

Figure 26:
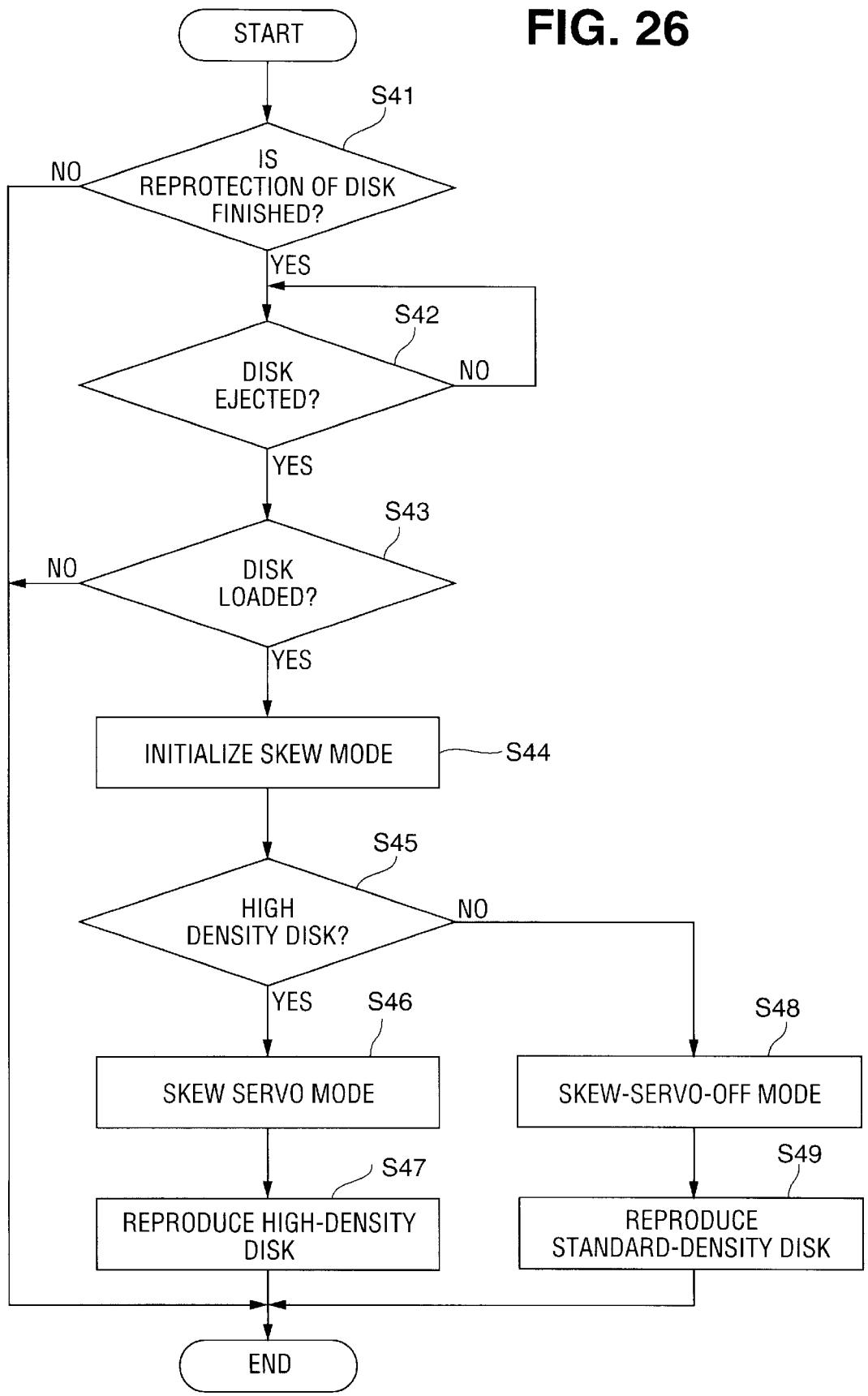
FIG. 26 is a flowchart used to explain a control operation of the control circuit unit of the disk drive apparatus shown in FIG. 12.

The control unit CS, as shown in a flow chart of FIG. 26, performs a control process such that the skew sensor 37 detects the disk table 31 to set the posture between the optical disk D and the optical pickup 32 in a predetermined initial state.

The control process of the control unit CS, as shown in FIG. 26, is started by determining whether or not the operation for reproducing information from the optical disk D has been completed in step S41. The determination is performed by the CPU 80 to determine whether or not a reproduction signal has been supplied from the optical pickup 32 through the reproducing circuit 83. If the reproduction operation is being performed, the process is ended here. If a determination is performed in step S41 that the reproduction operation of the optical disk D has been completed, the process proceeds to step S42.

In step S42 whether or not the optical disk D has been ejected is determined. The determination is performed by the CPU 80 to detect a detection signal supplied from the loading sensor 73. If the state is a loading state in which the loading sensor 73 is detecting the disk tray 5, a determination is performed that the state is not disk ejection. Thus, the process returns to step S2 again and the above-mentioned process is repeated until the disk is ejected. If a determination is performed in step S42 that the disk has been ejected, the process proceeds to step S43. In step S43 whether or not the optical disk D ejected in step S2 or another optical disk D has been again loaded is determined. The determination is performed by detecting a detection signal supplied from the loading sensor 73. If the state is an unloading state in which the optical disk D is not placed on the disk tray 5, a determination is performed that the state is not the disk loading state. Thus, the process is completed. If it is determined in step S43 that the state is disk loading, the process proceeds to step S44.

In step S44 the skew mode is initialized. This control is performed such that the skew control circuit 84 outputs a drive signal to the skew motor 63 of the skew drive mechanism 60 in accordance with a control signal supplied from the CPU 80 and a detection signal supplied from the skew sensor 37. That is, when loading is performed, the optical pickup 32 is caused to approach the spindle motor 30 and the skew sensor 37 is inserted into a position below the disk table 31 so as to detect the lower surface of the table which is the reference portion of the disk table 31 by the skew sensor 37. In this case, a structure may be employed in which the innermost peripheral portion of the optical disk D is used as the reference portion and the inner peripheral portion is detected by the skew sensor 37 to initialize the skew mode.

If the skew servo mode is set because the optical disk D for use in the previous reproducing operation is a high density disk and thus the radial skew adjustment is performed in step S44, the skew drive mechanism 60 is operated to again set the spindle motor 30 to be perpendicular so as to set the attitude between the optical disk D and the optical pickup 32 to be a predetermined initial state. On the other hand, if the optical disk D for use in the previous reproducing operation is a standard density disk, a skew off mode is set so that the radial skew adjustment is inhibited. Since the spindle motor 30 has been made to be perpendicular from the beginning, a new initializing operation is not performed.

If a determination is performed in step S45 that the disk is a standard density disk, the process proceeds to step S48 so that the skew servo off mode is set. Then, the process proceeds to step S49 so that the operation for reproducing the standard density disk D is started. Thus, the process is completed here.

As a result, the attitude between the optical disk D and the optical pickup 32 can be controlled in accordance with the information recording density of the disk which is the information recording medium so as to set the attitude to be the initial state which is most suitable to start the reproduction. Therefore, according to the optical disk apparatus 1, the standard density disk and the high density disk can selectively and satisfactorily be reproduced. Moreover, precise reproduction can be performed regardless of whether the disk is a standard density disk or the high density disk.

Figure 27:
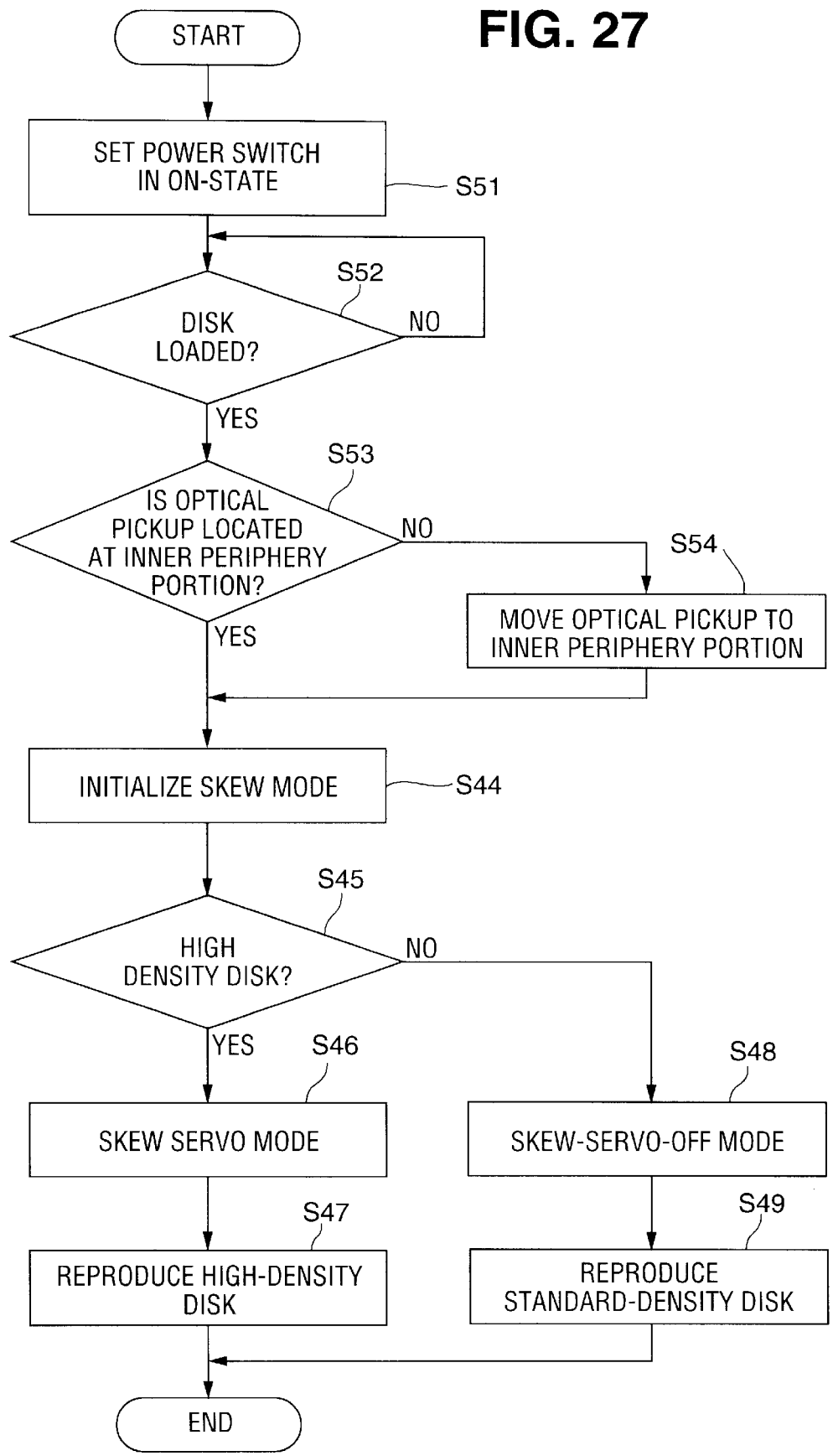
FIG. 27 is a flowchart used to explain another example of a control operation of the control circuit unit of the disk drive apparatus shown in FIG. 12.

The control process, which is performed by the control unit CS, may be structured as shown in a flow chart of FIG. 27 such that the process is started whether or not the power supply switch 101 is switched on and the positional relationship between the optical disk D and the optical pickup device 32 is set to a predetermined initial state immediately after power supply has been performed. Referring to FIG. 27, the same parts as those shown in the flow chart of FIG. 26 are given the same reference numerals and the same parts are omitted from description.

The control process shown in FIG. 27 is started when the power supply switch 101 for connecting/disconnecting the power source 100 is switched on in step S51. After the power supply switch 101 has been switched on, the process proceeds to step S52.

In step S52 whether or not a optical disk D exists, that is, whether or not an optical disk D has been loaded on the disk table 31 is determined. The determination is performed such that the CPU 80 detects a detection signal supplied from the skew sensor 37. If the skew sensor 37 does not detect the optical disk D, a determination is performed that the optical disk D is not loaded on the disk table 31. Thus, process returns to step S52 again, and the above-mentioned process is repeated until the optical disk D is loaded on the disk table 31. If the skew sensor 37 has detected the optical disk D as a result of the determination performed in step S52, a determination is performed that the optical disk D has been loaded on the disk table 31. Then, the process proceeds to step S53.

In step S53 whether or not the optical pickup 32 is positioned at the innermost peripheral portion of the optical disk D is determined. The determination is performed such that whether or not a limit switch omitted from illustration in FIG. 14 and provided at the inner peripheral side has been switched on is determined. If the limit switch has been switched off, a determination is performed that the optical pickup device 32 is positioned at a position except for the innermost peripheral portion of the optical disk D. On the other hand, if the limit switch has been switched on, a determination is performed that the optical pickup device 32 is positioned at the innermost peripheral portion of the optical disk D. The determination whether or not the portion is the innermost peripheral portion of the optical disk D is also used to determine the type of the optical disk D in accordance with the recording density by reading disk type determination data recorded at the innermost peripheral position of the optical disk D and to initialize the skew mode by detecting the innermost peripheral portion.

If it is determined that the optical pickup device 32 is positioned at the innermost peripheral portion of the optical disk D as a result of the determination performed in step S53, the process proceeds to step S44 so that initialization of the skew mode is performed. In accordance with the information recording density of the optical disk D loaded on the disk table 31 determined in step S45, the processes of steps S46 and S47 are performed if the loaded disk is a high density disk. If a standard density disk is loaded, the processes of steps S48 and S49 are performed.

If on the other hand it is determined in step S53 that the optical pickup device 32 is not positioned in the innermost peripheral portion of the optical disk D, the process proceeds to step S54. In step S54, the optical pickup device 32 is moved to the innermost peripheral portion of the optical disk D. The foregoing process is performed such that in the control unit CS a control signal is output from the CPU 80 to the mechanical control circuit 85 to drive the carriage drive motor 41 and so forth of the carriage moving mechanism 40.

Figure 28:
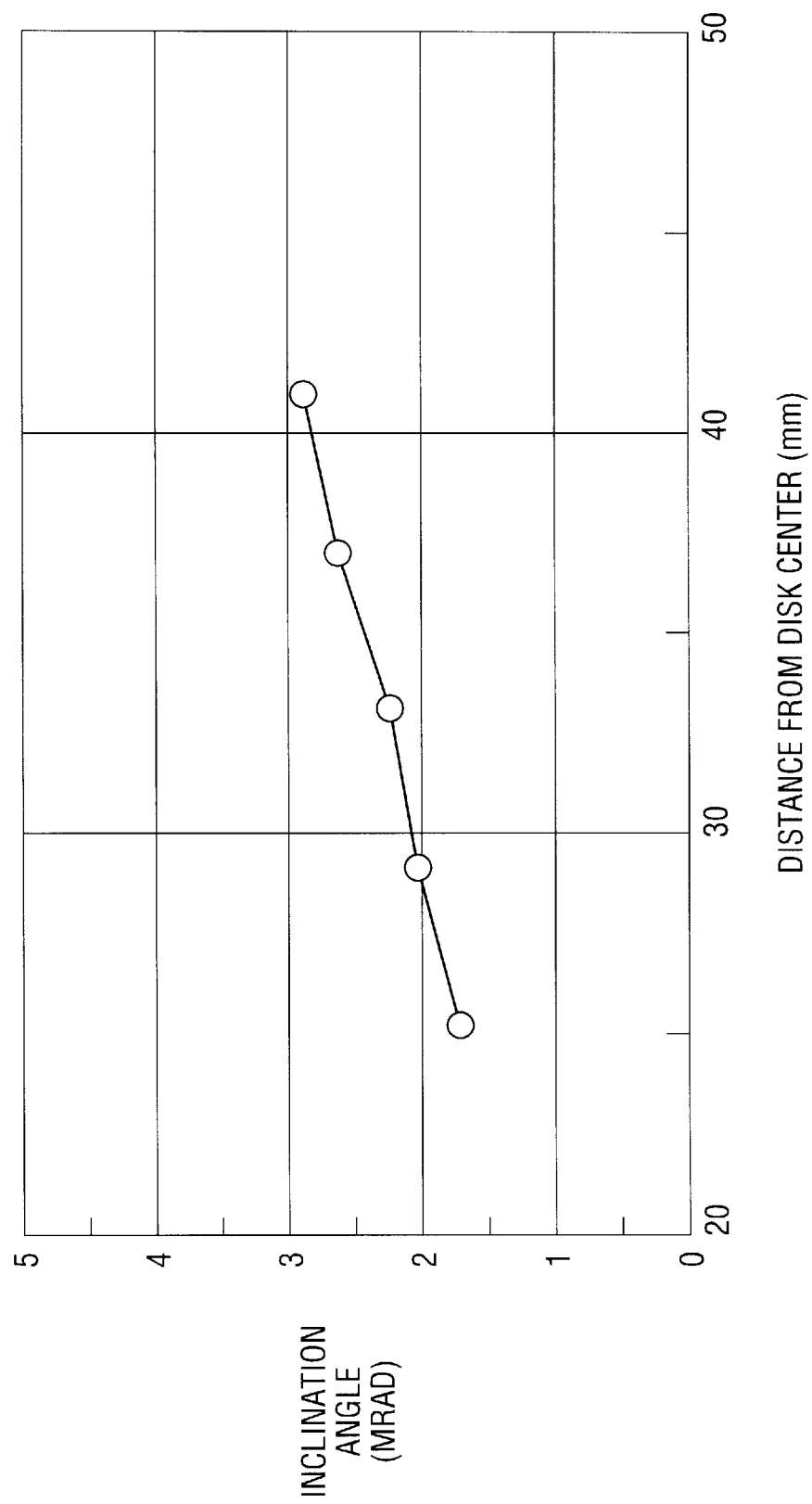
FIG. 28 is a graph showing a relationship between a distance from a disk center and a disk inclination angle with respect to an optical disk according to the present invention.

When the inclination of the disk is detected in the inner peripheral portion of the optical disk D to cause the skew sensor 37 to perform the initialization, the optical disk D usually has a large skew angle in the outer peripheral portion thereof and a substantially no skew angle in the inner peripheral portion of the same, as shown in FIG. 28. FIG. 28 has an axis of abscissa which stands for the distance [mm] from the center of the disk and an axis of ordinate which stands for an angle [mrad] of inclination of the disk. According to FIG. 28, the angle of inclination of the direction is 1.7 mrad when the distance from the center of the disk is 25 mm, while the angle of inclination of the disk is 2.8 mrad when the distance from the center of the disk is 40 mm.

Specifically, since the influence of the deviation of the disk table 31 of the spindle motor 30 is the same for the inner peripheral portion and the outer peripheral portion in terms of the angle, the skew of the objective lens 34 of the optical pickup device 32 depends upon only the inclination of the disk itself. Therefore, since substantially no skew takes place in the inner peripheral portion adjacent to the disk table 31 of the spindle motor 30 for positioning the disk, initialization is performed by the skew sensor 37 in the inner peripheral portion of the loaded optical disk D to satisfactorily locate the optical pickup device 32 within the predetermined angular range.

Although whether or not disk exists is determined in step S52 in the flow chart shown in FIG. 27 to repeat the process of step S52 or the process proceeds to the next step S53 in accordance with a result of the determination, another structure may be employed in which whether or not disk loading is performed is determined in place of determining existence of a disk to repeat step S52 if unloading of the disk is performed and the process proceeds to step S53 after loading of the disk has been performed. Also, by carrying out the control to initialize the skew mode by loading the disk, precise reproduction can be performed regardless of whether the disk is a standard density disk or a high density disk, similarly to the above-mentioned embodiment.

Figure 29:
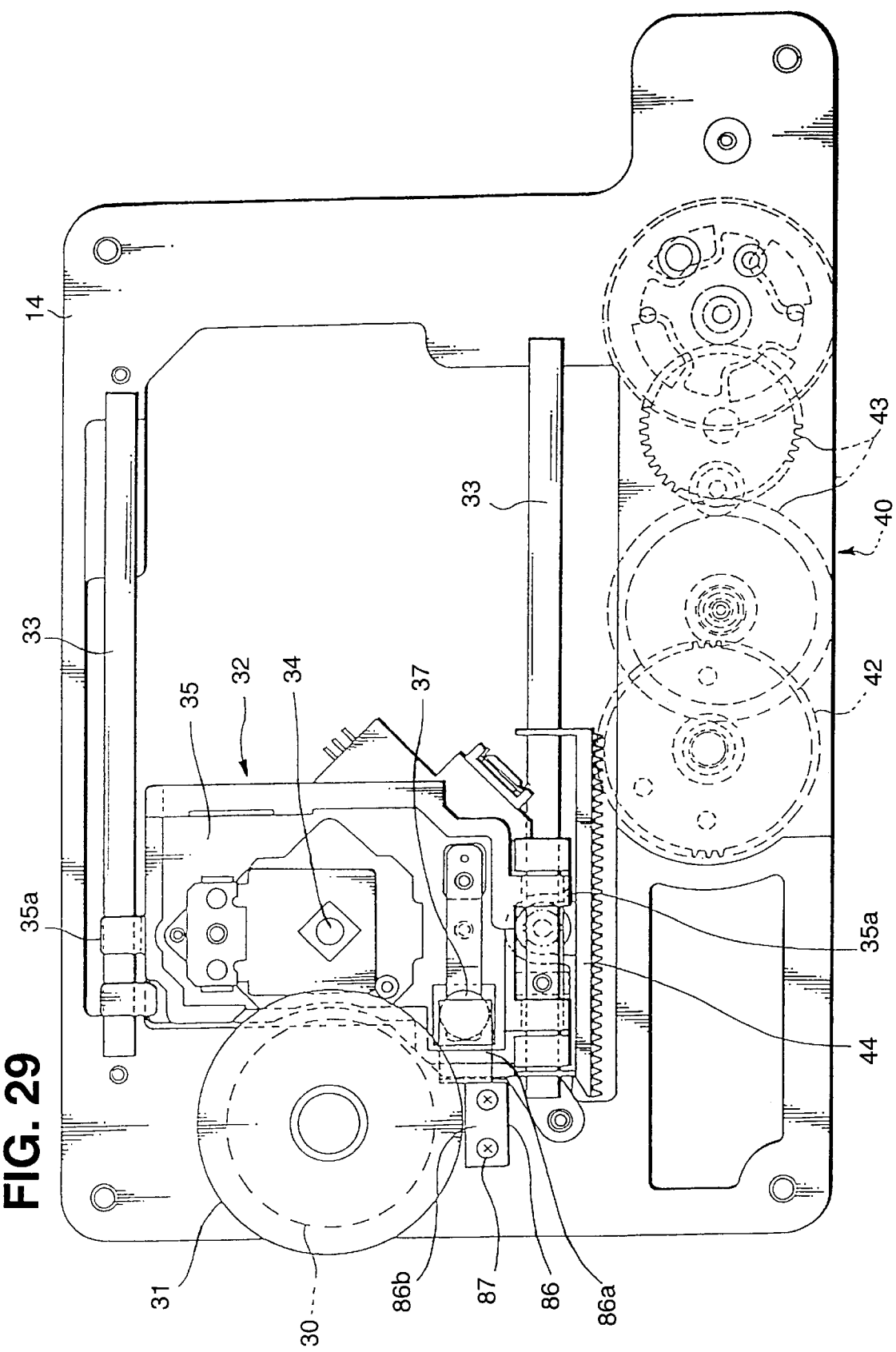
FIG. 29 is a plan view showing a disk drive apparatus according to a third embodiment of the present invention and also showing an elevation frame, a disk table, an optical pickup device, a skew sensor, and a reference member.
Figure 30:
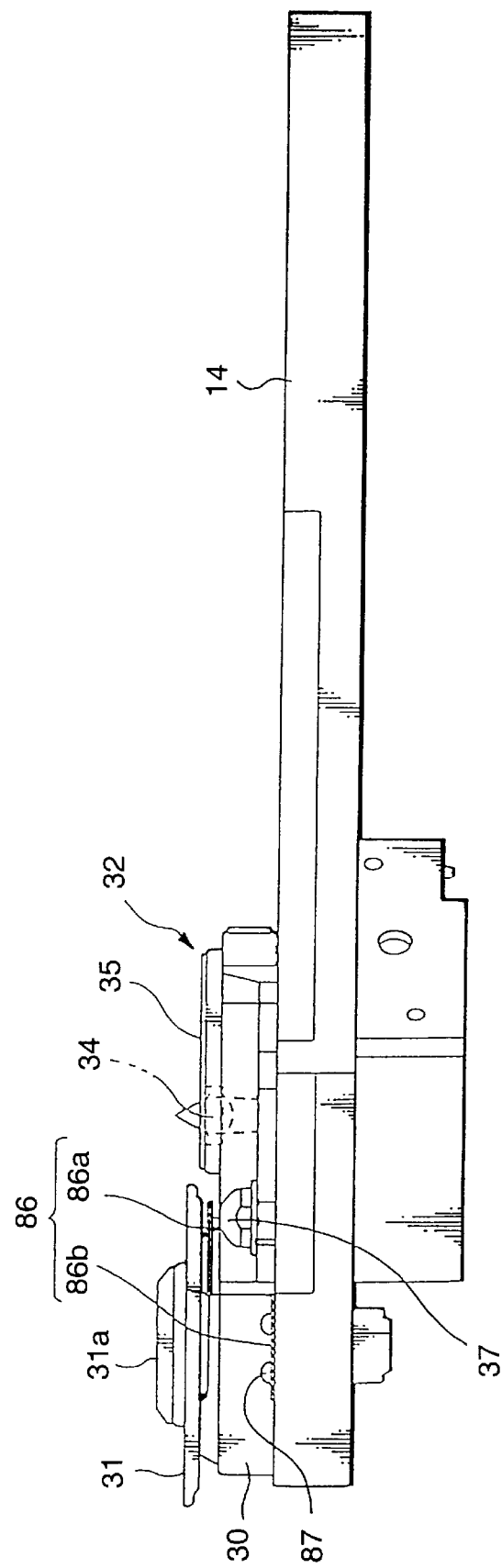
FIG. 30 is a side view showing the elevation frame, the disk table, the optical pickup device, the skew sensor, and the reference member of the disk drive apparatus shown in FIG. 29.
Figure 31:
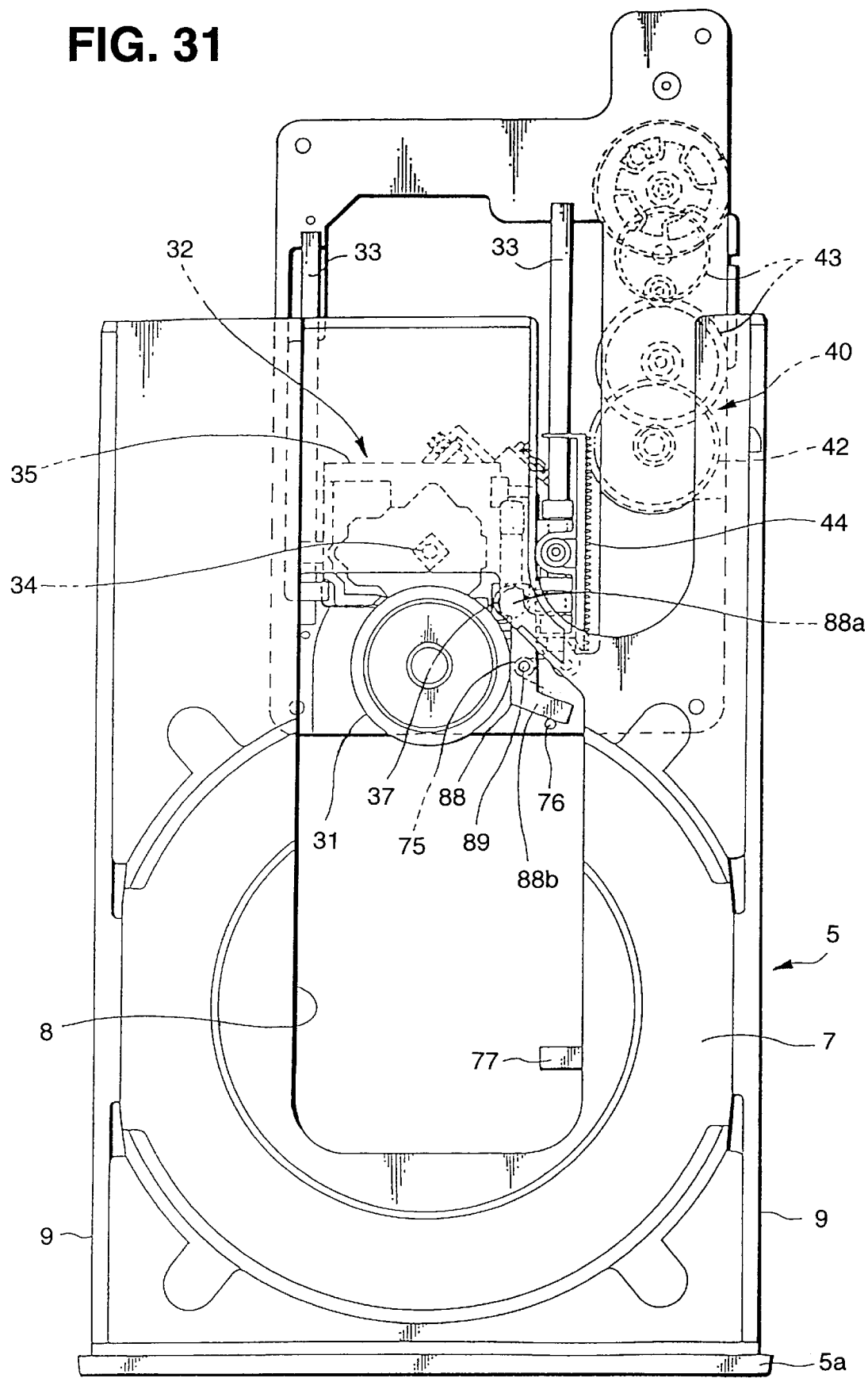
FIG. 31 is a plan view showing a disk drive apparatus according to a fourth embodiment of the present invention and also showing a disk tray, an elevation frame, a disk table, an optical pickup device, a skew sensor, and a reference member in a state a disk is ejected.
Figure 32:
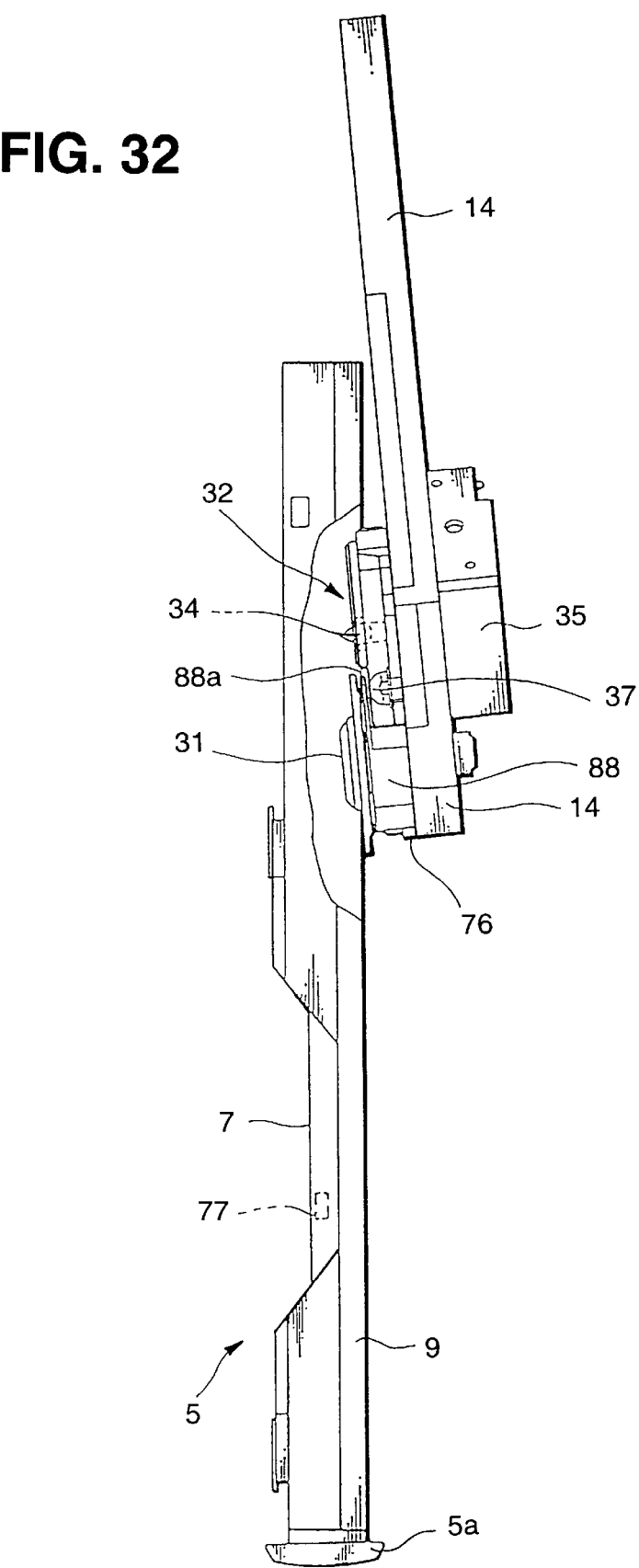
FIG. 32 is a side view showing the disk tray, the elevation frame, the disk table and so on of the disk drive apparatus shown in FIG. 31 in a disk ejected state.
Figure 33:
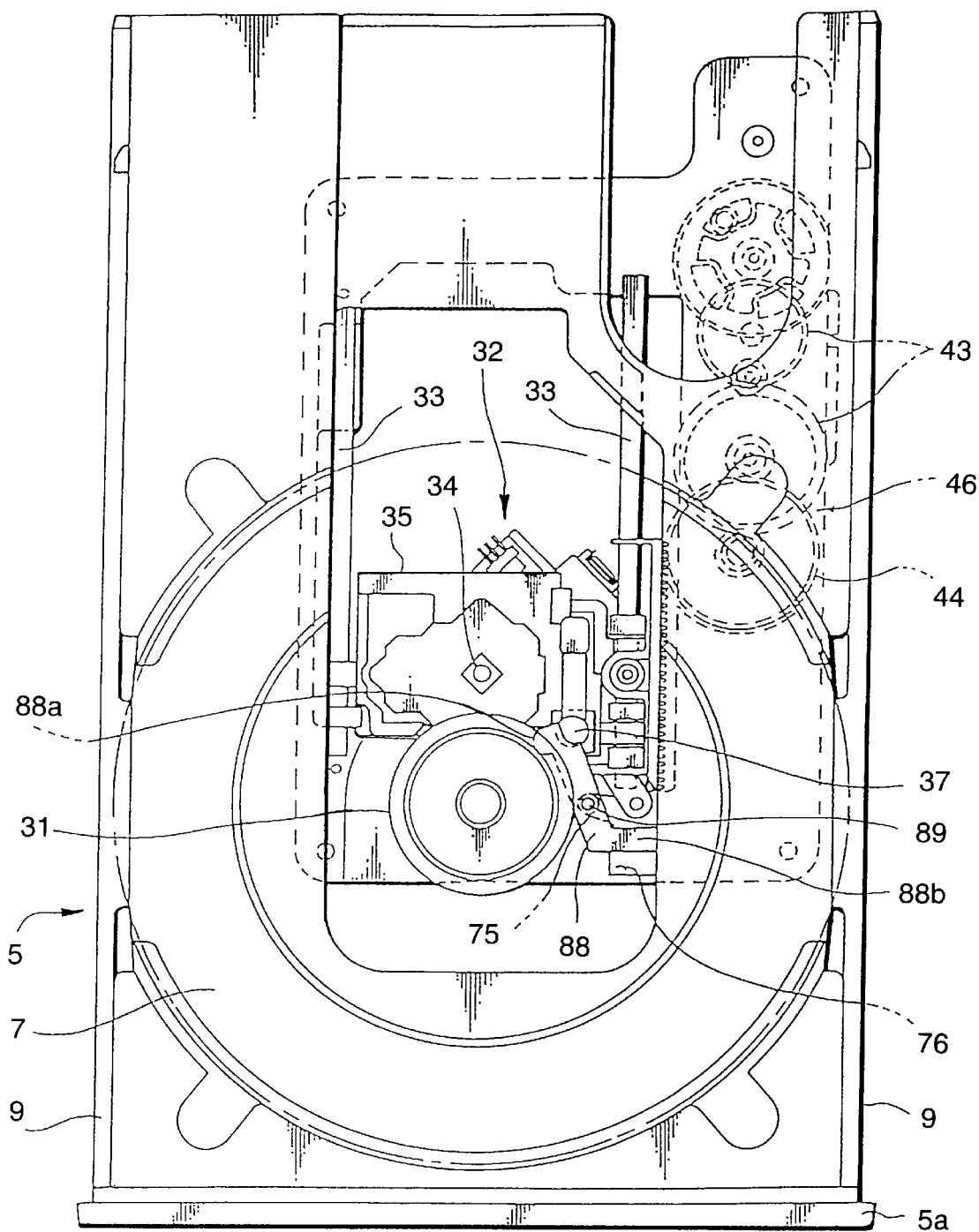
FIG. 33 is a plan view showing the disk tray, the elevation frame, the disk table and so on of the disk drive apparatus shown in FIG. 31 in a disk ejected state.
Figure 34:
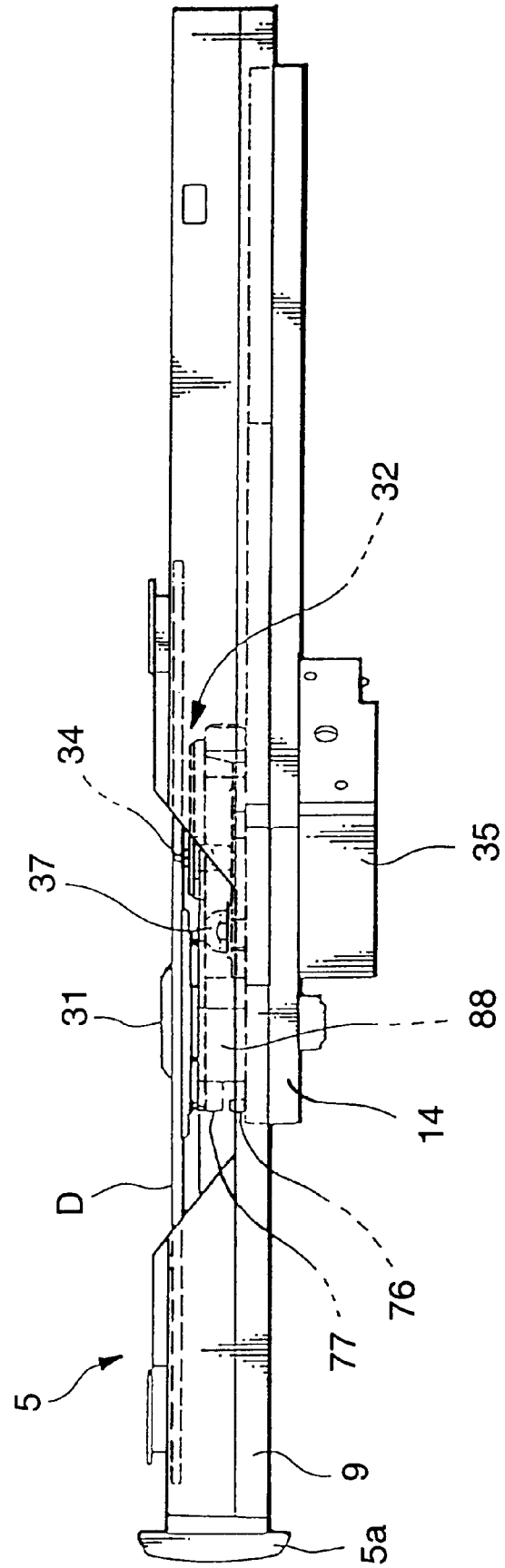
FIG. 34 is a side view showing the disk tray, the elevation frame, the disk table and so on of the disk drive apparatus shown in FIG. 31 in a disk loading state.
Figure 35:
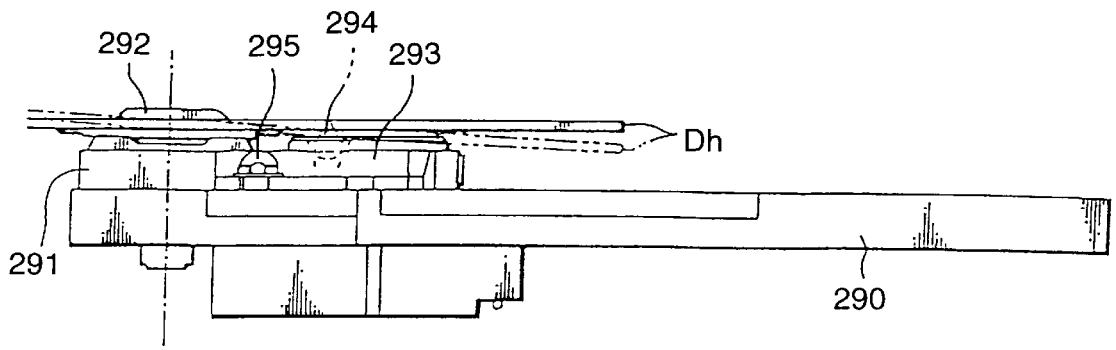
FIG. 35 is a diagram showing a disk drive apparatus according to the prior art and used to explain a state that an optical pickup device thereof is moved toward an inner periphery of an optical disk again.
Figure 36:
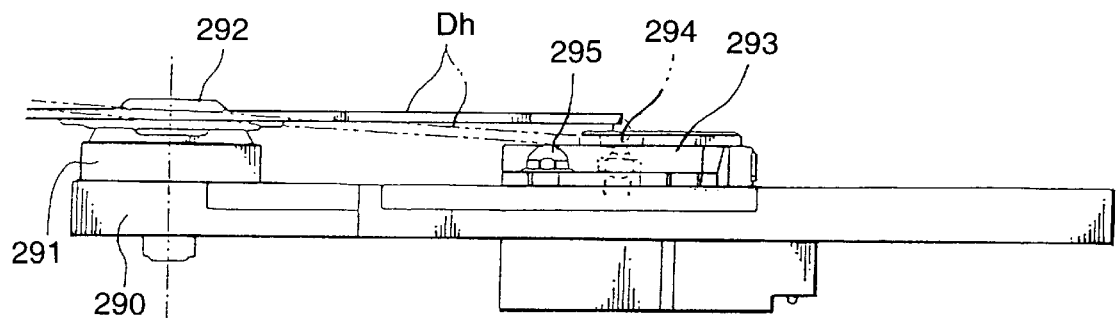
FIG. 36 is a diagram showing the disk drive apparatus according to the prior art and used to explain a state that an optical pickup device thereof is moved toward an outer periphery of the optical disk again.
Figure 37:
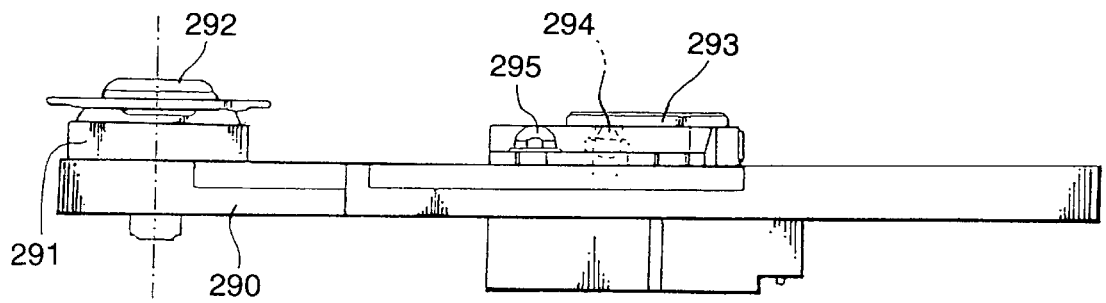
FIG. 37 is a diagram showing the disk drive apparatus according to the prior art and used to explain a state that the optical disk is removed.

A third embodiment of the present invention shown in FIGS. 29 and 30 has a structure such that a reference member 86 for the initialization which is performed by the skew sensor 37 is attached to the swing frame 14 which is a sub-chassis. The third embodiment is different from the second embodiment in that the reference member 86 having a reference portion is formed by of a member different from the disk table 31. Since the other elements are not changed, only the reference member 86 will now be described and the other elements are given the same reference numerals.

The reference member 86 is formed by bending an elongated metal plate into a crank shape. A leading member 86a and a base member 86b at the both ends thereof are formed to run parallel to each other. By securing the base member 86b with two fixing screws 87, the reference member 86 is secured to the swing frame 14. The leading member 86a of the reference member 86 forms the reference portion. The leading member 86a is disposed in parallel to the surface of the disk table 31 on which the disk is placed. The leading member 86a projects toward the optical pickup device 32. When the optical pickup device 32 has been moved to the innermost peripheral portion, substantially the overall surface of the skew sensor 37 is, as shown in FIGS. 29 and 30, covered by the leading member 86a.

According to the third embodiment, even though the reference member may be attached to a portion except for the attachment area of the spindle motor 30 and the movement area for the optical pickup device 32, the initialization of the optical pickup 32 by the skew sensor 37 can be performed. Such a structure may be employed in which the reference member is directly attached to the spindle motor 30.

A fourth embodiment of the present invention shown in FIGS. 31 to 34 has a structure arranged such that initialization is performed to correct the inclination of the spindle motor 30 when the optical disk D is ejected to be returned to a horizontally state. The third embodiment is different from the second embodiment in that a reference member 88 is rotatively attached to the swing frame 14 and the reference portion is removed from the initializing position of the skew sensor 37 when an information signal is read or written. Since the other structures are similar to those according to the first embodiment, only the reference member 88 will now be described and the other elements are given the same reference numerals and they are omitted from description.

The reference member 88 is disposed horizontally adjacent to the spindle motor 30 and, by a fulcrum shaft 89, supported to the swing frame 14 to be rotative in the horizontally direction. The fulcrum shaft 89 penetrates an intermediate portion of the reference member 88. A reference piece 88a extending toward one side of the fulcrum shaft 89 and serving as a reference portion extends at the side of the optical pickup 32. The reference piece 88a of the reference member 88 is formed to accurately run parallel to the surface of the disk table 31 on which a disk is loaded and a rear surface opposite to the sensor. A torsion spring 75 is loosely engaged to the fulcrum shaft 89. The spring force of the torsion spring 75 always urges the reference member 88 in the clockwise direction when viewed in FIG. 31. Rotation of the reference member 88 caused by the spring force of the torsion spring 75 is limited such that a stopper piece 88b extending opposite to the reference piece 88a is brought into contact with a stopper pin 76 secured to the swing frame 14. In a case where the stopper piece 88b of the reference member 88 is in contact with the stopper pin 76, the reference piece 88a is positioned on the moving locus for the skew sensor 37. In a state shown in FIG. 31 and so forth in which the optical pickup 32 has most approached the spindle motor 30, the skew sensor 37 is introduced into a position below the reference piece 88a. Thus, the substantially overall surface of the skew sensor 37 is covered with the reference piece 88a so that the initializing position is detected by the skew sensor 37.

To rotate the reference member 88, an opening member 77 is attached to the opening 8 of the disk tray 5. In a plan view point, the stopper pin 76 is positioned on the moving locus of the opening member 77. Stepped portions are formed from the stopper pin 76 in the vertical direction. Therefore, the opening member 77 is not brought into contact with the stopper pin 76 and the same is brought into contact with only the reference member 88 when loading is performed. Thus, the reference member 88 can be rotated by a predetermined angular degree against the spring force of the torsion spring 75.

The optical disk apparatus 1 having the above-mentioned structure and according to the fourth embodiment is operated, for example, as follows. Initially, electric power is supplied to the optical disk apparatus 1, and then the disk tray 5 for moving the optical disk D to the loading position is brought to an ejection state. Thus, the optical pickup 32 is moved toward the spindle motor 30. When the optical pickup 32 has most approached the spindle motor 30, the skew sensor 37 of the optical pickup device 32 is introduced into a position below the reference piece 88a of the reference member 88 so as to detect the reference piece 88a which is the reference portion. As a result, a detection signal from the skew sensor 37 is supplied to the skew control circuit 84 of the control unit CS shown in FIG. 25 so that the skew drive mechanism 60 initializes the spindle motor similarly to the above-mentioned embodiment.

Then, a desired optical disk D is placed in the disk accommodation portion 7 of the disk tray 5 projecting from the front panel 3 by a predetermined length. Then, the disk tray 5 is lightly pushed in so as to be moved to the loading position. Thus, the opening member 77 provided for the disk tray 5 is brought into contact with the stopper piece 88b of the reference member 88 so that the reference member 88 is rotated counterclockwise when viewed in FIG. 31 against the spring force of the torsion spring 75. As a result, the reference piece 88a of the reference member 88 is rotated in a direction in which it is moved away from the position above the skew sensor 37 so as to be moved to a position at which detection which is performed by the skew sensor 37 is not affected.

As a result, the skew sensor 37 corresponds to only the inclination of the information recording surface of the optical disk D when an information signal is read or written to and from the optical disk D. If the loaded optical disk D is a standard density disk, the skew off mode is set and information is reproduced in a state where the radial skew adjustment is inhibited. On the other hand, if the loaded optical disk D is a high density disk, the skew servo mode is set and at the same time the fact that the disk is the high density disk is stored in the memory so that information is reproduced while performing the radial skew adjustment.

Therefore, also the fourth embodiment is able to satisfactorily reproduce both of the standard density disk and the high density disk regardless of the type of the disk to be loaded next when optical disks D having different recording densities are reproduced (or recorded), similarly to the second embodiment.

The present invention is not limited to the above-mentioned embodiments. Although the description of the foregoing embodiments has been performed about the structure in which an optical disk, such as a CD or a CD-ROM or the like, is used as the information recording medium, the present invention may be applied to various magneto-optical disk apparatuses each using an magneto-optical disk, such as an MO or the like, as the information recording medium to record and/or reproduce information to and from the same. Although the foregoing embodiments have been described about the optical disk apparatus of a disk tray type for reproducing (reading) information recorded on the optical disk D, the present invention may, of course, be applied to a record-only apparatus for only recording information and also an optical disk apparatus capable of both recording and reproducing information.

Although the foregoing embodiments have been described to use the exposed optical disk D, such as a CD or the like, the optical disk D may be accommodated in a disk cartridge when it is loaded and ejected. As described above, the present invention is not limited to the above-mentioned embodiments and various modifications may be permitted within the scope of the invention.

[effect of the invention]

According to the present invention, when the optical disk is loaded onto the predetermined position, the skew sensor detects the optical disk. Initially, the optical pickup device is initialized, and hence the positional relationship between the optical disk and the optical pickup can be set in its predetermined initial state. Therefore, it is possible to provide a disk drive apparatus which can satisfactorily reproduce and/or record both of the standard-density disk such as the CD, the CD-ROM or the like and the high-density disk such as the DVD, the HD-CD or the like, regardless of the kind of the disk to be next loaded, when the optical disks having the different recording densities are reproduced and/or recorded.

What is claimed is:

1. A disk drive apparatus comprising:
   a disk table onto which an optical disk used for recording and/or reproducing information is loaded and which is rotated by a spindle motor;
   an optical pickup device for irradiating a light beam on said optical disk loaded onto said disk table to thereby record and/or reproduce information on and/or from said optical disk;
   a skew sensor provided in said optical pickup device for detecting inclination of an optical axis of said light beam irradiated from said optical pickup device relative to said optical disk;
   a skew control mechanism for adjusting the inclination of the optical axis of said light beam relative to said optical disk based on a detection output from said skew sensor;
   a reference portion positioned in the vicinity of said disk table and detected by said skew sensor;
   a recording-density detecting means for detecting a recording density of information on said optical disk; and
   a control means for setting said skew control mechanism in a predetermined initial state based on an output from said skew sensor based on detection of said reference portion and for carrying out a skew adjustment control by said skew control mechanism based on a detection signal from said recording-density detection means only when a density used for recording information on said optical disk is high density.

2. A disk drive apparatus according to claim 1, wherein said reference portion is provided in one of said disk table and said spindle motor.

3. A disk drive apparatus according to claim 1, wherein said reference portion is provided in one of a reference member fitted to said spindle motor and a chassis supporting said spindle motor.

4. A disk drive apparatus according to claim 1, wherein said reference portion is an inner periphery portion of said optical disk.

5. A disk drive apparatus according to claim 1, wherein said control means carries out said setting immediately after the disk drive apparatus is energized.

6. A disk drive apparatus comprising:
   a disk tray housing an optical disk used for recording and/or reproducing information and inserted into and ejected from an apparatus body;
   a disk table onto which said optical disk is loaded and which is rotated by a spindle motor;
   an optical pickup device for irradiating a light beam on said optical disk loaded onto said disk table to thereby record and/or reproduce information on and/or from said optical disk;

a skew sensor provided in said optical pickup device for detecting inclination of an optical axis of said light beam relative to said optical disk;

a skew control mechanism for adjusting the inclination of the optical axis of said light beam relative to said optical disk loaded onto said disk table based on a detection output from said skew sensor;

a reference member positioned in the vicinity of said disk table, detected by said skew sensor and covering said skew sensor so as to open and close said skew sensor;

an opening member provided in said disk tray for opening said skew sensor by operating said reference member; and a control means for setting said skew control mechanism in a predetermined initial state based on an output from said skew sensor based on detection of said reference member.

7. A disk drive apparatus comprising:

a disk table onto which an optical disk used for recording and/or reproducing information is loaded and which is rotated by a spindle motor;

an optical pickup device for irradiating a light beam on said optical disk loaded onto said disk table to thereby record and/or reproduce information on and/or from said optical disk;

a skew sensor provided in said optical pickup device for detecting inclination of an optical axis of said light beam irradiated from said optical pickup device relative to said optical disk;

a skew control mechanism for adjusting the inclination of the optical axis of said light beam relative to said optical disk based on a detection output from said skew sensor;

a control means for setting said skew control mechanism in a predetermined initial state based on an output from said skew sensor based on detection of an inner periphery portion of said optical disk loaded onto said disk table; and a kind discriminating means for discriminating a kind of said optical disk loaded onto said disk table, wherein said control means selects, in response to a discrimination result of said kind discrimination means, either of a first mode in which said skew control mechanism is kept in said initial state and a second mode in which said skew control mechanism adjusts the inclination of the optical axis of said light beam based on a detection output from said skew sensor.

8. A disk drive apparatus according to claim 7, wherein said kind discriminating means discriminates whether an optical disk loaded onto said disk table is a first optical disk having a first recording density or a second optical disk having a second recording density which is a higher density as compared with said first recording density, and said control means sets said skew control mechanism in said first mode when said kind discriminating means detects said first optical disk.

* * * * *